(12) United States Patent
Hein

(10) Patent No.: US 9,835,839 B2
(45) Date of Patent: Dec. 5, 2017

(54) APPARATUS AND METHOD FOR TRANSMITTED LIGHT ILLUMINATION FOR LIGHT MICROSCOPES AND MICROSCOPE SYSTEM

(75) Inventor: Detlef Hein, Goettingen (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 180 days.

(21) Appl. No.: 14/345,332

(22) PCT Filed: Aug. 16, 2012

(86) PCT No.: PCT/EP2012/003498
§ 371 (c)(1),
(2), (4) Date: Apr. 30, 2014

(87) PCT Pub. No.: WO2013/041173
PCT Pub. Date: Mar. 28, 2013

(65) Prior Publication Data
US 2014/0354796 A1    Dec. 4, 2014

(30) Foreign Application Priority Data

Sep. 23, 2011 (DE) .................. 10 2011 114 336

(51) Int. Cl.
G02B 21/06 (2006.01)
G02B 21/08 (2006.01)
G02B 21/36 (2006.01)

(52) U.S. Cl.
CPC ............ *G02B 21/06* (2013.01); *G02B 21/086* (2013.01); *G02B 21/365* (2013.01)

(58) Field of Classification Search
CPC ...... G02B 21/16; G02B 21/365; G02B 21/06; G02B 27/58; G02B 21/0032;
(Continued)

(56) References Cited

U.S. PATENT DOCUMENTS

2001/0005280 A1* 6/2001 Ouchi .................. G02B 21/086
                                                                   359/385
2002/0191281 A1   12/2002 Osa et al.
(Continued)

FOREIGN PATENT DOCUMENTS

DE         19537868 A1     4/1996
DE     102004017694 B3     9/2005
(Continued)

OTHER PUBLICATIONS

Application No. GB 102011114336.3, Search Report, dated Apr. 2, 2013, 2 pages.
(Continued)

*Primary Examiner* — Jamie Atala
*Assistant Examiner* — Ayman Abaza
(74) *Attorney, Agent, or Firm* — Hoffman Warnick LLC

(57) ABSTRACT

An apparatus and method for transmitted light illumination for light microscopes having changing effective entrance pupil of an objective. The apparatus has a light source for emitting an illuminating light beam, wherein a beam path of the illuminating light between a diaphragm edge and a sample held by a holding device is free from adjustable beam focussing components. In order to adapt the beam path of the illuminating light to the effective entrance pupil of the objective, the diaphragm edge may be variably positioned in the direction of the optical axis, wherein a position of the diaphragm edge in the direction of the optical axis can be varied irrespectively of a position of the diaphragm edge transversely to the optical axis.

26 Claims, 55 Drawing Sheets

(58) Field of Classification Search
CPC .... G02B 21/0092; G02B 21/14; G02B 21/00; G01N 21/6458; H01J 37/26
USPC .......................................................... 348/79
See application file for complete search history.

(56) References Cited

U.S. PATENT DOCUMENTS

| | | | | |
|---|---|---|---|---|
| 2004/0174616 A1* | 9/2004 | Bamberger | ............ | G02B 5/005 359/738 |
| 2005/0041949 A1* | 2/2005 | Onuki | .................... | G02B 27/58 385/140 |
| 2005/0225851 A1* | 10/2005 | Koerner | ................ | G02B 21/086 359/388 |
| 2005/0243413 A1* | 11/2005 | Shimizu | ............... | G02B 17/006 359/385 |
| 2005/0259320 A1* | 11/2005 | Fujimura | ............. | G02B 21/086 359/385 |
| 2006/0098895 A1* | 5/2006 | Westphal | ............. | G02B 21/125 382/274 |
| 2006/0152787 A1* | 7/2006 | Knebel | ............. | G02B 21/0032 359/212.1 |
| 2009/0219614 A1* | 9/2009 | Ryu | ....................... | G02B 21/06 359/385 |
| 2011/0317259 A1* | 12/2011 | Tanabe | .................. | G02B 21/06 359/383 |

FOREIGN PATENT DOCUMENTS

| | | |
|---|---|---|
| DE | 102004056685 A1 | 6/2006 |
| DE | 102005048375 A1 | 4/2007 |
| DE | 102011003603 A1 | 8/2012 |
| EP | 1008884 A1 | 6/2000 |
| JP | 2002189174 A * | 7/2002 |
| JP | 2008026924 A | 2/2008 |

OTHER PUBLICATIONS

International Application No. PCT/EP2012/003498, Preliminary Report on Patentability, dated Mar. 25, 2014, 6 pages.
International Application No. PCT/EP2012/003498, International Search Report, dated Nov. 9, 2012, 2 pages.
German Application No. 10 2011 114 336.3, Search Report, dated Apr. 2, 2013, 2 pages.

* cited by examiner

Fig. 39
Fig. 40
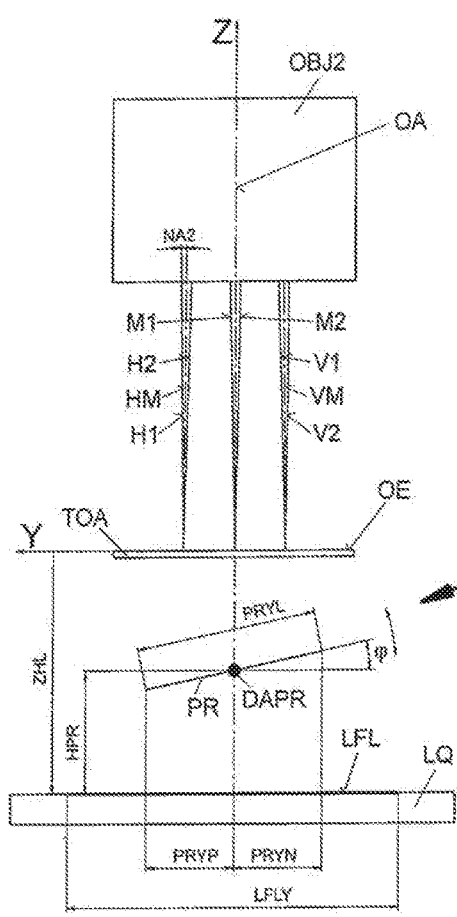
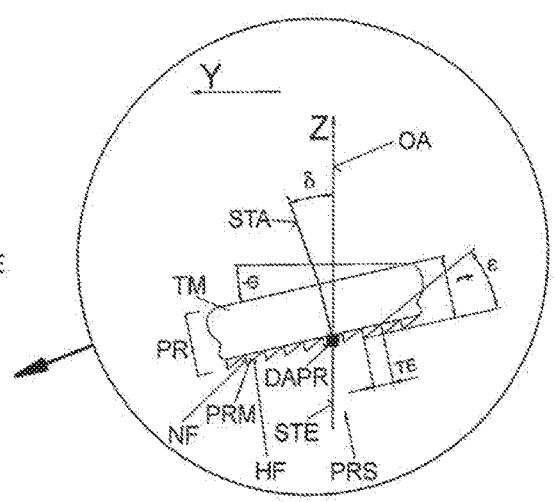

Fig. 49

| imaging system | Discovery 3D | Discovery 2D | Lumar 3D | Lumar 2D | AxioZoom 2D |
|---|---|---|---|---|---|
| objective OBJ, object plane OE, diaphragm plane, illuminating area LFL | | | | | |
| beam position in the XY-plane in the objective OBJ | | | | | |
| Ideal size of the illuminating area LFL for bright field illumination | | | | | |

Fig. 50

| imaging system | Discovery 3D | Discovery 2D | Lumar 3D | Lumar 2D | AxioZoom 2D |
|---|---|---|---|---|---|
| Ideal diaphragm shape for reducing scattered light | | | | | |
| approximated diaphragm shape for reducing scattered light | | | | | |
| simplified diaphragm shape for reducing scattered light | | | | | |

APPARATUS AND METHOD FOR TRANSMITTED LIGHT ILLUMINATION FOR LIGHT MICROSCOPES AND MICROSCOPE SYSTEM

TECHNICAL FIELD

The present invention relates in a first aspect to a device for transmitted light illumination for light microscopes, in particular stereo microscopes or macroscopes, with a changing effective entrance pupil of an objective.

Furthermore, according to the first aspect, the invention relates to a method for transmitted light illumination for a light microscope with changing entrance pupil of an objective. In addition the invention relates to a microscope system.

RELATED ART

A generic apparatus for transmitted light illumination for light microscopes is described for example in DE 10 2004 056 685 A1 and comprises a light source to emit an illuminating light beam and a holding device for holding a sample to be examined. Furthermore, at least one diaphragm edge for trimming the illuminating light beam is provided, said diaphragm edge being arranged between the holding device and the light source and extending transversely to an optical axis of a light microscope which can be positioned in an operating state on the apparatus for transmitted light illumination. A beam path of the illuminating light between the diaphragm edge and a sample held by the holding device is thereby free of adjustable beam-focussing components.

In the case of a generic method for transmitted light illumination for a light microscope with changing effective entrance pupil of an objective, a sample held by a holding device is exposed to illuminating light from a light source.

DE 10 2004 056 685 A1 describes a lighting device with two pivotable diaphragms. The pivot point of the diaphragms is thereby fixed and cannot be displaced. In addition there are no means for detecting, storing and/or reproducing the illumination settings of the pivotable diaphragms or pre-settings automatically adapted to the object. The lighting device described in DE 10 2004 056 685 A1 therefore lacks ease of use.

DE 10 2004 017 694 B3 relates to a lighting device which produces a segmented light field in such a way that the object to be illuminated is illuminated in the bright field essentially through incident light from an inclined incident angle. DE 10 2004 017 694 B3 describes, for this purpose, a light field which can be segmented, wherein additional measures are required for homogenisation. In practical terms, this results in an image with only a relatively weak contrast. By way of further adjusting elements, DE 10 2004 017 694 B3 makes provision for insertable diaphragms which are effective parallel to the optical axis and have a linear diaphragm edge—as used by many manufacturers. Likewise, D E 2004 017 694 B3 does not include any means for detecting, storing and/or reproducing the illumination settings of the insertable diaphragms or any pre-settings adapted automatically to the object. For this reason, the apparatus described in DE 10 2004 017 694 B3 offers little comfort of use.

US 20020191281 A1, EP 1 008 884 B1 and JP 2008026924 A1 describe transmitted light devices with a condenser lens. For the purpose of contrasting, the condenser lens contains at least two diaphragm parts conjugated with the objective pupil. The quotient of the numerical aperture of the objective and of the condenser is thereby lower than 0.6. A transmitted light illumination from bright field to dark field is hereby intended to be achievable. US 20020191281 A1, EP 1 008 884 B1 and JP 2008026924 A1 thus refer to configurations with a condenser lens and a pupil plane arranged conjugated with the objective pupil. Such systems require fixed pupils which are not present precisely in the case of cost-optimised objective—zoom body combinations. The transmitted light devices described in US 20020191281 A1, EP 1 008 884 B1 and JP 2008026924 A1 are not therefore suitable for the illumination of such cost-optimised objective—zoom body combinations with moving pupil positions.

The prior art is explained in more detail using FIGS. 1 and 2.

FIG. 1 shows a typical stereo microscope arrangement according to the prior art. A transmitted light device DL illuminates the object field with a diameter OF, located in the plane OE, which is identified by the highest lying surface of the transmitted light device DL. On the transmitted light device DL there is a motorised focussing device MFT which can be operated by means of an operating unit BMFT and on which a carrier TR with a coded objective changer (COW) is arranged. By means of the objective changer COW, three objectives OBJ1, OBJ2, OBJ3 can be used with different properties. For example the objective OBJ2 has, besides a further objective magnification with the smallest zoom factor β, also an entrance pupil which clearly lies at a greater distance from the object plane OE than the other two objectives. In FIG. 1, BMAB identifies an operating element for a motorised aperture diaphragm MAP. A plane at the level of the object support on the transmitted light device is identified by an E. MFT identifies a motorised focussing device.

On the carrier TR, there is a motorised zoom body MZK which can be used via an operating unit BMZK. On the motorised zoom body MZK there is an objective barrel T, with which the stereo microscope image can be observed directly by the two oculars OK. In addition the objective barrel T also facilitates documentation of the images seen by means of a connected camera K.

The transmitted light means DL according to the prior art which is not motorised is supplied with light by a cold light source KLD via a fibre optic light conductor LL. It has three manually settable operating elements SR1, SR2, SR3 for varying the light settings.

The whole system is controlled by the electronic module EM and the operating unit BE connected thereto. Communication within the whole system is achieved for example by means of a CAN bus.

For further observation, a coordinate system with the coordinate axes X, Y and Z is introduced. The coordinate origin lies in the centre of the object plane OE. For reasons of simplification, in this illustration the focus is on the upper side of the transparent object support TOA, that is to say OE is identical to the upper side of the transparent object support TOA and lies in the plane which spans across the coordinate axes X and Y. The positive half axes point, as seen by the user, in the following directions: X to the right, Y to the rear, Z upwards. The Z axis is identical to the optical axis OA of the momentarily connected objective.

For stereomicroscopes and macroscopes, there are numerous transmitted light illumination methods which cannot provide a suitable illumination for all possible imaging conditions, this being mainly due to the zoom function of the zoom body MZK. This applies in particular to the region of overview, that is to say for the smaller zoom factors of the zoom body. The lighting of stereo microscopes and macroscopes is frequently homogenised with suitable means, for example with milk glasses. This does indeed allow the homogeneity of the lighting to be improved but the contrast and brightness decrease correspondingly due to the light distribution across large spatial angle regions and the detrimental scattering light increases. The correspondingly illuminated overview images thus provide only very poor contrast. Many details can only be recognised with larger zoom factors β. The required zooming-in and zooming-out thereby require a long time and the overview is lost during the zoom process with larger zoom factors β.

FIG. 2 shows the operating principle of a known transmitted light device DL from FIG. 1. The front area FF of the light conductor LL is approximately imaged at infinity by means of an asphere ASPH. This means that the light beams output from a common point of the front area FF of the light conductor extend behind the asphere in parallel. By way of example, FIG. 2 shows the light beams ST1 ST2, ST3, ST4 and ST5 starting from a common point on the light conductor LL. Behind the asphere ASPH there is a deflection mirror SP which can be moved or rotated in different directions via the three operating elements SR1, SR2, SR3 shown in FIG. 1.

By means of the operating unit SR1, the mirror SP is rotated about the rotation axis DA as far as the desired adjustment angle α, whereby the light beams contacting the deflection mirror SP can be deflected in the respective directions. The operating unit SR2 allows the deflection mirror SP to be moved together with the rotation axis DA in the displacement direction VR. The light beams reflected by the deflection mirror SP thereby enter, in dependence upon the mirror position, at various points through the transparent object support TOA and the object plane OE.

By means of the operating element SR3, the deflection mirror SP is moved in the X direction, thus perpendicular to the illustration plane. Without changing the mirror geometry, another mirror surface is thereby effectively created with deviating reflection properties. None of the two usable mirror surfaces has 100% reflection orientation, that is to say they reflect with scattering diffusion, wherein the scattering proportion of the two mirror surfaces differs. In order to achieve illumination which is as homogeneous as possible, the greater scattering mirror surface is to be used, whereby the contrast is impaired and the image brightness decreases. A rotationally symmetric transmitted light bright field illumination can be achieved if the deflection mirror SP is adjusted such that the main beam, i.e. the light beam ST1, enters the objective OBJ1 exactly along the optical axis OA of the objective. This is the case if the setting angle α=45° and the impinging spot of the light beam ST1 is on the deflection mirror SP on the optical axis OA of the objective OBJ1. The deflection mirror SP redirects in this case the light, which comes from behind from the positive Y direction, upwards in the direction of the positive Z axis.

At the expense of homogeneity, the contrast can increase if the weaker scattering mirror surface is used. This corresponds more to a directed illumination. With larger magnifications a significant contrast enhancement can be reached with a still sufficient homogeneity if an oblique illumination is used. For this end, the deflection mirror SP is rotated and displaced in the displacement direction VR so far that the objective OBJ1 is illuminated in the desired way. A further contrast enhancement can be seen if the mirror edges are used, i.e. if jump-like brightness differences in the illumination can be used for contrast enhancement. This effect, however, only applies in relatively small regions of the object field, that is, homogeneous illuminations for larger overview object fields cannot be realized in this way.

The adjustment of the described illumination parameters requires certain experience to be held by the operator, i.e. untrained users might not have the skills to use the lighting adjustment via the three operating elements SR1, SR2, SR3 without further assistance.

Transmitted light devices DL, which contain an inclinable deflection mirror SP according to FIG. 2 also require a relatively large construction height in order to illuminate larger object fields, this being due to construction reasons. In spite of this, the achievable homogeneity and contrasting is not yet optimal even with a large structural height with this arrangement.

In case of normal light microscopes and some macroscopes, transmitted light illumination methods are known which require a fixed pupil plane. In most cases, then, contrast-increasing elements are brought into the light beam path and/or the imaging beam path, in particular into the objective pupil or a plane conjugated therewith. This requires extremely great resources and can only be achieved, if at all, with great limitations on zoom systems, and thus on stereo microscopes and macroscopes. These conventional methods only function with special objectives with expensive accessories, for example DIC sliders and only in certain zoom regions. The optical design requires unfavourably large installation spaces as well as strain-free optics for polarisation methods. In addition a possibility must be provided in the illumination device for manipulating the contrast-increasing elements and in general also a possibility for adaptation to different sized object fields through exchangeable condenser lenses. These solutions are therefore only suitable for special applications and in addition are very expensive.

All solutions according to the prior art require great resources in their realisation and/or leave much to be desired in terms of usability and user-friendliness.

SUMMARY OF THE INVENTION

It can be seen as an object of the invention to create an apparatus and a method for transmitted light illumination for light microscopes and a microscope system based thereon, which is to be realised in principle with simple technical means. In addition, ease of use is to be improved in comparison with the prior art.

An apparatus of the above-mentioned type is further developed according to the invention in that for the adaptation of the beam path of the illuminating light to the effective entrance pupil of the objective, means are provided for variable positioning of the diaphragm edge in the direction of the optical axis, whereby a position of the diaphragm edge can be varied in the direction of the optical axis independently of a position of the diaphragm edge transversely to the optical axis.

According to the invention, the method of the above type is further developed in that an illuminating light beam bundle emanating from the light source is restricted by a diaphragm edge which is arranged between the holding device and the light source, wherein in particular a beam path of the illuminating light is passed between the diaphragm edge and the sample held by the holding device free of adjustable beam-focussing components, and in that the diaphragm edge extends traverse to an optical axis and is positioned dependent on the location of the effective entrance pupil of the objective in the direction of the optical axis.

It can be regarded as a core idea of the first aspect of the invention to trim the illuminating light emitted from the light source with a diaphragm edge, wherein the diaphragm edge can be adjusted in the direction of the optical axis depending upon the position of the effective entrance pupil of the optical system.

According to a second aspect of the invention the object is achieved through an apparatus for transmitted light illumination for light microscopes, in particular stereo microscopes or macroscopes, having a light source to emit an illuminating light bundle and having a holding device to hold a sample to be examined. A deflection device is thereby present to set the contrast between the light source and the holding device, with which deflection device an angle distribution of the illuminating light bundle can be varied relative to an optical axis. The apparatus according to the second aspect of the invention is further characterized in that the deflection device has a prism film.

Having regard to the method, the object is achieved in the second aspect according to the invention through a method for transmitted light illumination for light microscopes, wherein a sample held by a holding device is exposed to illuminating light from a light source, and wherein an angle distribution of an illuminating light bundle is varied with a deflection device in order to set the contrast. The method according to the second aspect of the invention is further characterized in that the deflection device has a prism film.

It can be regarded as a core idea of the second aspect of the invention to deflect the illuminating light emitted from the light source with a deflection device having a micro prism structure with a plurality of identically working elements. The angle distribution of the illuminating light can thereby be purposefully influenced.

In a third aspect of the invention the object is achieved with a transmitted light illumination apparatus for light microscopes, in particular stereo microscopes or macroscopes with a changing effective entrance pupil of an objective, the apparatus comprising a light source adapted to emit an illuminating light beam (bundle), a holding device for holding a sample to be examined and at least one diaphragm edge to trim the illuminating light beam, wherein the diaphragm edge is arranged between the holding device and the light source, wherein the diaphragm edge extends transversely to an optical axis of a light microscope, in particular of an objective of a light microscope, which can be positioned in an operating state on the transmitted light illumination apparatus, and wherein a beam path of the illuminating light between the diaphragm edge and a sample held by the holding device is free of adjustable beam-focussing components. The transmitted light illumination apparatus of the third aspect is furthermore characterized in that means for ascertaining a microscope setting and/or a microscope configuration of a light microscope, which can be positioned at the transmitted light illumination apparatus, are provided, means for variable positioning of the diaphragm edge in a direction transverse to the optical axis are provided, and a control device is provided which is configured to position the diaphragm edge in the direction transverse to the optical axis in dependence upon the microscope setting and/or a microscope configuration via the means for variable positioning of the diaphragm edge.

With regard to a method, the object is achieved in the third aspect of the invention with a method for transmitted light illumination for a light microscope with changing effective entrance pupil of an objective, in which a sample held by a holding device is subjected to illuminating light from a light source and in which an illuminating light beam bundle emitted from the light source is trimmed by a diaphragm edge arranged between the holding device and the light source, wherein in particular a beam path of the illuminating light between the diaphragm edge and the sample held by the holding device is free of adjustable beam-focussing components. The method of the third aspect of the invention is furthermore characterized in that a microscope setting and/or a microscope configuration is determined and in that the diaphragm edge extends transversely to an optical axis, in particular of the objective, and is positioned in the direction transverse to the optical axis in dependence upon the microscope setting and/or a microscope configuration.

A core idea of the third aspect of the invention can be seen in that the illuminating light emitted by the light source can be trimmed with a diaphragm edge, wherein the diaphragm edge can be adjusted in a direction traverse to the optical axis dependent on the microscope setting and/or the microscope configuration of the connected light microscope.

In a fourth aspect of the invention the object is achieved with a transmitted light illumination apparatus for light microscopes, in particular stereo microscopes or macroscopes with a changing effective entrance pupil of an objective, the apparatus comprising a light source adapted to emit an illuminating light beam (bundle), a casing in which the light source is housed, a holding device for holding a sample to be examined and at least one diaphragm edge to trim the illuminating light beam, wherein the diaphragm edge extends transversely to an optical axis of a light microscope, in particular of an objective of a light microscope, which can be positioned in an operating state on the transmitted light illumination apparatus, and wherein a beam path of the illuminating light between the diaphragm edge and a sample held by the holding device is free of adjustable beam-focussing components. The transmitted light illumination apparatus of the fourth aspect is furthermore characterized in that in order to adapt the beam path of the illuminating light to the effective entrance pupil of the objective means for variable positioning of the diaphragm edge in direction of the optical axis are provided, wherein a position of the diaphragm edge in the direction of the optical axis can be varied irrespectively of a position of the diaphragm edge transversely to the optical axis, assembly means being provided on the housing for mounting a separate sample support table, means for determining the presence of a sample support table being provided, the housing having a passage opening, through which the diaphragm edge can be moved in the direction of the optical axis, the holding means being formed in the region of the passage opening of the housing or on a separate sample support table, and a control device being present which is adapted to position the diaphragm edge in dependence at least upon the determined presence of a sample support table.

With regard to a method, the object is achieved in the fourth aspect of the invention with a method for transmitted light illumination for a light microscope with changing effective entrance pupil of an objective, in which a sample held by a holding device is subjected to illuminating light from a light source and in which an illuminating light beam bundle emitted from the light source is trimmed by a diaphragm edge arranged between the holding device and the light source, wherein a beam path of the illuminating light between the diaphragm edge and the sample held by the holding device is free of adjustable beam-focussing components, whereby the light source is arranged in a housing, on which a separate sample support table can be mounted with assembly means, wherein the holding device is formed in the region of the passage opening of the housing or on a separate sample support table and wherein the housing has a passage opening, through which the diaphragm edge can be moved in the direction of an optical axis. The method of the fourth aspect of the invention is further characterized in that a presence of a sample support table is determined, and the diaphragm edge extends transversely to an optical axis, in particular of the objective, and is positioned in dependence upon the position of the effective entrance pupil of the objective and in dependence upon at least a determined presence of a sample support table in the direction of the optical axis.

it can be seen as an essential idea of the fourth aspect of the invention that it is automatically recognised whether a sample support table has been placed on the housing of the transmitted light illumination. Without a sample support table, a sample to be examined can be held on a holding device formed on the passage opening of the housing. This holding device on the housing can be configured for example through a depression for an object carrier or a transparent object support. In the case of a sample support table, the holding device of the sample support table is used to hold the sample. The sample is thereby held at a position which is offset in relation to the case without a sample support table in the direction of the optical axis.

In addition protection is claimed for a microscope system which has a light microscope and an apparatus for transmitted light illumination according to one or more of the aspects of the invention explained above.

Furthermore protection is also claimed for apparatuses and methods for transmitted light illumination as well as microscope systems, in which two or more of the aspects of the invention explained above are combined.

Advantageous embodiments of the device according to the invention and preferred variants of the method according to the invention are explained below with reference to the dependent claims and in particular in connection with the attached drawings.

The direction indication "in the direction of the optical axis" is used within the scope of the present description synonymously with "along the optical axis".

The method according to the invention can be realised in particular with the apparatus according to the invention for transmitted light illumination. In this connection, in the case of the microscope system according to the invention a control device is provided in an advantageous variant, which is connected to components of the light microscope and the transmitted light illumination apparatus, whereby it is configured to control the microscope and the apparatus for transmitted light illumination in order to carry out the method according to the invention.

According to a particularly simple variant there are no beam-focussing components between the diaphragm edge and the sample, in particular no beam-forming components.

The term "optical axis" is intended in the present description to mean essentially and as a rule the optical axis of an objective of a light microscope which is arranged or positioned in an operating state on the apparatus according to the invention for transmitted light illumination.

If the connected light microscope is a stereo microscope with mid-light beams LM and RM inclined relative to each other, the term "optical axis" can mean:
  i) the optical axis of the objective in the case in which the objective only symmetrically detects an observation channel;
  ii) the angle bisector between the two mid-light beams if the two observation channels are detected through the objective, or, however,
  iii) the mid-light beam of only one channel if only one observation channel is not symmetrically detected.

The term "optical axis" can thus also be defined having regard to the apparatus according to the invention for transmitted light illumination itself in the sense that essentially the direction is meant, in which the illuminating light is radiated. In the usual case the apparatus for transmitted light illumination according to the invention is formed as a substantially flat box which lies for example on a laboratory table. In this case the optical axis points in the direction of the vertical direction, thus in the Z direction.

The term "holding device" is to be functionally interpreted for the purposes of the present invention, i.e. each means is meant, with which a sample to be examined can in some way be positioned relative to the illuminating light beam and the optics of a light microscope to be connected.

The term "effective entrance pupil" is to be interpreted in terms of phenomenon. Accordingly it is not a calculated or theoretical entrance pupil of the optical system, but instead in fact the region, in which a waist of the illuminating light beam has a minimum cross section, wherein with the illuminating light beam only beam portions are meant that actually contribute to the imaging. This plane region, in the present case referred to as the effective entrance pupil, is determined by measuring, thus testing. In practice the position of this effective entrance pupil depends on the optics used and also upon the sample examined and sample holders such as object carriers or other transparent sample supports and in case of usual zoom microscopes is not a well-defined flat plane.

According to a particularly preferred variant of the method according to the invention the diaphragm edge is positioned in a plane of an effective entrance pupil of the objective. In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

The positioning of the diaphragm edge in the plane of the entrance pupil thus opens up the possibility of achieving an inclined light illumination in that the diaphragm edge covers a part of the entrance pupil. It is particularly preferable for the diaphragm edge to trim the illuminating light bundle asymmetrically in these embodiments. This means that certain rays of the illuminating light are selected and result in an inclined light illumination. In practice, advantageous improvements in contrasting can thus be achieved.

According to a further advantageous embodiment of the method according to the invention, the diaphragm edge can accordingly be positioned in a direction perpendicular to the optical axis in order to set the contrast. According to the apparatus according to the invention for transmitted light illumination, it is particularly preferable for suitable means for variable positioning of the diaphragm edge in a direction perpendicular to the optical axis to be present.

In the case of the diaphragm(s) it is in principle only a question of the technical effect that certain light rays remain unimpaired by the diaphragm edge whereas other light rays are removed from or filtered out of the light beam. This function can be realised by a mechanical diaphragm, but in principle also through electronically controllable liquid crystal arrays or LCD arrays.

Having regard to the light source to be used it is indeed only a question of the principal function that light is provided with a desired spectral composition in a desired intensity. Having regard to an arrangement which is as compact as possible in structural terms, in particularly preferred variants of the apparatuses according to the invention, planar light sources, in particular a plurality of light diodes, are used. White light LEDS are particularly advantageous having regard to construction size and light output. So-called PHLOX light sources can be used particularly preferably.

The advantage according to the invention of filtering out portions of the beam which do not contribute to the image but do indeed contribute to the scattered background is achieved in principle independently of the form of the diaphragm edge. A precondition for this is only that the diaphragm edge is positioned at least in the vicinity of the entrance pupil of the optical system. For example these advantages according to the invention can also be achieved with curved or round diaphragms.

A further significant aspect of the invention resides in converting an illumination that is symmetric at the start into an asymmetric illumination which is an oblique light illumination. For this end, in a particularly advantageous embodiment of the apparatus according to the invention the diaphragm edge is a linear diaphragm edge. In principle, however, the shape of an exactly linear edge is not essential. It is rather important that the illumination light bundle is restricted asymmetrically.

Illuminating light which enters the optical system from locations outside of the entrance pupil, thus the microscope objective, cannot contribute there in the transmitted light brightness field image to the image itself but instead only to the scattered background. This is undesirable and gives rise to a further advantageous method variant, in which an illuminating area of the light source is adapted to an actually effective back-projection of the illuminating light. This means that parts of the illuminating area which cannot provide illuminating light contributing to the image are filtered out at the start. To this end, according to the apparatus according to the invention, at least one further diaphragm is advantageously present, which is positioned directly next to the light source, in order to vary an effective illuminating area.

Whether and to which extent improvements in contrast can be reached with an oblique illumination depends on the respectively examined specimen. In this context a further embodiment of the inventive apparatus is advantageous in which means for rotating the diaphragm edge about the optical axis are present. That means that the direction can be varied in which the middle beam direction is inclined relative to the optical axis in an oblique light illumination. If the inventive apparatus is used with a macroscope, thus the same is principally achieved as if rotating the specimen about the optical axis. A crucial advantages is here that the specimen as such can remain unvaried in the holding device and thus need not be modified in its position.

With regard to the imaging quality, contrast and brightness of the specimen, the results achieved depend strongly on the spatial position of the diaphragm edge as the illumination can be strongly varied and adjusted with the diaphragm edge.

Therefore, in a particularly preferred variant of the inventive method, an absolute position of the diaphragm edge is determined optically and/or mechanically prior to the positioning the diaphragm.

In a particularly preferred embodiment of the inventive device for displacement of the diaphragm edge in the direction of the optical axis and the direction transverse to the optical axis, for instance, a carriage mechanism with a first carriage and a second carriage is present. For driving these carriages, step motors can be used which allow a precise positioning.

According to a further advantageous embodiment of the apparatus according to the invention, at least one further variably positionable diaphragm is present to trim the illuminating light beam between the holding device and the light source. With such a further diaphragm, which can comprise in particular a linear diaphragm edge, further improvements can be achieved having regard to the reduction of scattered light. In addition it can be useful for certain positions of the entrance pupil to have a further variably positionable diaphragm.

In this context, a further preferred variant of the inventive apparatus resides in that a first mechanical diaphragm and a second mechanical diphragm are provided, in that the diaphragm edge is formed by an edge of the first mechanical edge or by an edge of the second mechanical diaphragm, and in that for displacement of the diaphragm edge in direction of the optical axis and in a direction transverse to the optical axis, a first carriage mechanism with a first carriage and a second carriage for the first mechanical diaphragm and a second carriage mechanism with a third carriage and a fourth carriage for the second mechanical diaphragm are provided. With this arrangement, the effective diaphragm edge can be adjusted variably to different positions of the entrance pupil.

The advantages according to the invention are achieved in a special way if the diaphragm edge is positioned in a plane of the effective entrance pupil of the objective. The invention provides in particular a method, with which this position, which can also be described as an optimal position or ideal z-position of the diaphragm edge, can be found and set. A position of the diaphragm edge is determined by initially varying the position of the diaphragm edge in the direction of the optical axis of the objective and for each position of the diaphragm edge in the direction of the optical axis a microscopic image is at least partially recorded. For each microscope image, an illumination parameter is thus determined and the position of the diaphragm edge in the direction of the optical axis, in which a progression of the illumination parameter plotted against the position of the diaphragm edge in the direction of the optical axis has a predetermined characteristic, is set as an optimal position of the diaphragm edge or as a position of the diaphragm edge in the plane of the effective entrance pupil. The thus fixed position can be stored and the diaphragm edge can be moved into the thus found position.

This feature can then be recorded for each relevant zoom position of the microscope. Intermediate regions can be interpolated later.

By way of an illumination parameter, a value is preferably selected which is a measure for an intensity or brightness gradient in a direction perpendicular to the diaphragm edge, a local image contrast, a local contrast periphery of the image, a local image homogeneity and/or a local shadow in the microscope image.

This determination of the optimal position of the diaphragm edge is based upon the fact that during positioning of the diaphragm edge in the entrance pupil, all bundles of illuminating light beams contributing to the image are in principle equally influenced by the diaphragm edge in that the diaphragm edge removes unilaterally certain beams of each bundle of illuminating light beams. In contrast, if the diaphragm edge is positioned outside of the plane of the entrance pupil, different bundles of light are differently influenced. For example certain bundles of light are completely filtered out, and this can consequently be seen as a dark area in the image. The ideal position of the diaphragm edge is thus characterized by the image being very homogeneous in relation to the brightness and contrast.

In case of a particularly preferred variant, an intensity gradient is accordingly determined for each microscope image as a illumination parameter and the diaphragm edge is set to the position in the direction of the optical axis, in which a progression of the intensity gradient entered against the position of the diaphragm edge in the direction of the optical axis has a zero passage.

In order to create an appropriate termination condition for the method it is possible to ascertain, for the decision whether the intensity gradient experiences a zero passage, whether the intensity gradient is smaller than a meaningfully set threshold. The threshold can thereby depend upon the concrete optical configuration.

The microscope images are thereby advantageously recorded with a digital camera and the illumination parameter, for example thus the intensity gradient, is determined by evaluating the data supplied by the digital camera. This can be carried out with a computer in the control device or connected to the control device.

In order to effectively carry out the method for determining the optimal position, it is possible, on the basis of a illumination parameter, which has been determined for a previous position of the diaphragm edge in the direction of the optical axis, to decide upon the next position of the diaphragm edge in the direction of the optical axis to be fixed, wherein the next position is further away from the previous position with increasingly great illumination parameter determined for the previous position. A direction in which the next position is spaced apart from the previous position is determined from a +/− sign of the illumination parameter determined for the previous position.

The basic idea of this method variant is that the optimal position is further away if the illumination parameter determined for a previous position has still a comparatively large absolute value. In order to arrive rapidly at the optimal position it is then useful to carry out the next determination of the illumination parameter for a comparatively remote position. On the other hand one is already very close to the optimal position if the illumination parameter determined for a previous position has a small absolute value. In this case the following position is very close to the previous position.

Clear advantages for usability are achieved if settings of the at least one diaphragm edge and/or of further diaphragms are carried out in an automated manner, in particular following user indication.

It is indeed at the forefront of the method according to the invention to find an optimal position for the diaphragm edge in Z direction, to store this and possibly retrieve it again in an automated manner. In principle, however, it is also possible, for certain positions of the diaphragm edge in the direction of the optical axis, to also determine certain favourably regarded positions of the diaphragm edge in the direction transversely to the optical axis, to store them and possibly retrieve them again in an automated manner.

According to a particularly simple variant the diaphragm edge is thereby positioned on the optical axis, thus at Y or X=0. Due to the inclined light illumination thereby caused, it is already possible to achieve good contrast enhancements. Further criteria are good image homogeneities and vignetting-free images. These data can be stored in corresponding curves or tables and be retrieved again as necessary.

It is particularly preferred that settings of the at least one diaphragm edge, of further diaphragms and/or further optical components are automatically set dependent on a determined configuration of present components, in particular optical components. For example, it can be automatically ascertained which objective is active and which zoom position is set and, in principle, which microscope type is used.

For this end, a microscope system according to the invention is equipped with a memory device in which settings of the transmitted light device and the light microscope, in particular of the at least one diaphragm edge, are saved.

By using a prism film, the possible applications of an apparatus for transmitted light illumination with a planar light source can be significantly increased. In particular, the contrast can be variably set. Clear improvements in the imaging quality are possible in particular for low-contrast samples.

The method according to the second aspect of the invention can be realised in particular with the apparatus for transmitted light illumination according to the invention. For this, a control device is present in an advantageous variant of the microscope system according to the invention, said control device being connected to components of the light microscope and the apparatus for transmitted light illumination and being adapted to control the microscope and the apparatus for transmitted light illumination to realise a method according to the invention.

The advantages according to the invention, thus in particular clear improvements in the contrast, are achieved in a particular way if the prisms of the prism film point in the direction of the light source.

According to a particularly preferred embodiment of the apparatus according to the invention a main deflection direction of the deflection device, thus essentially of the prism film, is different from the optical axis. An inclined light illumination is thus achieved, with which good increases in contrast are possible.

Having regard to the details, the achievable contrast improvements depend upon the optical parameters of the prism film, thus of the individual prisms. Extensive trials have shown here that particularly good results are possible if the prisms of the prism film have a prism angle of 20° to 30°, preferably 24° to 28° and particularly preferably 26°.

The achievable increases in contrast depend, in specific terms, greatly upon the respective sample. According to further advantageous variants of the apparatus according to the invention the deflection device can thus be rotated about a rotation axis orientated transversely to the optical axis. This means that the inclined light illumination can be realised from different angles relative to the sample to be examined. The rotation axis is usefully thereby selected so that it is orientated parallel to the direction of the prism edges.

The variability of the transmitted light illumination can be further increased if means for variable positioning of the deflection device in a direction transversely to the optical axis and/or in the direction of the optical axis are present. In particular, the angle of an inclined light illumination can be varied with such means.

For cases in which an illumination of the sample to be examined via the prism film is not useful and/or not desired, means can then be present to move the deflection device out of an optical path of the illuminating light and to move the deflection device into the optical path of the illuminating light.

In this connection, the functionality of the apparatus according to the invention can be further increased if at least one diaphragm edge is present to trim the illuminating light bundle, wherein the diaphragm edge is arranged between the holding device and the light source and extends transversely to an optical axis, in particular of an objective, of a light microscope, which can be positioned in an operating state on the apparatus for transmitted light illumination. The optical path of the illuminating light between the diaphragm edge and a sample held by the holding device can thereby be free in particular of adjustable beam-focussing components. In addition, in order to adapt the optical path of the illuminating light to an effective entrance pupil of the objective, means are present for variable positioning of the diaphragm edge in the direction of the optical axis and a position of the diaphragm edge is variable in the direction of the optical axis, in particular independently of a position of the diaphragm edge transversely to the optical axis.

This development is based upon the core idea of trimming the illuminating light emitted from the light source with a diaphragm edge, wherein the diaphragm edge can be adjusted in the direction of the optical axis in dependence upon the position of the effective entrance pupil of the optical system.

Illuminating light which enters the optical system from locations outside of the entrance pupil, thus the microscope objective, cannot contribute there in the transmitted light brightness field image to the image itself but instead only to the scattered background. This is undesirable and gives rise to a further advantageous method variant, in which an illuminating area of the light source is adapted to an actually effective back-projection of the illuminating light. This means that parts of the illuminating area which cannot provide illuminating light contributing to the image are filtered out at the start. To this end, according to the apparatus according to the invention, at least one further diaphragm is advantageously present, which may be positioned directly in front of the light source.

According to a particularly advantageous variant of the apparatus according to the invention, the diaphragm edge is an edge of a mechanical diaphragm and the deflection device with the prism film is formed on the mechanical diaphragm. In order to provide the diaphragm functionality the mechanical diaphragm has at least one light-impermeable sub-region. A highly functional system can thus be provided, wherein, for different optical situations, either the diaphragm edge and/or the prism film can be used.

Based thereupon are further advantageous variants of the method according to the invention, in which the diaphragm edge is moved out of the optical path of the illuminating light and the deflection device is moved into the optical path of the illuminating light if an effective entrance pupil of the objective lies outside of a region accessible for the diaphragm edge. The operating comfort for a user can hereby be increased if the settings of the deflection device, of the at least one diaphragm edge and/or of further diaphragms, can be realised in an automated manner, in particular following user input.

With regard to the imaging quality and the contrast of the specimen, the results achieved depend strongly on the spatial position of the diaphragm edge as the illumination can be strongly varied and adjusted with the diaphragm edge.

In a particularly preferred embodiment of the inventive device for displacement of the diaphragm edge in the direction of the optical axis and the direction transverse to the optical axis, for instance, a carriage mechanism with a first carriage and a second carriage is present. For driving these carriages, step motors can be used which allow a precise positioning.

According to a further advantageous embodiment of the apparatus according to the invention, at least one further variably positionable diaphragm is present to trim the illuminating light beam between the holding device and the light source. With such a further diaphragm, which can comprise in particular a linear diaphragm edge, further improvements can be achieved having regard to the reduction of scattered light. In addition it can be useful for certain positions of the entrance pupil to have a further variably positionable diaphragm.

In this context, a further preferred variant of the inventive apparatus resides in that a first mechanical diaphragm and a second mechanical diphragm are provided, in that the diaphragm edge is formed by an edge of the first mechanical edge or by an edge of the second mechanical diaphragm, and in that for displacement of the diaphragm edge in direction of the optical axis and in a direction transverse to the optical axis, a first carriage mechanism with a first carriage and a second carriage for the first mechanical diaphragm and a second carriage mechanism with a third carriage and a fourth carriage for the second mechanical diaphragm are provided. With this arrangement, the effective diaphragm edge can be adjusted variably to different positions of the entrance pupil.

Having regard to the light source to be used it is indeed only a question of the principal function that light is provided with a desired spectral composition in a desired intensity.

Having regard to an arrangement which is as compact as possible in structural terms, in particularly preferred variants of the apparatuses according to the invention, planar light sources, in particular a plurality of light diodes, are used. White light LEDS are particularly advantageous having regard to construction size and light output. So-called PHLOX light sources can be used particularly preferably.

Having regard to the method, it is preferred for this purpose that an illuminating light bundle emitted from the light source is trimmed by a diaphragm edge arranged between the holding device and the light source, wherein in particular an optical path of the illuminating light between the diaphragm edge and the sample held by the holding device is free of adjustable beam-focussing components and wherein the diaphragm edge extends transversely to an optical axis of the objective and is positioned in dependence upon the position of the effective entrance pupil of the objective in the direction of the optical axis of the objective.

According to a further advantageous variant of the method according to the invention the diaphragm edge can accordingly be positioned in a direction transversely to the optical axis in order to set the contrast. For this, suitable means for variable positioning of the diaphragm edge in a direction transversely to the optical axis are particularly preferably present in the apparatus according to the invention for transmitted light illumination.

The advantages according to the invention are achieved in a particular way if the diaphragm edge is positioned in a plane of the effective entrance pupil of the objective.

It is particularly preferred that settings of the at least one diaphragm edge, of further diaphragms and/or further optical components are automatically set dependent on a determined configuration of present components, in particular optical components. For example, it can be automatically ascertained which objective is active and which zoom position is set and, in principle, which microscope type is used.

For this end, a microscope system according to the invention is equipped with a memory device in which settings of the transmitted light device and the light microscope, in particular of the deflection device and/or the at least one diaphragm edge, are saved. The angle of inclination of the deflection device, essentially therefore the angle of inclination of the prism film against the optical axis, is an essential parameter for setting the contrast and hence the imaging quality. Extensive trials have hereby shown that this angle of inclination is particularly advantageously adapted to a respectively set combination of objective, zoom body and zoom factor. The illumination can thus be adapted very variably to different optical situations and samples to be examined.

For ergonomic reasons it is preferable for the deflection device to be inclined in operation in such a way that the illuminating light bundle is tilted away from a user. Dazzling can thereby be avoided.

According to a particularly preferred variant of the method according to the invention the diaphragm edge is positioned in a plane of an effective entrance pupil of the objective. In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

The positioning of the diaphragm edge in the plane of the entrance pupil thus opens up the possibility of achieving an inclined light illumination in that the diaphragm edge covers a part of the entrance pupil. It is particularly preferable for the diaphragm edge to trim the illuminating light bundle asymmetrically in these embodiments. This means that certain rays of the illuminating light are selected and result in an inclined light illumination. In practice, advantageous improvements in contrasting can thus be achieved.

According to a further advantageous embodiment of the method according to the invention, the diaphragm edge can accordingly be positioned in a direction perpendicular to the optical axis in order to set the contrast. According to the apparatus according to the invention for transmitted light illumination, it is particularly preferable for suitable means for variable positioning of the diaphragm edge in a direction transverse to the optical axis to be present.

The positioning of the diaphragm edge can preferably be realised automatically following a request by a user in dependence upon the microscope setting. Properties of the imaging system can thus be automatically considered.

According to a particularly simply structured variant, no beam-focussing components whatsoever, in particular no beam-forming components, are present between the diaphragm edge and the sample.

The microscope setting preferably comprises at least the utilised objective, a utilised zoom body and a magnification set with the zoom body. With knowledge of these components, the diaphragm edge can be moved to an optimal position which can have been previously determined and stored for the utilised objective—zoom body combination. The optimal position can correspond in particular along the direction of the optical axis to the position of the entrance pupil. At this position, the illuminating optical path of the light microscope has a waist.

A microscope configuration usefully comprises at least one type of zoom system and/or selected objective. The terms "microscope type" and "type of zoom system" can be used synonymously.

A microscope setting usefully contains at least one zoom magnification and/or one position of a selected objective.

According to a particularly preferred variant of the apparatus according to the invention, means for variable positioning of the diaphragm edge along the direction of the optical axis are present to adapt the optical path of the illuminating light to the effective entrance pupil of the objective, wherein a position of the diaphragm edge along the direction of the optical axis can be varied independently of a position of the diaphragm edge transversely to the optical axis. The essential idea of this development is that the diaphragm edge along the direction of the optical axis is adjusted in dependence upon the position of the effective entrance pupil of the optical system.

According to a preferred embodiment of the apparatus according to the invention, means are additionally provided for enquiring concerning a microscope type of a light microscope which can be positioned on the apparatus for transmitted light illumination, and the control device is adapted, in dependence upon the microscope type, to position the diaphragm edge with the means for variable positioning of the diaphragm edge in a direction transversely to the optical axis.

The control device can hereby be adapted to realise different position settings of the diaphragm edge at least for the following microscope types: stereo microscope with one channel to be illuminated, stereo microscope with two channels to be illuminated, stereo microscope with one channel to be illuminated and one excitation channel for fluorescence excitation, stereo microscope with two channels to be illuminated and one excitation channel for fluorescence excitation and also a macroscope with one channel to be illuminated. The channels constitute separate beam progressions through at least in part the same optical components, in particular through the objective and a zoom body. For optimal illumination, solely the respective channel to be illuminated is to be illuminated with the illuminating light bundle. Other light, on the other hand, does not contribute to the image and leads to scattered light.

A setting of the diaphragm edge in a direction transversely to the optical axis is usually necessary to illuminate a certain channel. For this, a variant of the apparatus according to the invention is useful, wherein means for variable positioning of the diaphragm edge in a direction transversely to the optical axis are present and the control device is adapted, in dependence upon the microscope setting and/or microscope configuration, to position the diaphragm edge with the means for variable positioning of the diaphragm edge in a direction transversely to the optical axis. The diaphragm edge can accordingly also be positioned in a direction transversely to the optical axis in order to set the contrast.

According to a preferred variant of the apparatus according to the invention the means for enquiring concerning a microscope type and/or the means for enquiring concerning a microscope setting and/or a microscope configuration have an electrical interface, in particular a Controller Area Network (CAN) bus. Alternatively, an optical interface or an Ethernet connection can also be used. Either this same interface can be used both for the means for enquiring concerning a microscope type and also for the means for enquiring concerning a microscope setting and/or a microscope configuration, or separate interfaces can be provided.

Having regard to the diaphragm(s), in principle only the technical effect is important that certain light rays remain unimpaired by the diaphragm edge, whereas other light rays are removed from or filtered out of the light beam. This function can be realised by a mechanical diaphragm, but in principle also through electronically controllable liquid crystal arrays or LCD arrays.

At least two diaphragm edges which can be moved relative to each other are particularly preferably present to trim the illuminating light bundle between the holding device and the light source. The control device is adapted to position the at least two diaphragm edges in dependence upon the microscope setting and/or microscope configuration. Having regard to the reduction of scattered light, further improvements can hereby be achieved. In addition it can be useful, for certain positions of the effective entrance pupil, to have a further variably positionable diaphragm available.

A simple manufacture and a particularly good scattered light reduction are achieved if the diaphragms are offset relative to each other along the direction of the optical axis and the movement regions overlap each other.

The diaphragms preferably surround a central opening area completely. By moving the diaphragms, it is thereby possible to displace an area central point of the opening area transversely to the optical axis. This is achieved in a simple way according to an embodiment of the apparatus according to the invention with four diaphragms which each have a linear diaphragm edge. When using two diaphragms, curved or L-shaped diaphragm edges are preferred in such a way that the opening area between the diaphragms can already be completely surrounded with two diaphragms.

According to a further preferred embodiment of the apparatus according to the invention, one of the at least two diaphragm edges is formed by an iris diaphragm. Since, for many types of microscopes, at least some of the channels to be illuminated are round in shape, an iris diaphragm facilitates a good adaptation of the region illuminated by the light source to the channels of the microscope type to be illuminated.

For a microscope type having two channels to be illuminated, a good approximation can be realised through an iris diaphragm and two further diaphragms each having a linear diaphragm edge. The two linear edges trim the circle formed by the iris diaphragm on opposite sides so that merely the region between the two channels to be illuminated is unnecessarily illuminated.

According to a further preferred variant of the apparatus according to the invention the control device has a storage device, in which position settings of the at least one diaphragm edge are stored for positioning the at least one diaphragm edge in dependence upon a microscope setting and/or a microscope configuration. For this, advantageous positions can have been determined and stored in reference measurements with different microscope settings and/or microscope configurations. The stored position is adopted as soon as a currently used system environment has been detected with the means for enquiring concerning a microscope configuration and the means for enquiring concerning a microscope setting. The microscope configuration can thereby comprise the type of zoom body and the objective present in the optical path. The microscope setting can comprise the zoom position of the zoom body and the objective position (2D, 3D position).

According to a preferred variant of the apparatus according to the invention an operating element is present, via which position data concerning a set position of the at least one diaphragm edge can be stored in the storage device and retrieved by a user. Positions set individually by the user can thus advantageously be stored and later retrieved again.

Illuminating light which enters the optical system from locations outside of the entrance pupil, thus the microscope objective, cannot contribute there in the transmitted light brightness field image to the image itself but instead only to the scattered background. This is undesirable and gives rise to a further advantageous method variant, in which an illuminating area/source of the light source is adapted to an actually effective back-projection of the illuminating light. This means that parts of the illuminating area which cannot provide illuminating light contributing to the image are filtered out at the start. To this end, according to the apparatus according to the invention, at least one further diaphragm is advantageously present, which is positioned directly next to the light source, in order to vary an effective illuminating area.

Whether and to which extent improvements in contrast can be reached with an oblique illumination depends on the respectively examined specimen. In this context a further embodiment of the inventive apparatus is advantageous in which means for rotating the diaphragm edge about the optical axis are present. That means that the direction can be varied in which the middle beam direction is inclined relative to the optical axis in an oblique light illumination. If the inventive apparatus is used with a macroscope, thus the same is principally achieved as if rotating the specimen about the optical axis. A crucial advantages is here that the specimen as such can remain unvaried in the holding device and thus need not be modified in its position.

With regard to the imaging quality, contrast and brightness of the specimen, the results achieved depend strongly on the spatial position of the diaphragm edge as the illumination can be strongly varied and adjusted with the diaphragm edge.

In a particularly preferred embodiment of the inventive device for displacement of the diaphragm edge in the direction of the optical axis and the direction transverse to the optical axis, for instance, a carriage mechanism with a first carriage and a second carriage is present. For driving these carriages, step motors can be used which allow a precise positioning.

The method according to the invention can be realised in particular with the apparatus according to the invention for transmitted light illumination. For this, according to an advantageous variant of the microscope system according to the invention, a control device is present which is connected to components of the light microscope and the apparatus for transmitted light illumination and is adapted to control the microscope and the apparatus for transmitted light illumination to realise a method according to the invention.

According to a particularly preferred variant of the method according to the invention the diaphragm edge is positioned in a plane of an effective entrance pupil of the objective. In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

The positioning of the diaphragm edge in the plane of the entrance pupil thus opens up the possibility of achieving an inclined light illumination in that the diaphragm edge covers a part of the entrance pupil. It is particularly preferable for the diaphragm edge to trim the illuminating light bundle asymmetrically in these embodiments. This means that certain rays of the illuminating light are selected and result in an inclined light illumination. In practice, advantageous improvements in contrasting can thus be achieved.

According to a further preferred variant of the method according to the invention, different position settings of the diaphragm edge are offered to a user for a microscope setting used and/or for a microscope configuration used. The different position settings are optimised having regard to a respective illumination parameter, wherein the illumination parameters are a measure for an intensity gradient of a microscope image in a direction transversely to the diaphragm edge, an image contrast of the microscope image, a contrast range, image homogeneity and/or a shadow in the microscope image. A user can accordingly select whether the diaphragm edges are to be positioned for example for an optimal image contrast of the microscope image or for a minimum intensity gradient of the microscope image.

The different position settings can be determined beforehand by initially varying the position of the diaphragm edge along the direction of the optical axis of the objective and a microscope image being at least partially recorded for each position of the diaphragm edge along the direction of the optical axis. An illumination parameter is then determined for each microscope image and the position of the diaphragm edge along the direction of the optical axis, at which a curve of the illumination parameter plotted against the position of the diaphragm edge along the direction of the optical axis has a predetermined characteristic, is fixed and stored as an optimal position of the diaphragm edge. This characteristic can then be recorded for each relevant zoom position of the microscope. Intermediate positions can be interpolated later.

The position of the diaphragm edge, where the intensity gradient plotted against the position of the diaphragm edge along the direction of the optical axis has a zero passage, can be fixed as a position which is optimised having regard to an intensity gradient.

According to a preferred exemplary embodiment of the microscope system according to the invention, a motorised aperture diaphragm for setting an observation aperture is present in an imaging optical path of the light microscope and the control device is adapted to position the aperture diaphragm in dependence upon a position of the at least one diaphragm edge. The diaphragm position of the motorised aperture diaphragm can be determined for example via a coding. In order to improve contrast the observation aperture of the imaging system can be adapted to the illumination settings and, if required, be stored and reproduced with the illumination settings.

According to a further preferred variant of the microscope system according to the invention the light microscope has a coded objective changer. With this, it is output which objective is pivoted into the optical path of the light microscope. Magnification values and objective types of the objectives of the objective changer are stored in a memory of the microscope or of an external computer and can be enquired with the means for enquiring concerning a microscope setting.

The transmitted light illumination can advantageously be adapted with the method according to the invention and the apparatus according to the invention, in the case of a light microscope having changing entrance pupil, automatically to different object positions arising through the use of different accessories.

In order to arrange the sample support table, assembly means are provided according to the invention on the housing of the apparatus for transmitted light illumination. These assembly means can be configured in principle as desired provided that the sample support table is held with the assembly means in a defined position. For example the housing and a lower side of the sample support table can be formed suitably for a mechanical engagement with each other. For a particularly stable hold, screws, clamps, snap-on or magnetic connections are also possible.

A cost-effective extension of the field of use of the apparatus for transmitted light illumination can be provided with the sample support table. There is space inside the sample support table for accessories, for example for further light sources such as a ring light for dark field microscopy.

According to a preferred embodiment of the apparatus according to the invention, means are provided for identifying a sample support table and the control device is configured to position the diaphragm edge in dependence upon an ascertained identity of a sample support table. According to one configuration of the apparatus according to the invention, sample support tables of differing construction heights are present, of which one can be selected for mounting on the housing. Insofar as the control device is configured to determine the identity of a separate sample support table, it is also possible to distinguish between sample support tables of different heights.

Since, due to a separate sample support table, the object plane on which a sample to be examined is located is changed, an illumination of the objective used should correspondingly be adapted as much as possible. The control device is thus adapted according to the invention to position the diaphragm in dependence upon a determined presence of a separate sample support table.

For ideal illumination of the objective used, a positioning of the diaphragm within the sample support table can be useful. In case of a preferred embodiment of the apparatus according to the invention the control device is thus adapted to move the diaphragm edge out of the housing through the passage opening into the inner space of the sample support table. Collision between the diaphragm edge and the holding device of the sample support table can thus be avoided because through the detection of the identity of the sample support table the position of the holding device is also known.

According to a preferred embodiment of the device according to the invention the control device is adapted to move the diaphragm edge through the passage opening of the housing if the means for determining the presence of a sample support table actually determine the presence of a sample support table. If accessories are introduced into the sample support table which cover a movement space of the diaphragm edge, it can be provided that the control device also considers further accessories in the positioning of the diaphragm edge in order to avoid collisions.

According to a particularly preferred variant of the method according to the invention the diaphragm edge is positioned in a plane of an effective entrance pupil of the objective.

In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

An IDFII film (image directing film) with an asymmetrical prism structure can preferably be utilised which is used in combination with a homogeneously irradiating light area. This can preferably be achieved via a surface light with a directed radiation characteristic, for example a PHLOX area light. The IDFII film can preferably be inclined and/or mounted rotationally azimuthally.

According to a particularly preferred embodiment of the apparatus according to the invention, accessories can be inserted in the sample support table, in particular a ring light for dark field microscopy. In addition means for determining the presence of accessories inserted into the sample support table are present and the control device is adapted to position the diaphragm edge in dependence upon a determined presence of accessories introduced into the sample support table. The diaphragm edge can thus advantageously also be positioned outside of the housing if there are no accessories there. A collision between the diaphragm edge and the accessories can hereby be avoided.

According to a further preferred variant of the apparatus according to the invention it is provided that assembly means for at least one adapter plate are present to influence the illuminating light beam, in particular for a polarisation filter, a colour filter, a diffuser and/or a diaphragm, as well as means for determining the presence of an adapter plate and the control device is adapted to position the diaphragm edge in dependence upon a determined presence of an adapter plate. The assembly means for the adapter plate can be formed for example as a recess or push-in opening on the passage opening of the housing. A utilised adapter plate is hereby arranged below the holding device of the housing. In this case, even when the sample support table is in place, the table inner space is not available to the diaphragm. The control device thus delimits a permitted movement space of the diaphragm edge to a region within the housing that ends directly in front of the adapter plate. The control device can also be adapted to consider a direction influence of the illuminating light beam caused by the adapter plate and to move the diaphragm edge to another position compared to a case without an adapter plate. Suitable positions of the diaphragm edge can be previously determined by measurements and stored in a memory of the control device.

Means are preferably also present to determine the identity of accessories inserted in the sample support table and the control device is adapted to position the diaphragm edge in dependence upon a determined identity of accessories inserted in the sample support table.

In addition it is preferable for means to be available to determine an identity of an adapter plate and for the control device to be adapted to position the diaphragm edge in dependence upon a determined identity of an adapter plate. It is thus advantageously possible to distinguish between different accessories and/or different adapter plates and for a permitted movement space for the diaphragm edge to be determined in dependence upon the dimensions of the identified adapter plate and/or the identified accessories.

According to a particularly preferred embodiment of the apparatus according to the invention the means for determining the presence and in particular identity of a sample support table, the means for determining the presence and in particular identity of accessories inserted in the sample support table and the means for determining the presence and in particular identity of an adapter plate respectively comprise a magnetic field sensor, in particular a Hall sensor. In principle, however, other sensors, for example pressure sensors, optical sensors or capacitive proximity switches, can also be used. The means for determining the presence of a sample support table and the means for determining the identity of a sample support table can thus be formed by the same device, namely a magnetic field sensor. The same applies having regard to the determination of the presence and identity of accessories and the adapter plate.

According to a variant according to the invention a distinction can be made between different sample support tables in that they are equipped with magnets of differing strength. The control device is then adapted to distinguish the sample support tables using the magnetic field strength determined by the Hall sensor. Instead of magnets with differing strength, the magnets can also be arranged on the sample support tables in such a way that, in a set-up state of the sample support table, they come in differing vicinity of the Hall sensor. Similarly it is possible to distinguish between different accessories and between different adapter plates.

According to a further preferred embodiment of the apparatus according to the invention, using the means for variable positioning of the diaphragm edge in the direction of the optical axis and the means for variable positioning of the diaphragm edge in a direction transverse to the optical axis, the diaphragm edge can be rotated about a rotation axis which is transverse to the optical axis. In comparison with displacement in the direction of the optical axis, through a rotation the space requirement of the diaphragm is advantageously smaller in a plane transverse to the optical axis. It is thereby also possible to move the diaphragm edge through a comparatively small passage opening. The size of the passage opening is generally orientated to the size of usual transparent object supports, for example glass plates with an outer diameter of 120 mm, and cannot be selected to be as large as desired.

Accordingly in a preferred variant of the method according to the invention it is provided that in order to move the diaphragm edge through the passage opening, the diaphragm edge is rotated about a rotation axis transverse to the optical axis. The diaphragm edge is thus completely moved through the passage opening while the diaphragm as a whole is only guided in part through the passage opening.

According to a further preferred embodiment of the method according to the invention, in order to determine a position of the diaphragm edge, particularly after switching on the apparatus for transmitted light illumination, said diaphragm edge is moved into a reference position. The starting position is unknown here. In order to avoid a collision between the diaphragm edge and the holding device, the diaphragm edge is thereby moved about a rotation axis, which is transverse to the optical axis, in a direction away from the sample to be examined. Subsequently the diaphragm edge can be moved out of the illuminating light beam into the reference position. Through rotation, the diaphragm edge is moved approximately parallel to the optical axis in the direction towards the light source. If the diaphragm edge is located in the unknown starting position outside of the housing, the diaphragm edge is thus moved initially along the optical axis through the passage opening into the housing without colliding with the housing or the holding device.

According to a further preferred variant of the method according to the invention, if the diaphragm edge has been moved through the passage opening into the sample support table and it is ascertained with the means for determining the presence of a sample support table that the sample support table has been removed, the diaphragm edge moves back into the housing. In a situation in which the diaphragm edge has been moved out of the housing, however, but no sample support table is put in place, there is a risk of the user injuring himself on the diaphragm edge. This risk is avoided by the diaphragm edge moving automatically back into the housing.

Alternatively, according to a likewise preferred variant of the method according to the invention it is provided that, if the diaphragm edge has been moved through the passage opening into the sample support table and it is determined with the means for determining the presence of a sample support table that the sample support table has been removed, movement of the diaphragm edge is blocked. The risk of injuries through the diaphragm edge is hereby reduced.

It is particularly preferable for means to be present for enquiring concerning a microscope setting and/or a microscope configuration. Settings of the at least one diaphragm edge, further diaphragms and/or further optical components are then carried out in an automated manner in dependence upon a determined configuration of existing, in particular, optical components. For example it can be automatically recognised which objective is actively set and which zoom position is set.

According to a microscope system according to the invention a storage device is provided for this purpose, in which settings of the transmitted light device and the light microscope, in particular the at least one diaphragm edge, are stored.

According to a preferred exemplary embodiment of the method according to the invention it is provided that a microscope setting and/or a microscope configuration is/are enquired and that using the microscope setting and/or the microscope configuration an optimal diaphragm position is determined. It is also provided that a presence of a sample support table, a presence of accessories introduced into the sample support table and/or a presence of an adapter plate are determined and, from this information, an available movement space of the diaphragm edge in the direction of the optical axis is determined and the diaphragm edge is positioned in the available movement space as close as possible to the optimal diaphragm position. The wording "as close as possible" is to be understood to mean that the diaphragm edge is positioned at the optimal diaphragm position if the optimal diaphragm position lies inside the available movement space and that, if the optimal diaphragm position lies outside of the available movement space, the diaphragm edge is positioned at an end of the available movement space adjacent to the optimal diaphragm position.

A microscope configuration usefully comprises at least one type of a zoom system and/or a selected objective.

A microscope setting contains at least one zoom magnification and/or a position of a selected objective.

In case of knowledge of the objective used, a zoom body used and an magnification set with the zoom position, the diaphragm edge can be moved to an optimal position which can be predetermined and stored for the objective—zoom body combination. The optimal position can correspond in particular in the direction of the optical axis to the position of the effective entrance pupil. At this position, the illuminating beam path of the light microscope has a waste.

The optimal diaphragm position can be stored for the respective microscope setting and/or microscope configuration and be determined for example through trials. By way of judging criterion of an optimal diaphragm position, different illumination parameters can be used, in particular a lighting homogeneity, an image contrast and/or shadow in the microscope image.

According to a modified variant of this exemplary embodiment according to the invention, a prism film can additionally be brought into the beam path. This comprises a plurality of prisms, with which the illuminating light beam is deflected in the known way. The prism film can then be moved precisely into the beam path of the illuminating light beam if the optimal position lies outside of the available movement space.

In this variant of the method according to the invention it is thus provided that a microscope setting and/or microscope configuration can be enquired, that using the microscope setting and/or the microscope configuration an optimal diaphragm position is determined, that the presence of a sample support table, the presence of accessories introduced into the sample support table and/or the presence of an adapter plate are detected and thus an available movement space of the diaphragm edge in the direction of the optical axis is determined. It is also provided that it is checked if the optimal diaphragm position lies within the available movement space, that, if the optimal diaphragm position lies outside of the available movement space, a prism film is moved into the illuminating light beam, and that, if the optimal diaphragm position lies in the available movement space, the diaphragm edge is positioned at the optimal diaphragm position.

Further advantages and features of the apparatus according to the invention, the method according to the invention and the microscope system according to the invention are explained below by reference to the drawing, in which:

BRIEF DESCRIPTION OF THE DRAWINGS

FIG. 39: shows a schematic sketch to illustrate the working principle of the prism film;

FIG. 40: shows a detailed view of FIG. 39;

FIG. 49: shows a table of ideal illuminations of different microscope types;

FIG. 50: shows a table with diaphragm forms for the different microscope types;

Similar components and those which work similarly are provided with the same reference numerals in the drawings. Reference is also made to the list of reference numerals at the end of the description.

DETAILED DESCRIPTION OF THE INVENTION

Figure 3:
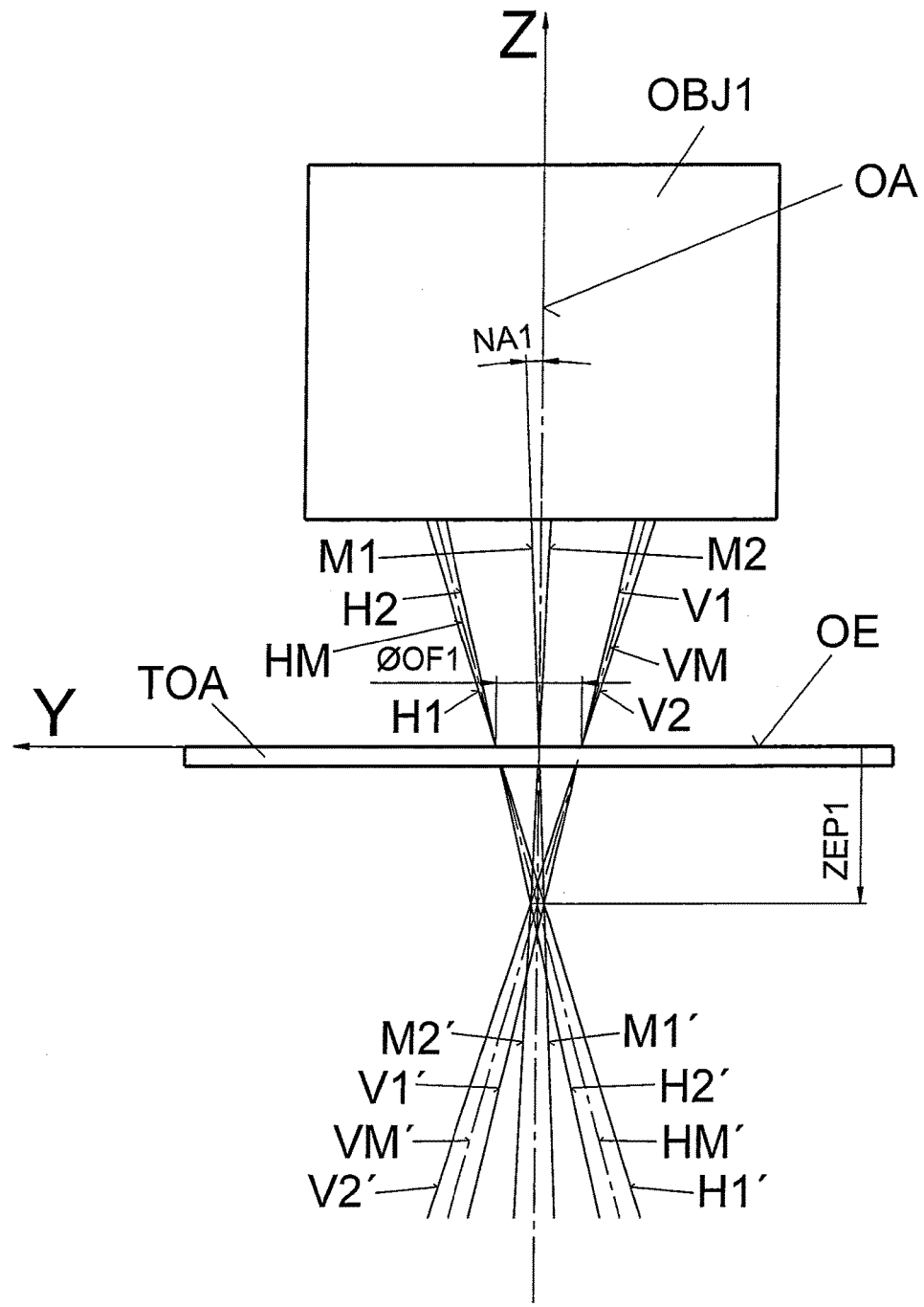
FIG. 3: shows an overview of essential components of the beam path in an apparatus with a first objective according to the invention in a side view.
Figure 4:
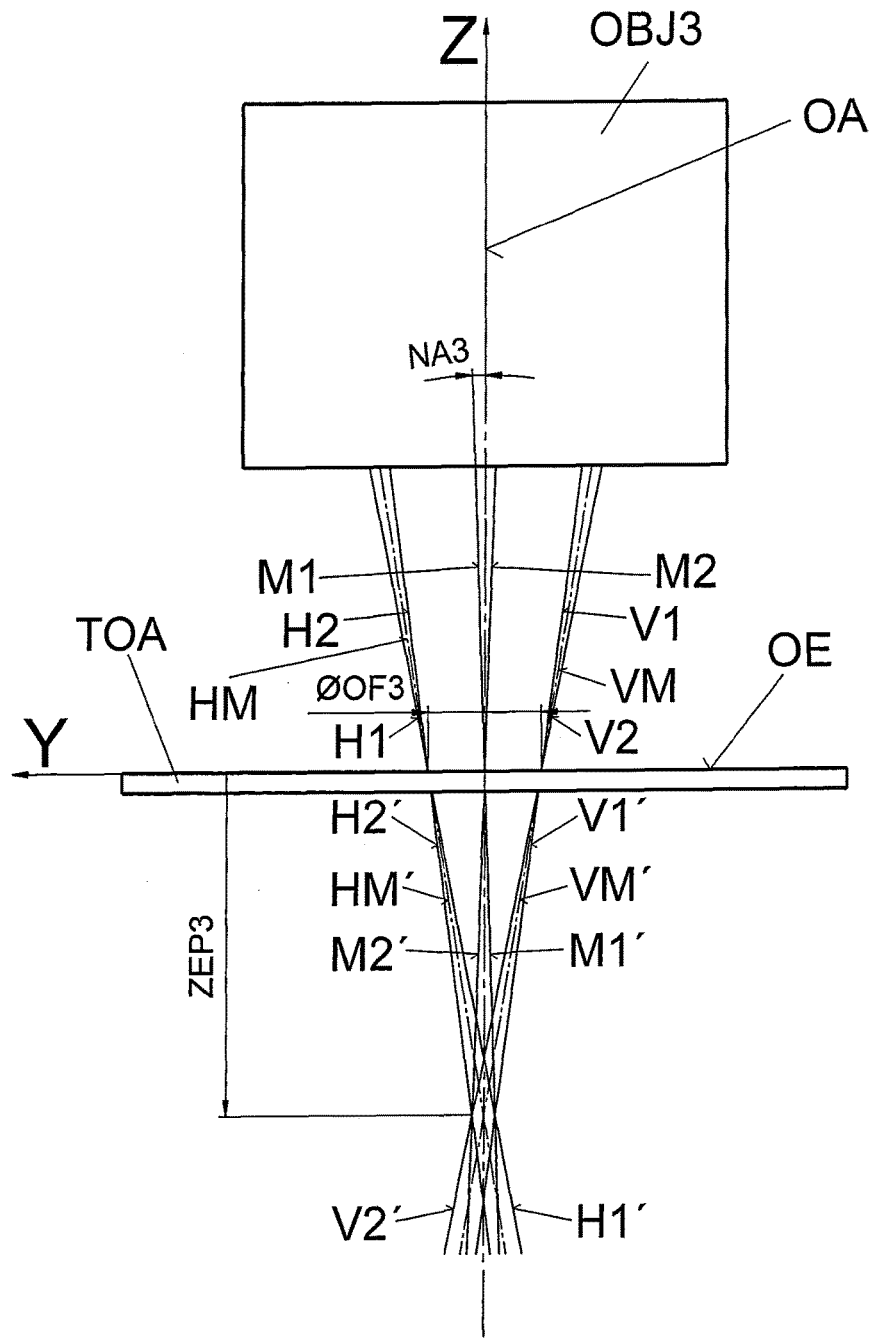
FIG. 4: shows an overview of essential components of the beam path in an apparatus with a second objective according to the invention in a side view.
Figure 5:
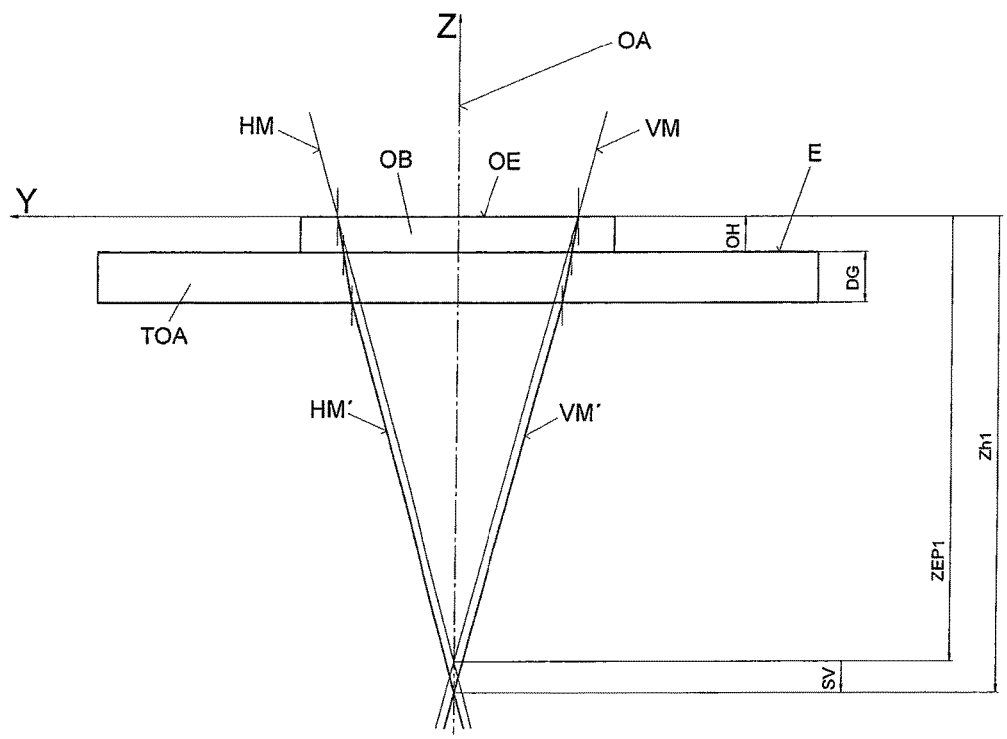
FIG. 5: a schematic for explaining effects of an objective on the beam path in a side view.

The FIGS. 3 to 5 describe the propagation of certain rays and the position of the entrance pupil as well as the influence of the object support TOA and/or the zoom setting on the position of the entrance pupil.

From the known data of different objectives OBJ1, OBJ2, OBJ3, the outermost rays/edge beams on the image side can be determined and depicted together with a back projection of these imaging outermost rays back into the illumination area, each in conjunction with a motorized zoom body MZK.

Figure 1:
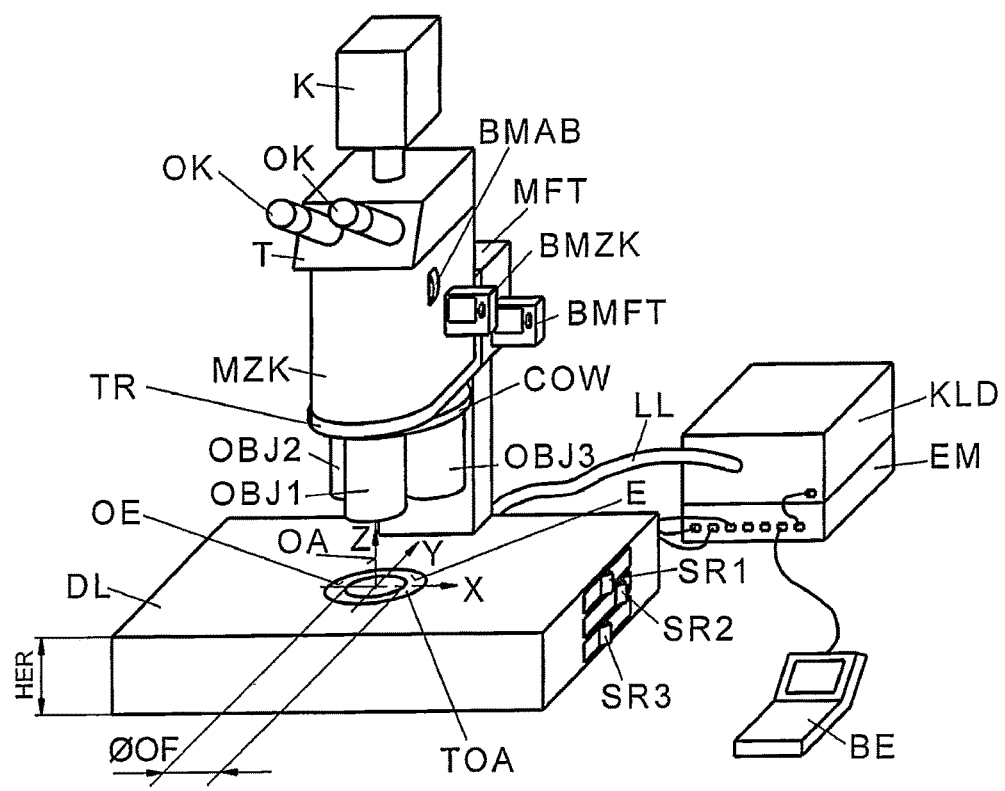
FIG. 1: shows a microscope system according to the prior art.
Figure 2:
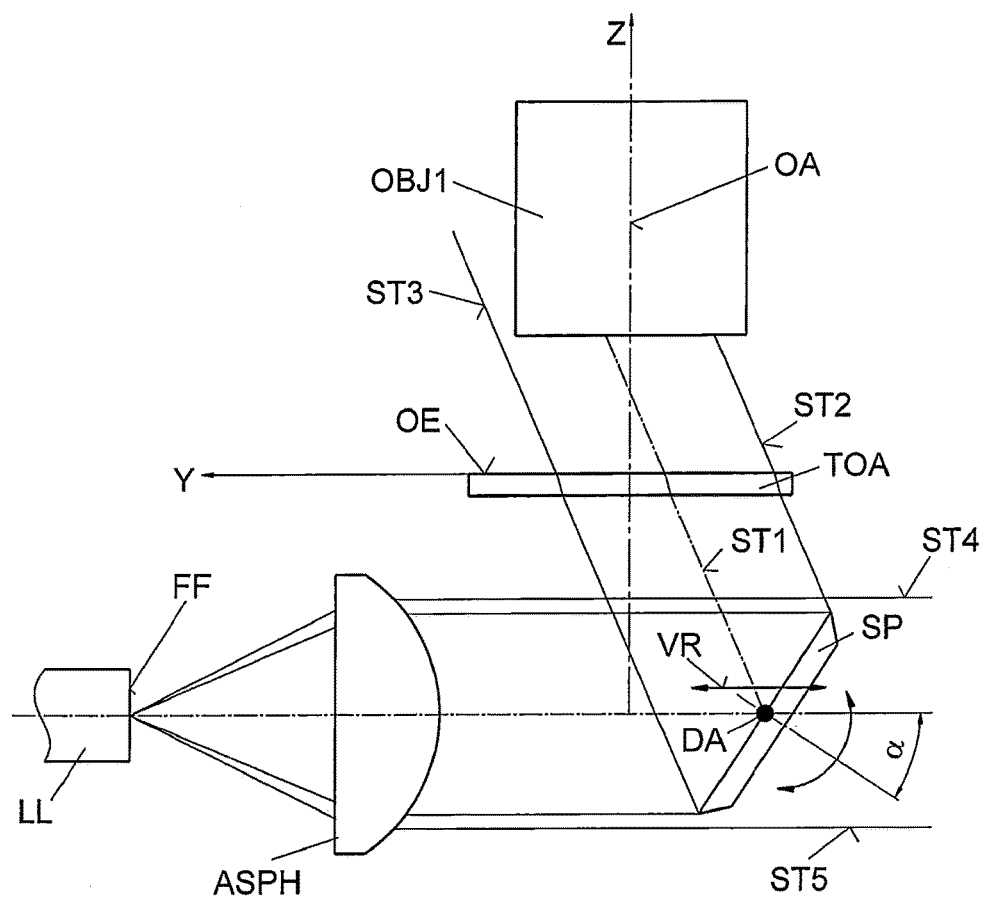
FIG. 2: shows a sketch to illustrate a transmitted light device according to the prior art.

FIG. 3 shows the side view of the beam path with the objective OBJ1 of FIG. 1, which, together with the motorised zoom body MZK (not shown in FIG. 3) and the currently effective zoom factor β, has a numerical aperture NA1, an object field diameter OF1 in the object plane OE and a Z coordinate of the entrance pupil ZE1. The coordinate system with the axes X, Y and Z aids orientation.

Starting from the object plane OE, the boundary light beams are shown which are particularly relevant for the description of the illustration through the depicted lens OBJ1.

The light beams H1 and H2 as well as the middle light beam HM start from the rear object field edge, wherein the light beams H1 and H2 represent the theoretical aperture limitations of the objective OBJ1 as shown with the effective zoom factor β. Correspondingly the light beams V1, V2 and VM start from the front object field edge, and designate the theoretical aperture limits of the objective OBJ1 shown for the momentarily effective zoom factor β and the middle light beam VM.

In practical use there is generally a transparent object support TOA which produces, due to the refraction index differences and thickness, a beam offset, thus an extension of the actually effective optical distances. Both the optical effectiveness of the transparent object support TOA with a thickness DG and a refractive index nG as well as the corresponding optical properties of the object OB with an object height OH and a refractive index nO must be considered, see FIG. 5. Local curvatures of the object OB and/or refractive index fluctuations, for example through air bubbles inclusions etc., also lead to a change in the optical path and are to be considered in principle. The necessary form of consideration of an idealised homogeneous plane-parallel object OB which lies on a likewise idealised homogeneous plane-parallel transparent object support TOA is shown in FIG. 5 by the middle light beams VM and HM.

All light beams projected back into the illumination space retain their own name. Merely an apostrophe is added in each case to indicate consideration of the beam offset through the transparent object support TOA and the object OB. The middle light beams in the image space VM and HM thus result, in consideration of the beam offset SV according to FIG. 5, in the light beams VM' and HM' projected back into the illumination space.

Due to the passage through the idealised transparent object support TOA and the idealised plane-parallel object, the middle light beams VM' and HM' projected back into the illumination space do not intersect at a distance ZEP1 from the object plane OE or from the upper side of the transparent object support TOA but at a distance Zh1. There is thus a beam offset SV in Z direction which can easily be calculated on the basis of the known properties of TOA, namely thickness and refractive index transitions and while disregarding the properties of the object OB.

The following formula applies in air:

$$SV=DG*(nG-1)/nG$$

In case of a typical thickness of for example DG=4 mm and nG=1.5, this results in a beam offset SV=1.3 mm.

This calculation applies, however, only for an idealised transparent object support TOA without an object OB and works on the basis of the known optical data. During practical use, the object OB is frequently surrounded by further media, for example Petri dishes with nutrient solutions etc. The object itself may also be optically inhomogeneous and/or may have local curved surfaces or inclusions, meaning that the correlations become even more complicated. The simplification mentioned above leads to errors which are non-negligible in many cases. The beam offset SV cannot thereby be correctly calculated in most cases. This means that also Zh1 is usually not exactly known and must be empirically determined. If one considers that the object support TOA has a non-negligible thickness DG, the object OB has an optically effective thickness and the pupil is not a well-defined planar surface in case of the usual zoom microscopes, this results in an effective entrance pupil, the distance of which from the object surface OE Zh1 is displaced with respect to the Z coordinate of the idealised entrance pupil ZEP1.

Analogously to FIG. 3, FIG. 4 shows a front view of the ray propagation with the objective OBJ3 of FIG. 1, which has—together with the motorised zoom body MZK not shown in FIG. 4 and the actually effective zoom factor β—a numerical aperture NA3, a object field diameter OF3 in the object plane OE and a Z coordinate of the entrance pupil ZEP3. Due to the cost-optimised objective—zoom body combinations OBJ1 with MZK, and OBJ3 with MZK, typical in stereomicroscopy and macroscopy, there are no corrected pupil planes fixed over the zoom region and no guaranteed suitability for polarisation optical methods. The values of ZEP1 and ZEP3 lie correspondingly far from each other and move with the zoom factor β as a rule with different strengths. When using a coded objective changer COW according to FIG. 1, it is possible for an identical object on an identical transparent object support TOA to be assumed for different objectives OBJ1 and OBJ3 in a stereo microscope system. Therefore, Zh1 and Zh3 (not shown in FIG. 3) of the second and third objective—zoom body combination OBJ2 with MZK and OBJ3 with MZK have corresponding differences. Due to the unclearly defined pupil positions Zh1, the differences are not compulsorily identical.

In addition, there are no defined entrance pupils which are fixed during zooming in the case of the described typical low-priced objective—zoom body combinations OBJ1 with MZK and OBJ3 with MZK. The fulfilment of such a requirement would have clearly made the optical design and the objective construction more difficult. This would have led at least to the objectives being more expensive and to a possibly unacceptable construction size, even if a solution to this were found at all. There are thus in practice no planar fixed-location entrance pupils with the usual minimised image errors. The entrance pupils are thus greatly deformed and migrate upon variation of the zoom factor β and the position of the entrance pupils depends greatly upon the light wavelength. The influences mentioned above are already considered in FIG. 5 via the position of the effective entrance pupil Zh1.

In case of an image recorded through the right channel R of the objective OBJ1 with the arrangement according to FIGS. 3 and 5, the contrast without further means is very weak, structures and/or phase differences are as good as unrecognisable. The image has, on the other hand, great homogeneity in relation to brightness.

In a first embodiment the problem is solved by providing a diaphragm in the body of the transmitted light cover which can be displaced in the direction of the optical axis of the observation system. This diaphragm can be set with different zoom positions to the position of the effective entrance pupil of the optical system. Different contrast effects can be achieved through a displacement perpendicular to the optical axis.

Figure 6:
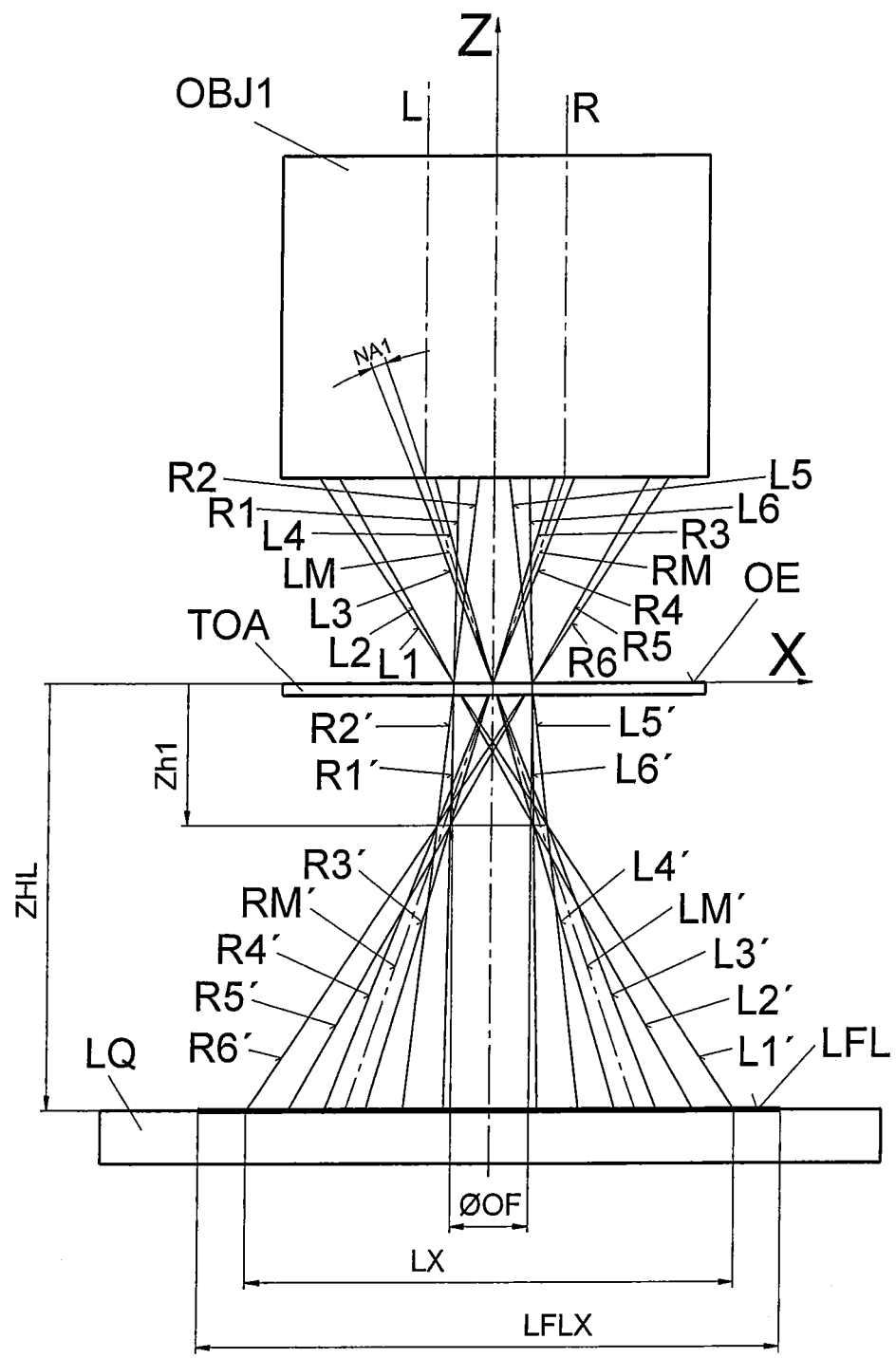
FIG. 6: shows essential components of the beam path in an apparatus according to the invention in a front view.
Figure 7:
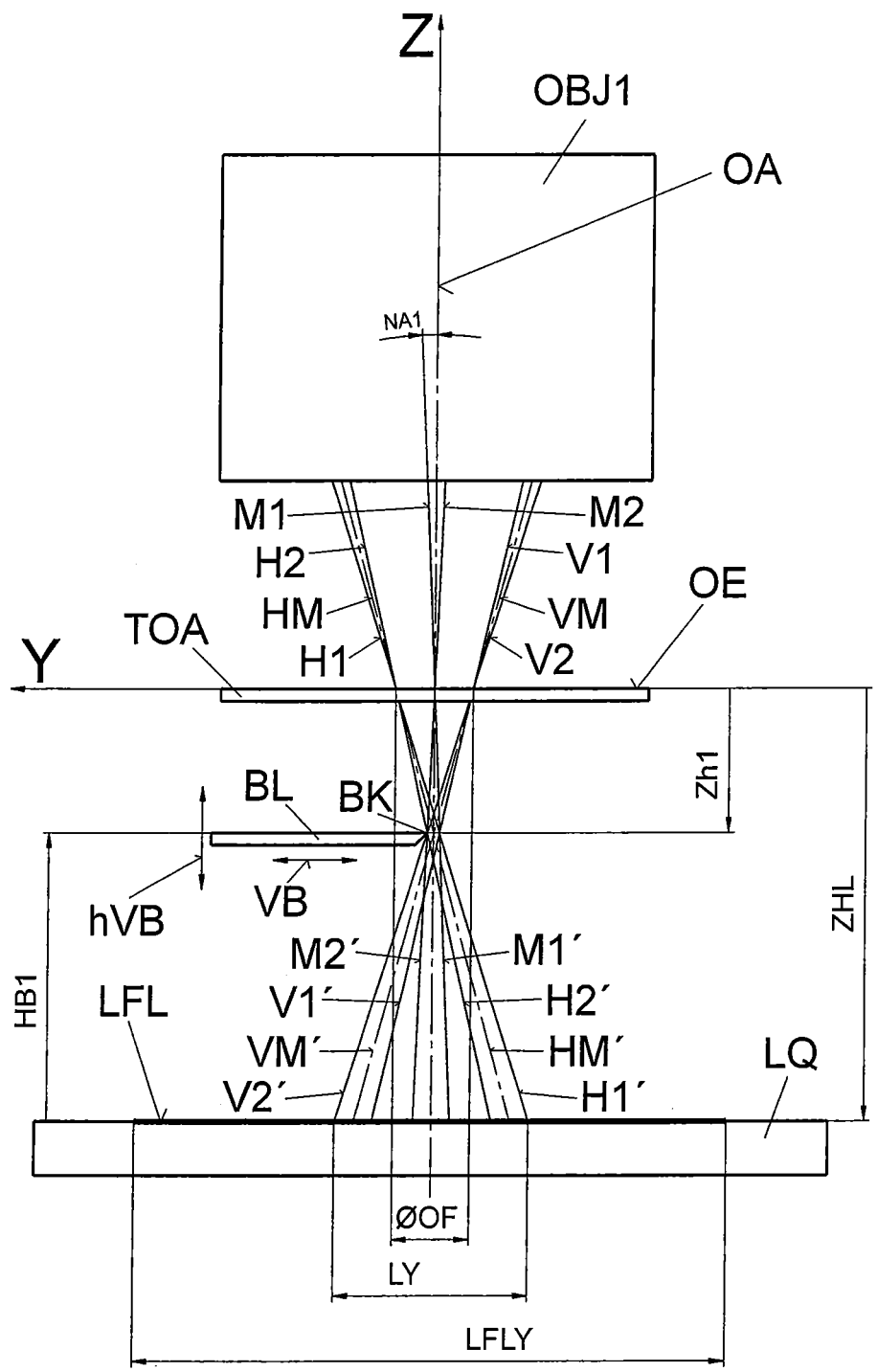
FIG. 7: shows essential components of the beam path in an apparatus according to the invention, which is inserted into a stereo microscope, in a side view with a diaphragm edge.

FIG. 6 shows the front view, FIG. 7 the side view from the left of an arrangement according to the invention. The coordinate system with the axes X, Y and Z aids orientation. R1 to R6 are right light rays/beams in FIG. 6, and L1 to L6 designate left light beams.

FIG. 7 shows the boundary light beams starting from the object plane OE or the top side of the transparent object support TOA, which boundary light beams are particularly relevant to the description of the imaging of the depicted objective OBJ1. HB1 is a height distance in FIG. 7 from the illuminating area LFL to the diaphragm BL in the ideal z-position of the diaphragm for the objective OBJ1 at the zoom body MZK with the momentarily zoom factor β.

The light beams H1 and H2 and the middle light beam HM come from the rear object field edge, wherein the light beams H1 and H2 represent the theoretical aperture limitations of the depicted objective OBJ1 with the momentarily effective zoom factor β. NA1 refers to the objective aperture of the objective OBJ1 in FIGS. 6 and 7.

Similarly, the light beams V1, V2 and VM come from the front object field edge, wherein V1 and V2 identify the theoretical aperture limitations of the objective OBJ1 shown with the currently effective zoom factor V1 and V2. VM is a middle light beam.

All light beams projected back into the illumination space retain their respective name. Merely an apostrophe is added to indicate consideration of the beam offset SV. The middle light beams in the image space VM and HM thus result, in consideration of the beam offset through the transparent object support TOA according to FIG. 7, in the light beams VM' and HM' projected back into the illumination space. In FIGS. 5, M1 and M2 identify middle light beams.

According to the invention an adjustable diaphragm BL with a diaphragm edge BK is arranged in the installation space between the object plane OE or the upper side of the transparent object support TOA and the light surface LFL of a light source LQ, cf. FIG. 7. This diaphragm BL can be adjusted in height, i.e. set along the shift direction hVB in such a way that the diaphragm edge BK lies in an ideal Z diaphragm position Zh1 for the currently active objective OBJ1 in combination with a zoom body MZK, on which a current zoom factor β is set. It can be seen in FIG. 7 that this setting has already taken place, wherein this is only an idealised representation for the purpose of illustration of the principle.

As already set out, the entrance pupils of most objectives are not fixed in position on zoom systems, mainly for cost reasons, and do not comply with any special quality requirements. This leads to the position and form of the entrance pupil not being clearly defined. It is in part also highly dependent upon the light wavelength. The actual beam path is thus clearly more complex and correspondingly complicated to illustrate. In order to describe the main mode of operation, therefore, only the idealised beam path is used.

Due to the abovementioned complex conditions and further unknown influences of the object OB and its environment such as for example the transparent object support TOA, Petri dish with nutrient solution (see description to FIG. 5), practical trials to determine and/or set the ideal Z diaphragm position Zh1 are indispensable. Mainly on account of the unknown influences of the object OB and its environment, a suitable operating element is preferably provided, for example an adjust scroll wheel SADJ, is provided to allow the client to vary the diaphragm position perpendicular to the object plane OE.

The ideal diaphragm position is characterized in that at least one diaphragm BL can be freely positioned with at least one linearly extending diaphragm edge BK between the light source LQ and the object plane OE parallel to the surface normal of the object plane OE in the direction hVB and in at least one direction VB perpendicular thereto. The diaphragm BL with diaphragm edge BK can thus be brought through movement in direction hVB of the surface normal of the object plane OE in order to homogenise the illumination into an ideal diaphragm position Zh1, in which it can be optimally adjusted to the currently effective imaging system. The imaging system comprises a zoom body MZK with the current zoom factor β, an objective OBJ1, an object OB and possibly a transparent object support TOA. The contrast strength can be adjusted by displacing the diaphragm BL with the diaphragm edge BK perpendicular to the surface normal of the object plane OE in the direction VB, wherein the diaphragm edge BK is orientated parallel to the object plane OE and perpendicular to the displacement direction VB for the contrast level variation. In principle, no further means for homogenisation of the lighting are provided or required.

When the ideal Z diaphragm position Zh1 has been set, the distance between the lighting surface LFL and the diaphragm BL is then HB1; the distance ZHL results according to FIG. 7 from ZHL=Zh1−HB1.

It can be seen in FIGS. 6 and 7 that the light area LFL of the light source LQ has an extension LFLX in X direction and IFLY in Y direction. For a vignetting-free homogeneous illustration using the objective OBJ1 shown with the momentarily effective zoom factor 6, however, only the light area extensions LX in X direction and LY in Y direction are required.

Ideally, the light field dimensions LFLX and LFLY are selected to be at least large enough to allow a vignetting-free homogeneous lighting for each objective under all imaging conditions arising. The form of the light area can hereby be adapted to the actually effective back-projection of the light beams. This then results approximately in an ellipsis with large half-axis in the X direction during 3D observation, or a circle during 2D observation. 2D observation is hereby intended to mean single-channel observation of the sample. 3D observation is correspondingly observation with two channels.

By moving the diaphragm BL positioned at a distance Zh1 from the object plane OE or from the upper side of the transparent object support TOA in the displacement direction VB, the diaphragm BL can be brought into the illumination beam path with the diaphragm edge BK in such a way that certain light beams can be filtered out. The diaphragm is preferably moved along the Y axis as it then acts for the left channel L and the right channel R equally. FIG. 6 shows that a movement of the diaphragm (not shown) at a distance Zh1 in the X direction would not filter out the light beams of the two channels evenly. This would result in unsuitable illumination for 3D images. If the diaphragm BL with the diaphragm edge BK is brought into the illuminating beam path according to FIG. 7, that is to say by moving at a distance Zh1 from the object plane OE or from the top side of the transparent object support TOA, in the displacement direction VB, it does not only act on both channels evenly but instead also on all points of the object field.

According to the arrangement of the diaphragm BL in FIG. 7, the diaphragm edge BK contacts the back-projected light rays V2' and H2' which come from the opposing object field edges. All back-projected light beams are thus contacted between the opposing object field edges by the diaphragm edge BK. If the diaphragm BL is pushed further into the illumination beam path, this results in an even cover of illuminating light beams over the object field, that is to say the lighting remains homogeneous with decreasing brightness, whereby the contrast clearly improves. This was confirmed through practical trials. The further operation and effects will be described in detail with the following figures with an idealized depiction of the beam propagation.

Figure 8:
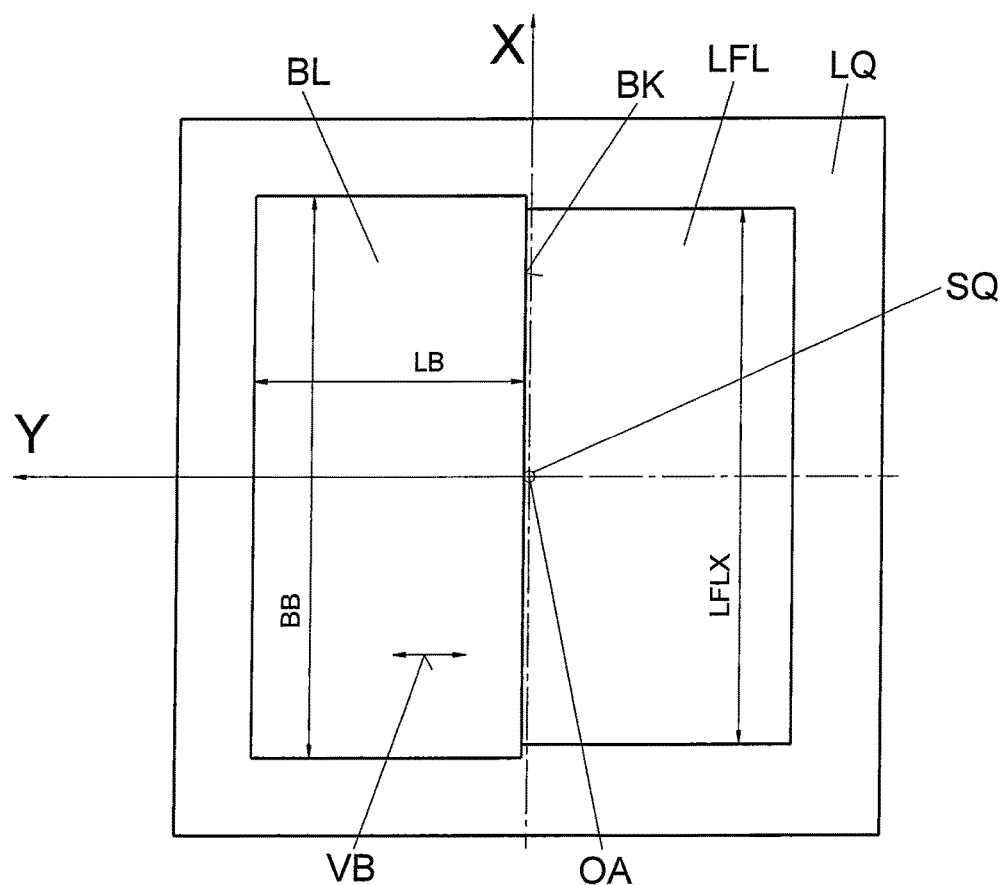
FIG. 8: shows a top view of a light source and a diaphragm.

FIG. 8 shows as a top view the position of the diaphragm BL with a diaphragm edge BK, the effective diaphragm length LB and the effective diaphragm width BB in relation to the light source LQ with a light area LFL and the XYZ coordinate system.

The diaphragm BL with the diaphragm edge BK has been set through displacement along the adjusting directions hVB and VB in such a way that the diaphragm edge BK is located in the ideal Z diaphragm position Zh1, wherein it is placed against the beam cross-section of the image edge beams projected back into the illumination space. In FIG. 8, the beam cross-section in the ideal diaphragm position Zh1 is identified by a circle SQ which is tangential relative to the diaphragm edge BK, that is to say the diaphragm edge BK does not yet trim the beam cross-section.

Figure 9:
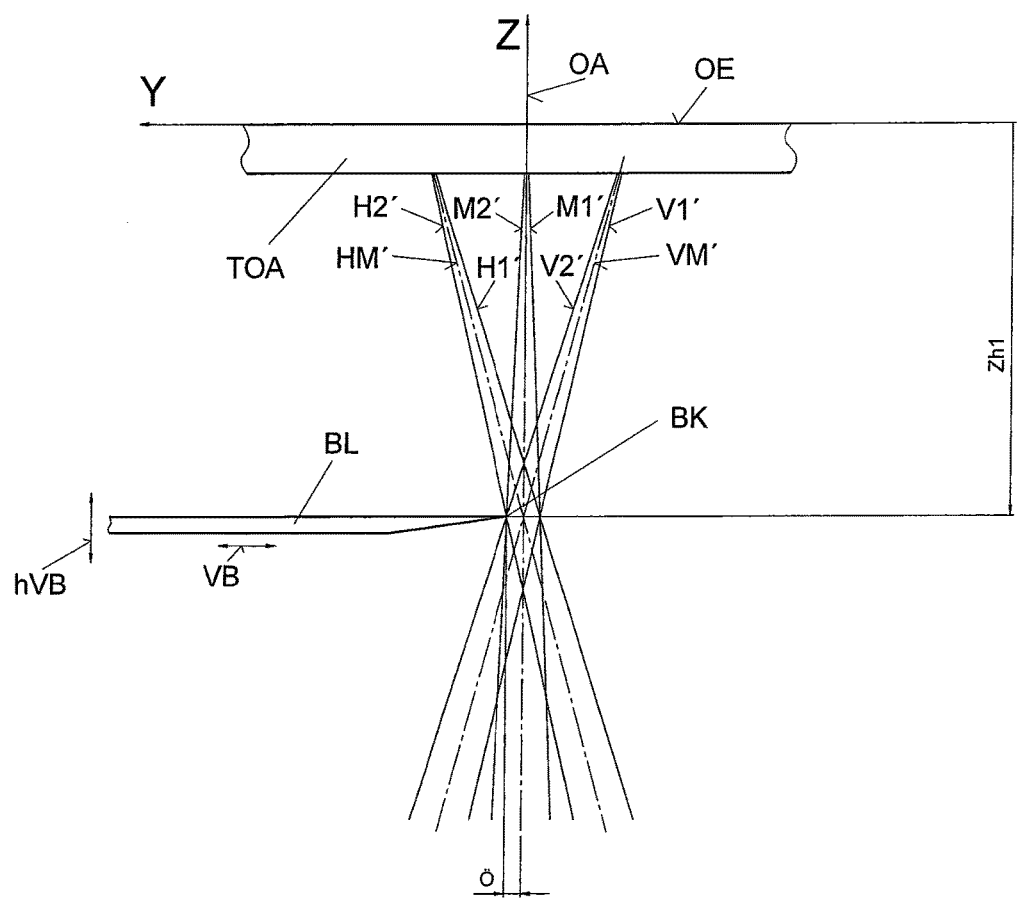
FIG. 9: shows, in a side view, a situation where the diaphragm edge is arranged in the plane of the effective entrance pupil and is tangential relative thereto.
Figure 10:
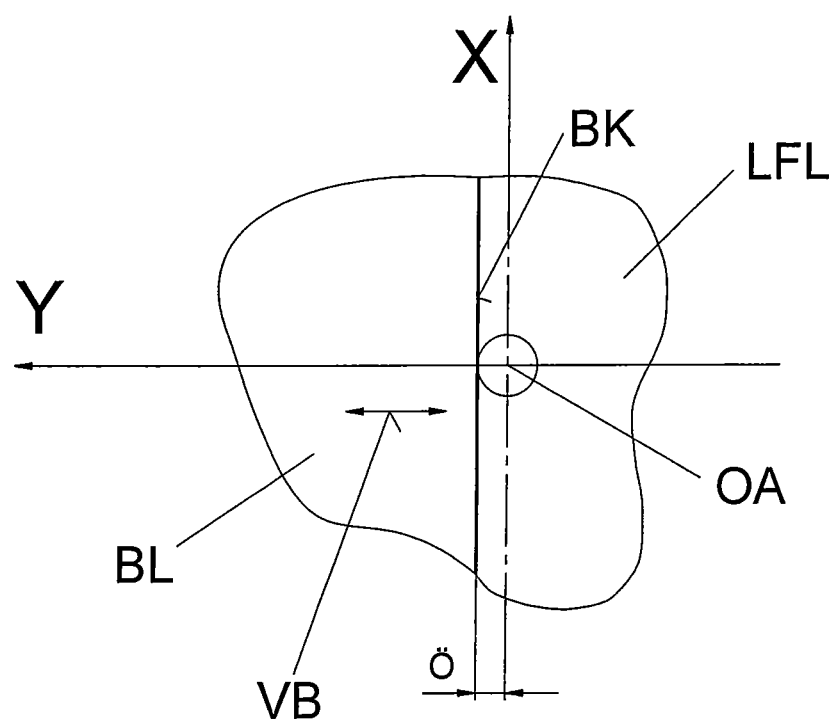
FIG. 10: shows, in a top view, the situation of FIG. 9.

In FIGS. 9 and 10, which are enlarged detailed illustrations of FIGS. 7 and 8, the opening distance Ö between the radius of the beam cross-section at the level of the ideal Z diaphragm position Zh and the optical axis OA, which is not yet trimmed in this case by the diaphragm edge BK, is additionally illustrated.

In the case an image recorded through the objective OBJ1 with the arrangement according to FIGS. 7 to 10, the contrast with the diaphragm edge BK put in place is still relatively weak. However, further bubbles which are phase objects and do not actually belong to the sample can already be seen in an outline. The image still has a very homogeneous brightness.

Similarly to FIGS. 9 and 10, FIGS. 11 and 12 show detailed views of the arrangement according to the invention with a diaphragm setting changed through the displacement in the adjusting direction VB. According to FIGS. 11 and 12 the diaphragm edge BK is still in the ideal Z diaphragm position Zh1. However, it is now positioned closer to the optical axis OA so that a reduced opening distance ÖR is produced between the diaphragm edge BK and the optical axis OA, that is to say the opening distance Ö is trimmed. According to FIG. 11, the beams H2', M2' and V2' are thereby filtered out, that is to say the whole object field is evenly affected, the image remains homogeneous but it becomes richer in terms of contrast.

Figure 11:
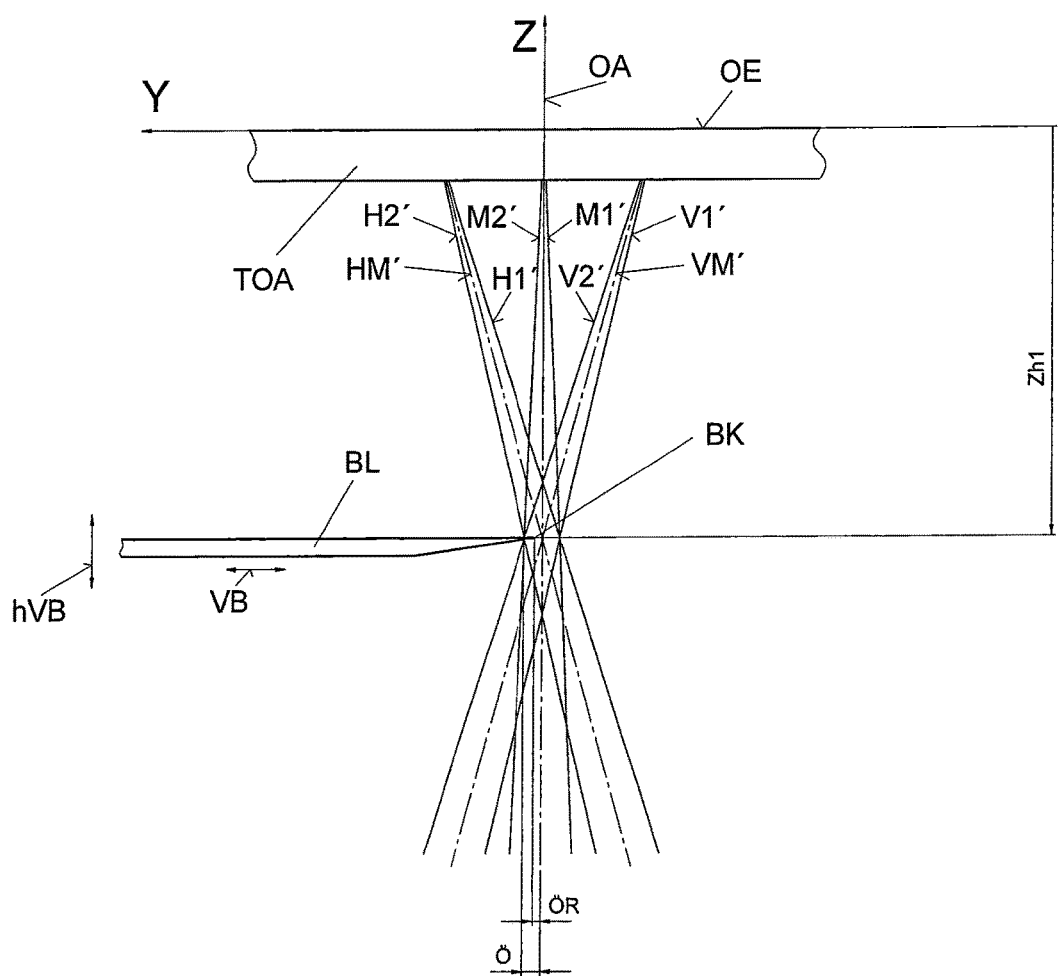
FIG. 11: shows, in a side view, a situation where the diaphragm edge is arranged in the plane of the entrance pupil and the beam cross-section is trimmed.
Figure 12:
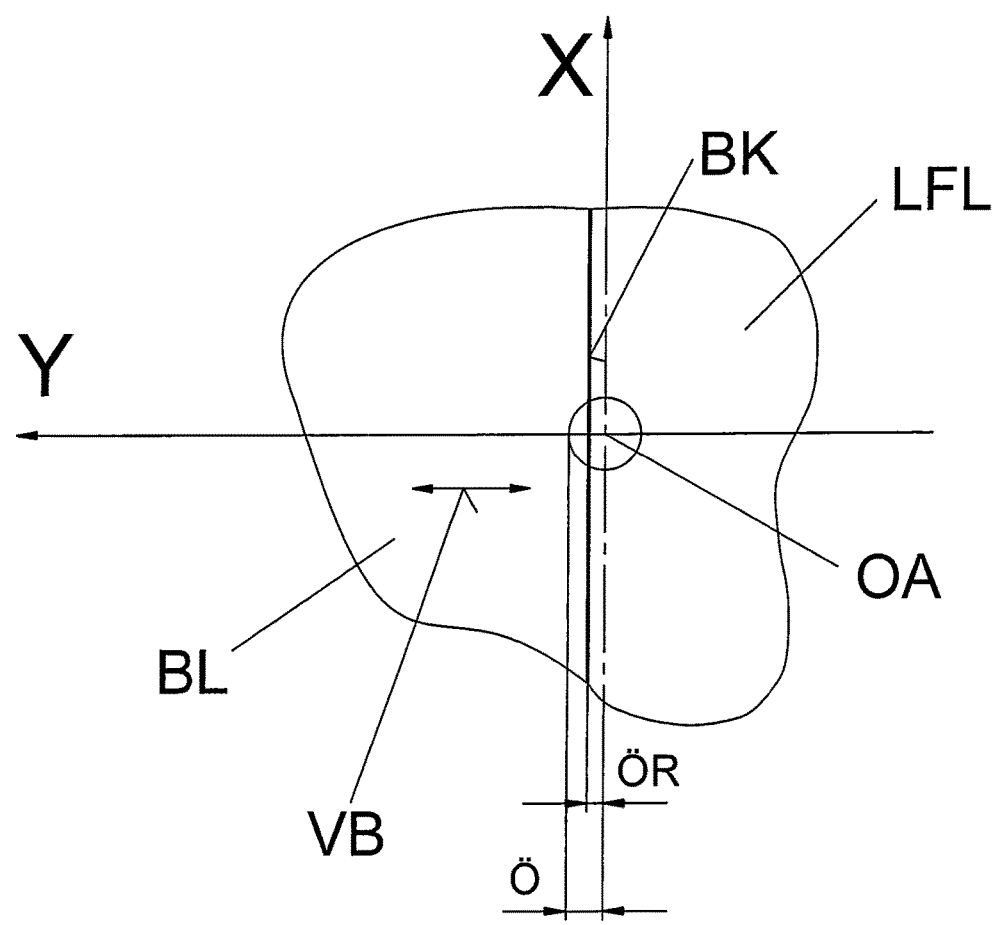
FIG. 12: shows, in a top view, the situation of FIG. 11.

In the case of an image recorded through the objective OBJ1 with the arrangement according to FIGS. 11 and 12, the contrast has already clearly improved. Some image details which consist of phase objects can already be very clearly recognised. In addition, inner structures of the sample are already visible. Nonetheless, the image still has a very homogeneous brightness.

Figure 13:
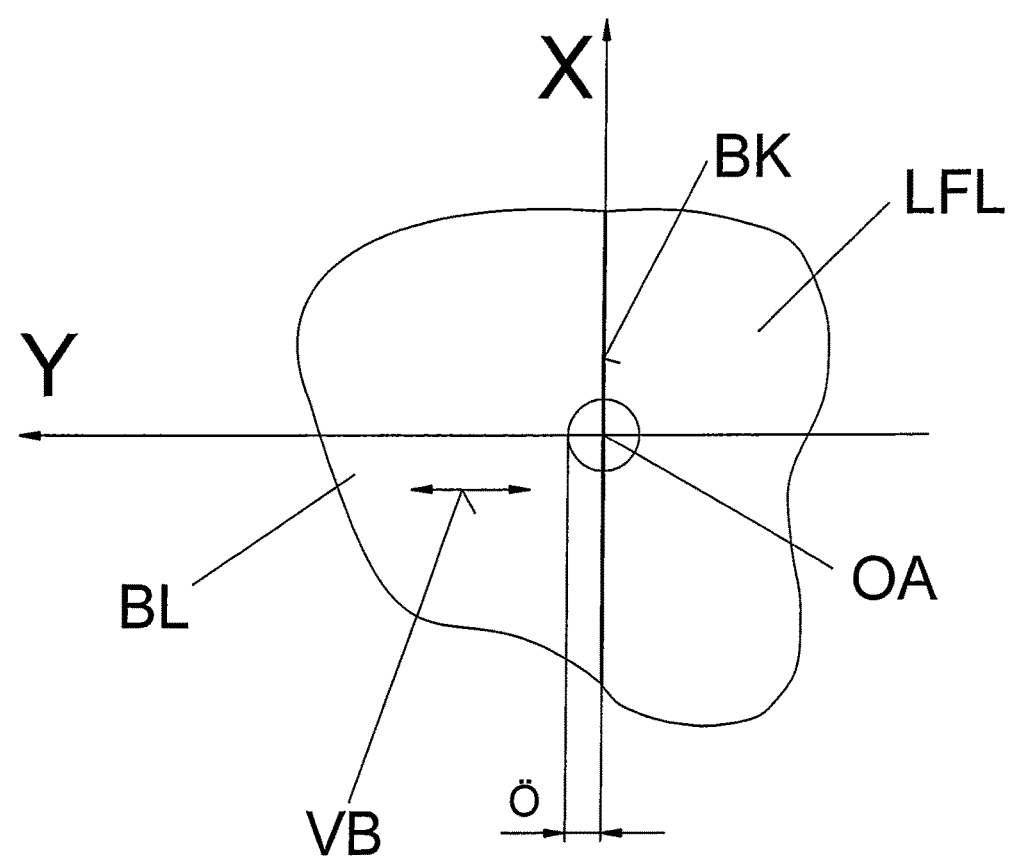
FIG. 13: shows, in a further top view, a situation in which the diaphragm edge is displaced further in the direction of the optical axis and is still arranged in the plane of the entrance pupil.

Similarly to FIG. 12, FIG. 13 shows a detailed view of the arrangement according to the invention with a diaphragm setting changed through the displacement in the adjusting direction VB. According to FIG. 13 the diaphragm edge BK is still in the ideal Z diaphragm position Zh1. However, it now contacts the optical axis OA so that there is, in practical terms, no reduced opening distance ÖR between the diaphragm edge BK and the optical axis OA, that is to say the opening distance Ö is completely covered. The explanations are still valid that have been already been given with respect to FIG. 11, i.e., from the covering through the diaphragm BL the whole object field is uniformly affected. The image remains homogenously, but it acquires a slightly better contrast.

In the case of an image recorded through the objective OBJ1 with the arrangement according to FIG. 13, the contrast has slightly improved compared with the image recorded with the settings shown in FIGS. 11 and 12. In spite of this, the image still has a very homogeneous brightness.

Figure 14:
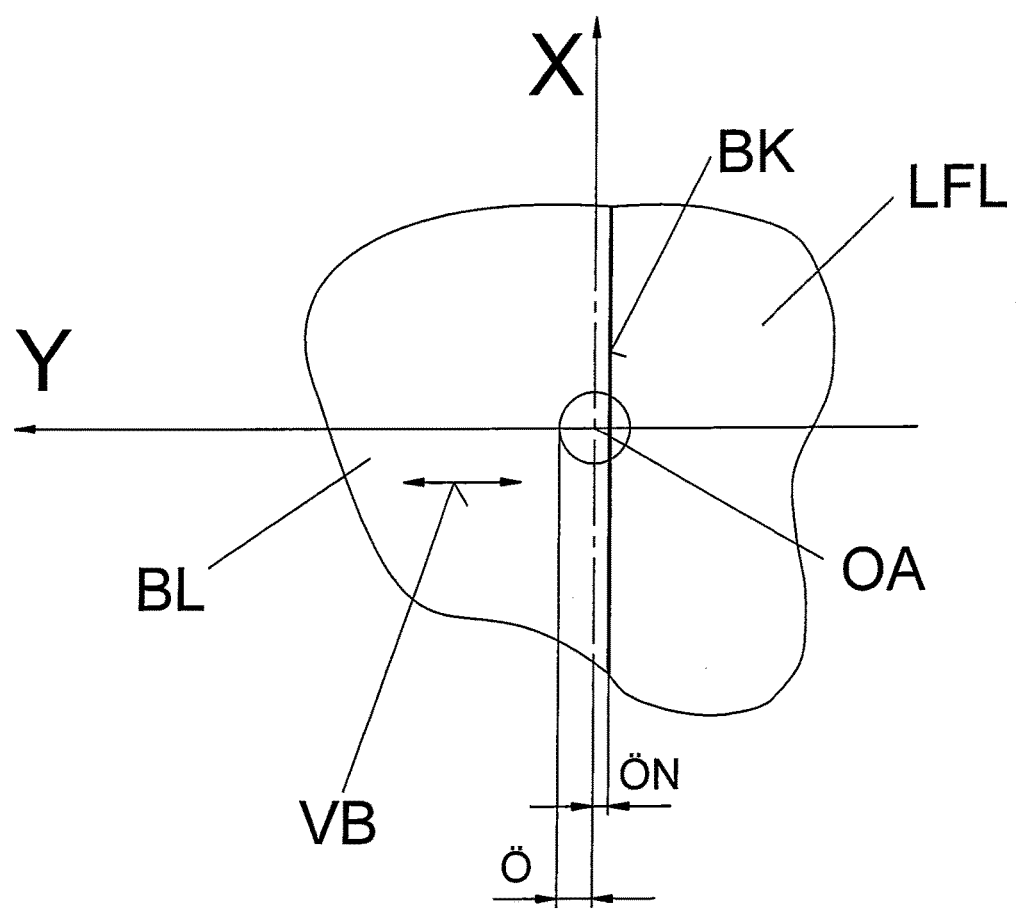
FIG. 14: shows, in a top view, a situation in which the diaphragm edge, in comparison with FIG. 13, has been displaced beyond the optical axis and is still positioned in the plane of the entrance pupil.

Similarly to FIG. 12, FIG. 14 shows a detailed view of the arrangement according to the invention with a diaphragm setting changed through the displacement in the adjusting direction VB. According to FIG. 14, the diaphragm edge BK is still in the ideal Z diaphragm position Zh1. However, it now covers the optical axis OA completely so that a negative opening distance ÖN results between the diaphragm edge BK and the optical axis OA, that is to say the diaphragm edge BK lies on the opposite side of the beam cross-section, wherein the negative opening distance ÖN still lies within the beam cross-section which is characterized by a radius with the value Ö. The explanations are still valid that have been already been given with respect to FIG. 14, i.e., from the covering over the diaphragm BL the whole object field is uniformly affected. The image remains homogenously, but it acquires a slightly better contrast.

In the case of an image recorded through the objective OBJ1 with the arrangement according to FIG. 14, the contrast has slightly improved, with the diaphragm BL pushed into the optical path as far as the optical axis OA, compared with the image recorded with the settings shown in FIG. 13. Nonetheless the image still has a very homogeneous brightness.

Figure 15:
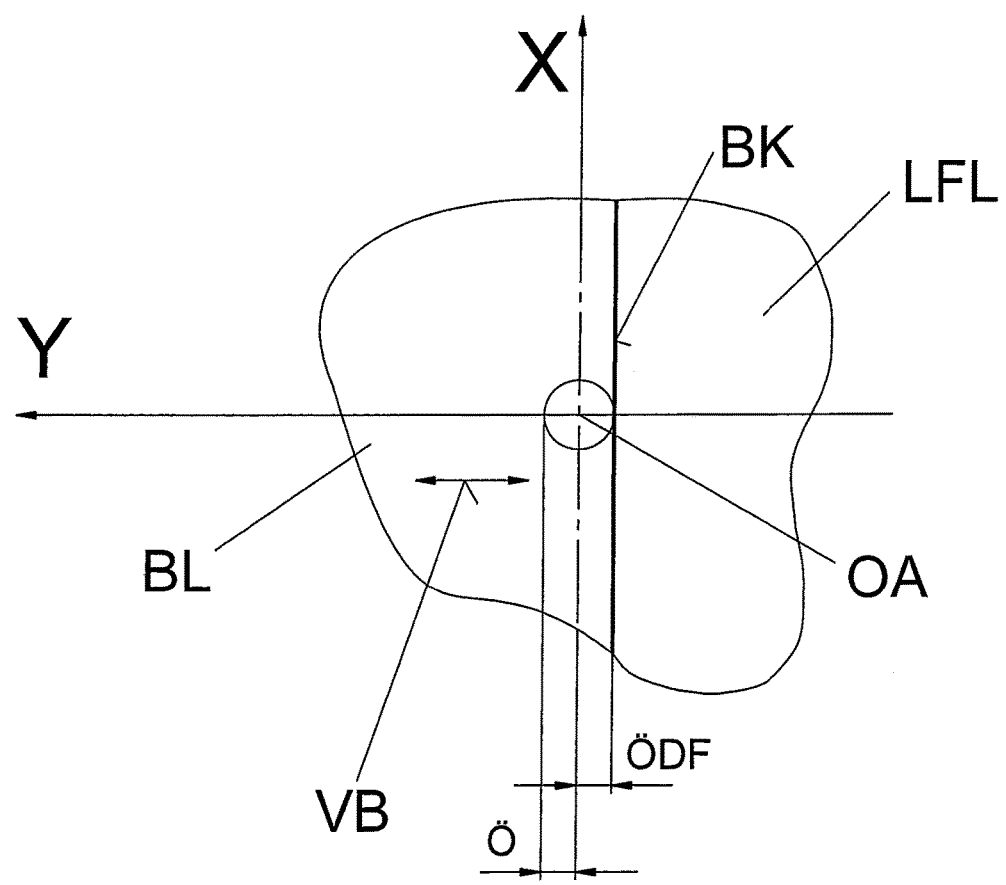
FIG. 15: shows, in a top view, a situation in which the diaphragm edge completely covers the beam cross-section.

Similarly to FIG. 14, FIG. 15 shows a detailed view of the arrangement according to the invention with a diaphragm setting changed through the displacement in the adjusting direction VB. According to FIG. 15, the diaphragm edge BK is still in the ideal Z diaphragm position Zh1. However, it now covers not only the optical axis OA, but also the whole beam cross-section with the radius value Ö completely so that a negative opening distance ÖDF is produced between the diaphragm edge BK and the optical axis OA which has already reached the threshold for a dark field illumination. Therefore, no direct illuminating light enters the objective OBJ1. Only the light portions mainly scattered, deflected, refracted and/or reflected through the object OB can enter the objective, that is to say the background without object influence appears dark. The image also remains homogeneous here. The dark field contrast is relatively good.

In the case of an image recorded through the objective OBJ1 with the arrangement according to FIG. 15, the image character with the diaphragm BL completely covering the beam cross-section has completely changed in relation to the image recorded with the settings as shown in FIG. 14. The background is now very much darker than the optically effective portions of the object OB. In spite of this, the image still has a very homogeneous brightness. The contrast is relatively good.

When observing via the oculars OK with a maximum size of the field of vision according to FIG. 1, very good results are likewise achieved. In order to demonstrate the functioning via a comparably large field of vision, the previously described images were recorded with a camera arrangement K providing an atypically large image field. In stereomicroscopy and macroscopy, camera arrangements K with smaller image fields are normally used.

The entrance pupils of most objectives on zoom systems are mainly not fixed in place in their Z position for cost reasons and are not subject to any special quality provisions. This leads to the position and form of the entrance pupil not being clearly defined. It is in part also greatly dependent upon the optical wavelength. Due to these complex relationships and further unknown influences of the object OB and its environment, for example a transparent object support TOA, Petri dish with nutrient solution etc., the actual contrasting of the image by the movement of the diaphragm BL together with the diaphragm edge BK in the direction VB parallel to the object plane OE cannot be completely described by the idealised optical paths described above. The poorer the quality of the entrance pupil, that is to say the further the actual conditions deviate from the ideal conditions, the more the diaphragm can be visible on the image edge unilaterally as slight vignetting.

By moving the diaphragm BL together with the diaphragm edge BK in the direction VB parallel to the object plane OE, a contrast variation of the image can be produced in any case in the ideal diaphragm position Zh1 which can be set by moving the diaphragm BL together with the diaphragm edge BK in the direction hVB perpendicularly to the object plane OE. An increasing coverage of the beam cross-section in the direction VB thereby increases the contrast until the image assumes a dark field characteristic with complete coverage of the beam cross-section. Shortly before the transition region between the bright field characteristic and the dark field characteristic, the contrasts are particularly strong. With regard to the vignetting-free homogeneity of the image brightness, the maximum usable contrast increase through a displacement of the diaphragm BL with diaphragm edge BK in the direction VB is practically defined by the optical relations of the combination of zoom body MZK and objective OBJ1 together with the quality of the actual entrance pupil. For a combination of zoom body MZK and objective OBJ1 with typical moving entrance pupils, deformed entrance pupils and entrance pupils having other aberrations, however, the method is optimally suited even in the case of the largest possible fields of vision.

Figure 16:
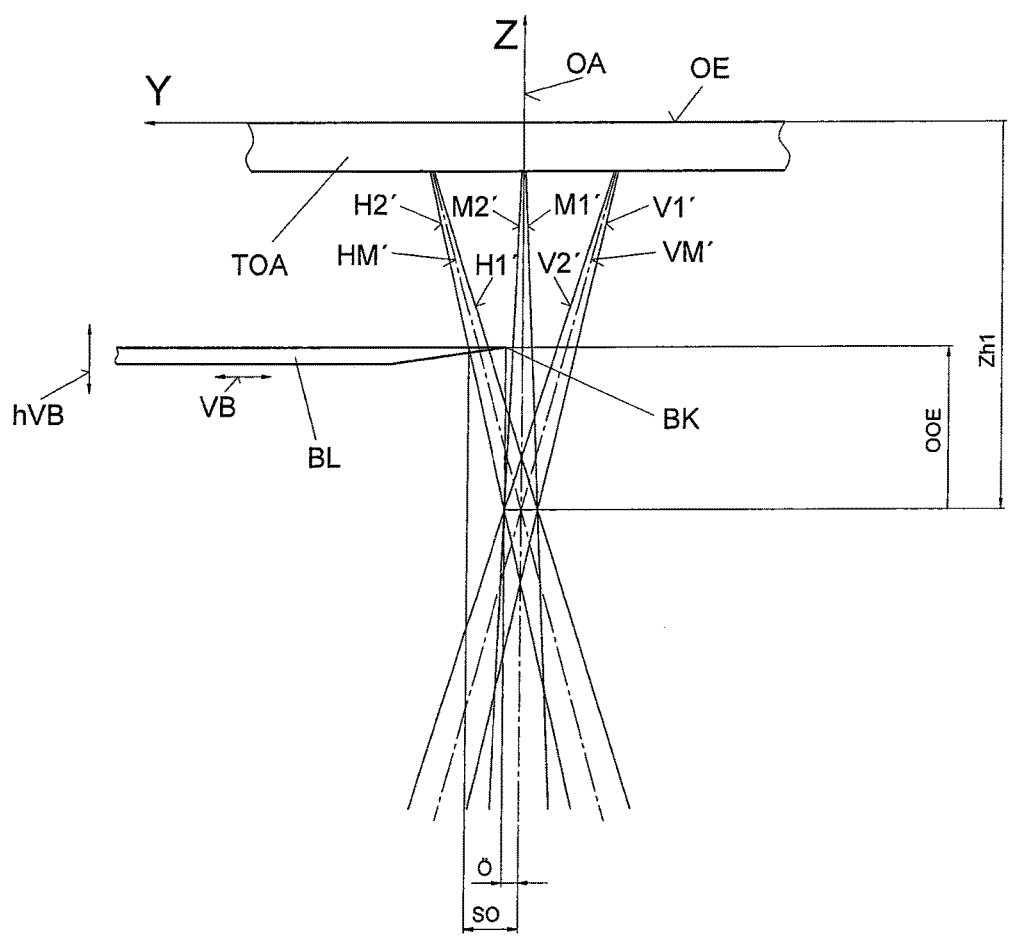
FIG. 16: shows, in a side view, a situation, in which the diaphragm edge is positioned closer than the effective entrance pupil to the object plane.
Figure 17:
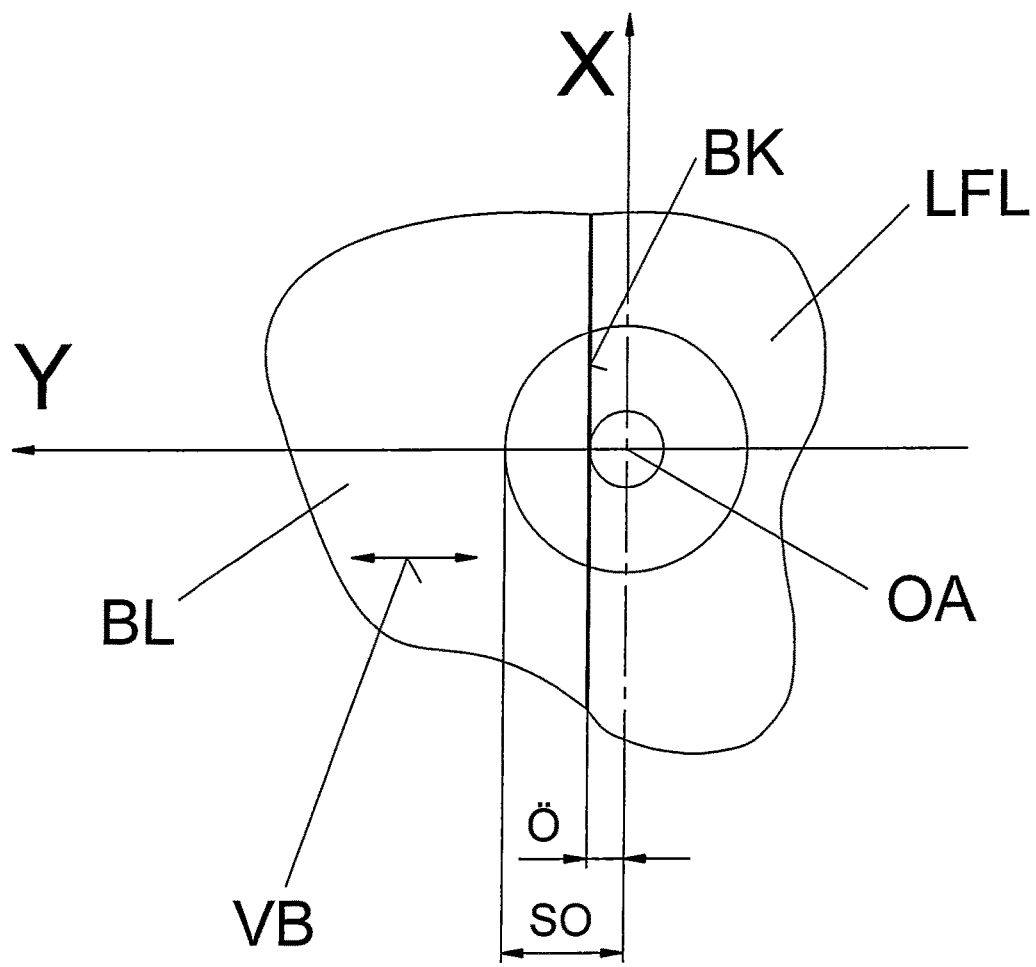
FIG. 17: shows, in a top view, the situation of FIG. 16.

Analogously to the FIGS. 9 and 10, the FIGS. 16 and 17 show details of the arrangement of the invention, however with a diaphragm setting that is altered by the displacement in the setting direction hVB. According to the FIGS. 16 and 17, in the direction VB parallel to the object plane OE, the diaphragm edge BK is still at the edge of the beam cross-section, which is characterized by the open distance Ö as a radius of the beam cross-section at the level of the ideal Z diaphragm position Zh1 around the optical axis OA. However, the ideal diaphragm position Zh1 is not set as the diaphragm BL is displaced with the diaphragm edge BK in the setting direction hVB by the displacement path OOE too near to the object plane OE. The light beams H1', HM' and H2' are thereby completely filtered out. As all these light beams are to illuminate the rear object field edge and as hardly any further light beams for illumination of the other object field are filtered out, only the rear object field edge appears dark, that is to say the image is non-homogeneous having regard to brightness.

In order to provide the diaphragm edge BK only on the outer edge of the beam cross-section in the diaphragm position Zh1+OOE set deviating from the ideal Z diaphragm position Zh1, it would have to be opened further onto the opening space SO. As the diaphragm BL with the diaphragm edge BK would not, however, then be in the ideal Z diaphragm position Zh1, the function of the contrast method according to the invention would no longer be provided.

Figure 18:
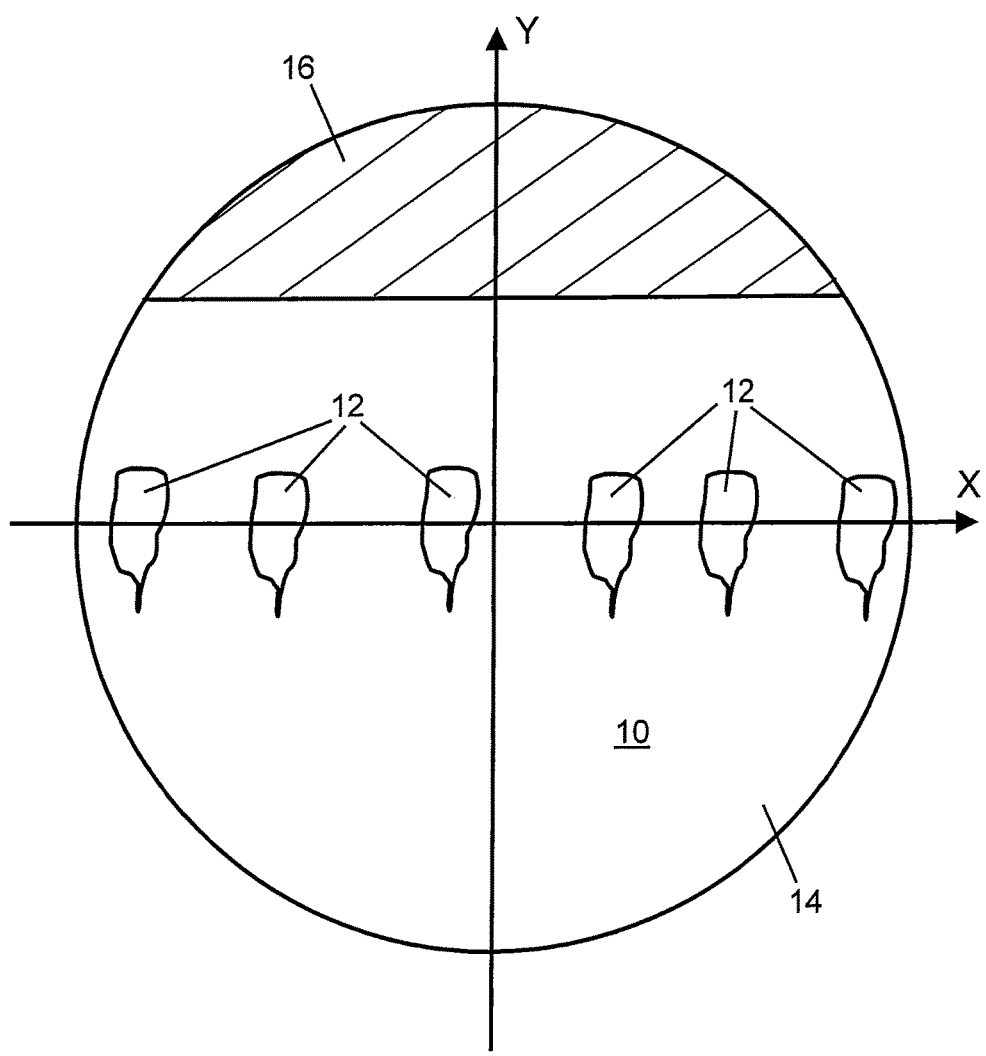
FIG. 18: shows, in a schematic illustration, an image obtained if the diaphragm edge is too close to the object plane.

FIG. 18 shows schematically the image of a camera K which has been taken by the objective OBJ1 with the arrangement according to FIGS. 16 and 17. For the purpose of orientation the XY coordinate axes are included from the object plane OE.

The brightness differences are shown schematically in the image of the camera K in FIG. 18. The upper image edge, that is to say the rear region of the object field in the positive half space of the Y axis appears dark. As the Y coordinate becomes smaller, the image becomes brighter.

The image seen by the camera is identified in FIG. 18 with the reference numeral 10. In addition, a sample to be examined is shown schematically, whereby it is a matter in the example shown of preparations 12 of zebrafish. If the diaphragm edge (BK) is closer than the entrance pupil to the object plane, the image darkens from the positive y direction. This is shown schematically in FIG. 18 through the region 16.

Figure 19:
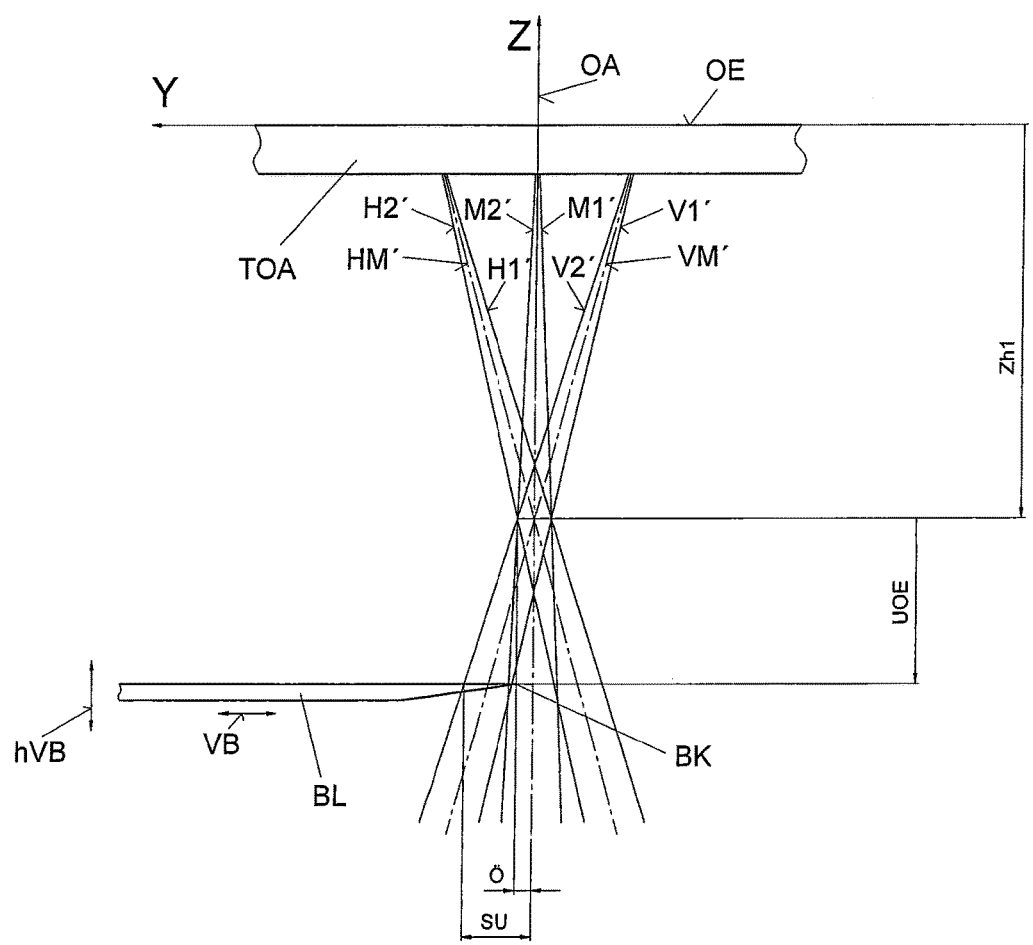
FIG. 19: shows in a side view a situation in which the diaphragm edge is further away from the objective plane than the entrance pupil.
Figure 20:
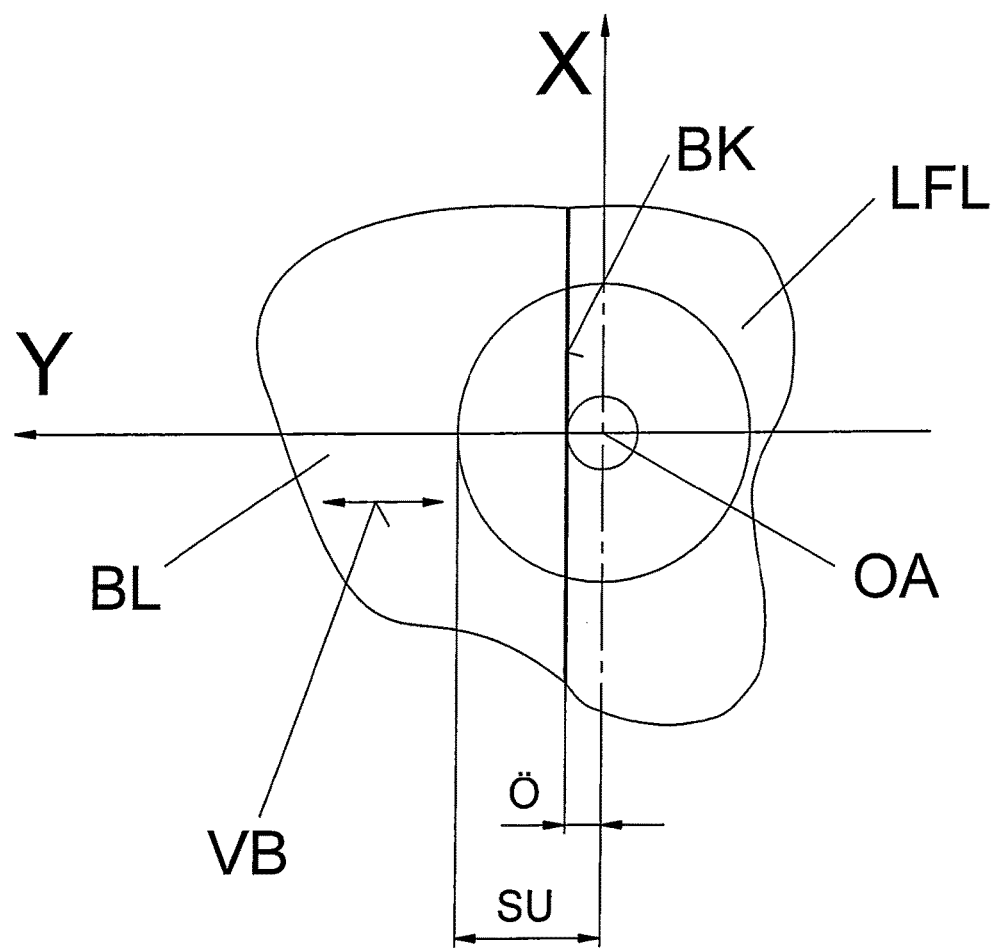
FIG. 20: shows, in a top view, the situation of FIG. 19.

Analogously to the FIGS. 9 and 10, the FIGS. 19 and 20 show details of the arrangement of the invention, however with a diaphragm setting that is altered by the displacement in the setting direction hVB. According to the FIGS. 19 and 20, in the direction VB parallel to the object plane OE, the diaphragm edge BK is still at the edge of the beam cross-section, which is characterized by the open distance Ö as a radius of the beam cross-section at the level of the ideal Z diaphragm position Zh1 around the optical axis OA. However, the ideal diaphragm position Zh1 is not set any longer, as the diaphragm BL has been displaced with the diaphragm edge BK in the setting direction hVB by the displacement path UOE too far away from the object plane OE. The light beams V1', VM' and V2' are thereby completely filtered out. As all these light beams are to illuminate the front object field edge and as hardly any further light beams for illumination of the other object field are filtered out, only the front object field edge appears dark, that is to say the image is non-homogeneous having regard to brightness.

In order to provide the diaphragm edge BK only on the outer edge of the beam cross-section in the diaphragm position Zh1+UOE set deviating from the ideal Z diaphragm position Zh1, it would have to be opened further onto the opening space SU. As the diaphragm BL with the diaphragm edge BK would not, however, then be in the ideal Z diaphragm position Zh1, the function of the contrast method according to the invention would no longer be provided.

Figure 21:
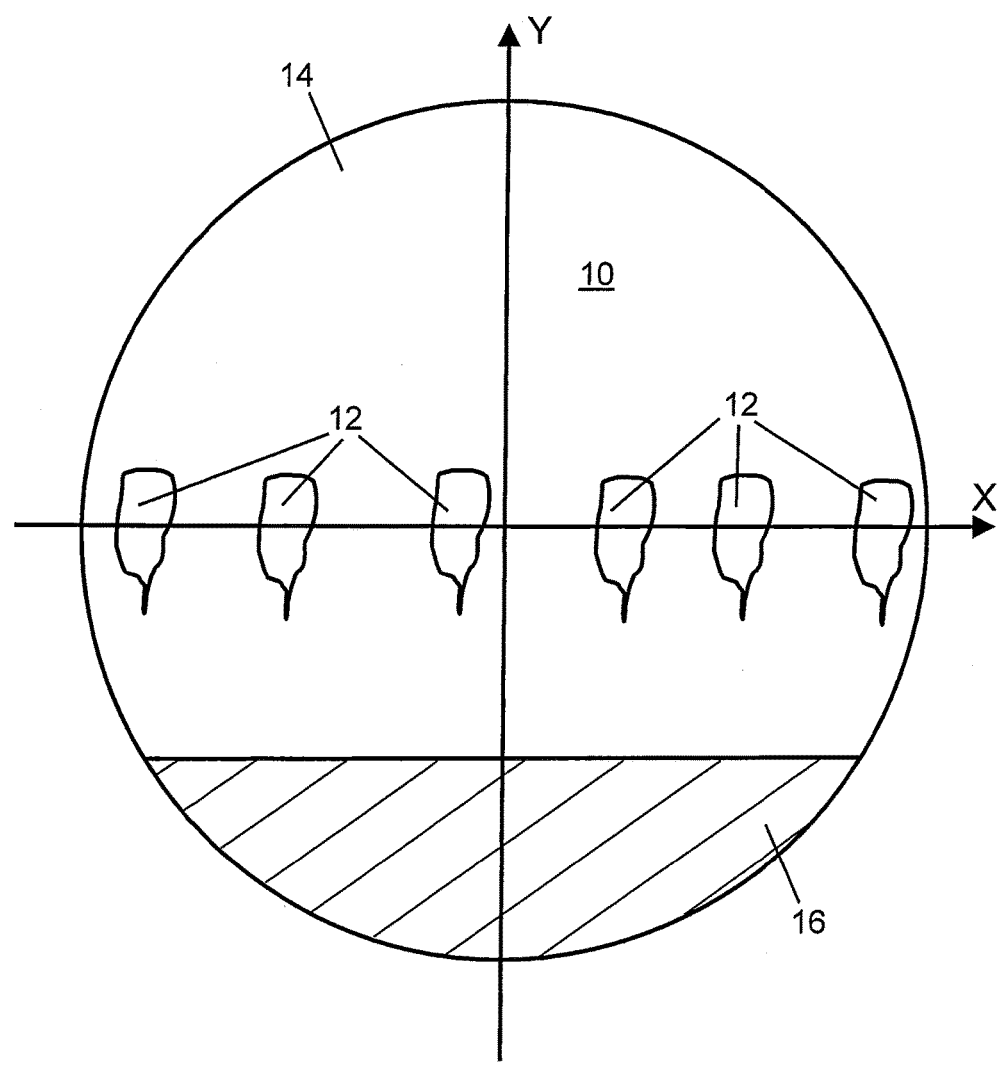
FIG. 21: shows, in a schematic illustration, an image which is obtained if the diaphragm edge is too far away from the object plane.

FIG. 21 shows schematically the image of a camera K which has been taken by the objective OBJ1 with the arrangement according to FIGS. 19 and 20. For the purpose of orientation the XY coordinate axes are included from the object plane OE.

As in FIG. 18, the image seen by the camera in FIG. 21 is identified with the reference numeral 10 and the sample with the reference numeral 12. If the diaphragm edge BK is further away than the effective entrance pupil from the object plane, the image darkens from the negative y direction. In FIG. 21 this is schematically shown with the area 16. The brightness differences are schematically illustrated in the image of the camera K in FIG. 21. The lower image edge, that is to say the front region of the object field in the negative half space of the Y axis, appears dark. The image becomes brighter as the Y coordinate becomes larger.

The brightness non-homogeneities caused by the deviations with respect to the ideal diaphragm position Zh1, which can be seen in the image of the object plane OE parallel to the setting direction VB of the diaphragm BL, can be described through a brightness gradient which includes a direction indication, describable through a +/− sign and an absolute value. For example the brightness gradient has a negative sign when the diaphragm BL is too close to the object plane OE and a positive sign when the diaphragm BL is too far from the object plane OE. The absolute value identifies the degree of deviation, that is to say an increasing absolute value describes an increasing deviation from the ideal Z diaphragm position Zh1. The purpose of setting the ideal Z diaphragm layer Zh1 can thus be achieved in that the absolute value is minimised, whereby the +/− sign of the brightness gradient supplies the information for the required movement direction in order to reduce the absolute value.

A method for automated determination of the optimal z position of the diaphragm BL can be formulated according to the invention from the above-described behaviour.

The method comprises successively moving the diaphragm BL from a starting position z1 to an end position z2, wherein the diaphragm covers approximately the middle of the illuminating optical path. An image is then recorded at each intermediate position with a camera and is evaluated having regard to its intensity profile along the Y axis. An optimum is found for example when the gradient function undergoes a change in the +/− sign.

Figure 22:
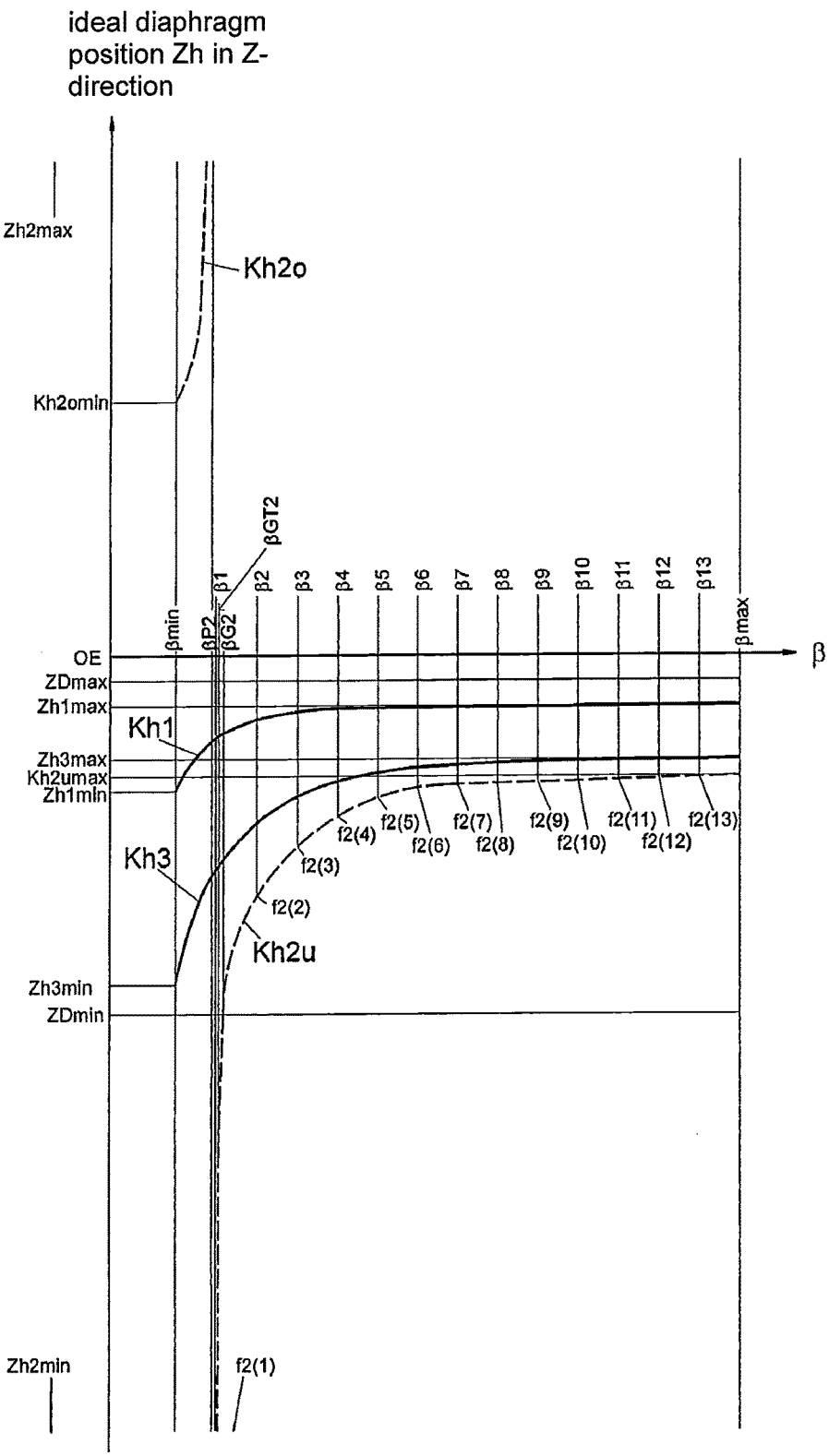
FIG. 22: shows a diagram, in which the optimal positions for the diaphragm edge are shown in dependence upon the zoom factor.

FIG. 22 shows by way of example the determined curves for the ideal Z diaphragm positions Zh to the three objectives OBJ1, OBJ2, OBJ3 of FIG. 1 in dependence upon the zoom factor β of the motorised zoom body MZK used in relation to the XYZ coordinate system, of which the origin lies in the object plane OE. The curves respectively begin with the smallest zoom factor βmin and end at the largest zoom factor β max of the zoom body MZK of FIG. 1.

The ideal Z diaphragm positions of the two curves Kh1 and Kh3 of the corresponding objectives OBJ1 and OBJ3 lie, with typical curve form in the XYZ coordinate system between ZDmin and ZDmax which corresponds to the region, in which a height-adjustable diaphragm can be constructively realised. These boundaries thus characterise the usable installation space for the contrast method according to the invention within the contrast device DL according to the invention. In normal use, the uppermost diaphragm position ZDmax is defined by the transparent object support TOA in the transmitted light device DL. The diaphragm may not contact the transparent object support TOA from below under any circumstances. The lowermost diaphragm position ZDmin results from the limited construction height HER of the transmitted light device DL in FIG. 1, which must remain below a certain height for ergonomic reasons. The housing of the transmitted light device DL of FIG. 1 has a height HER of approximately 100 mm. A transmitted light illumination device DL without further accessories should not be higher.

The minimum ideal Z diaphragm positions of the curves Kh1 and Kh3 are called Zh1 min and Zh3 min. Accordingly the maximum ideal Z diaphragm positions of these curves are called Zh1max and Zh3max.

The reference numerals f2(1) to f2(13) identify in FIG. 22 the ideal diaphragm positions in the Z direction for the objective OBJ2 on the motorised zoom body MZK respectively at the support points No. 1, correspondingly β1, to No. 13, correspondingly β13. Kh2omin describes the smallest value of the upper curve section Kh2o in FIG. 22. Correspondingly, Kh2umax describes the greatest value of the lower curve section Kh2u in FIG. 22. Furthermore the following reference numerals are significant in FIG. 22: Zh: Z coordinate of the diaphragm edge BK in the ideal Z diaphragm position for the current objective in the current zoom magnification; Zh2max: maximum value of Zh for the objective No. 2; Zh3max: maximum value of Zh for the objective No. 3 and Zh3 min: minimum value of Zh for the objective No. 3.

The objective OBJ2 of FIG. 1 has a substantially different curve progression which is typical for certain objectives OBJ. It can be seen in FIG. 22 that the curve for the objective OBJ2 comprises two curve sections Kh2o and Kh2u. Between these curve sections, in case of a zoom factor βP2, there is a pole position, i.e. the curve progression springs here from the top curve section Kh2o from plus infinity to the lower curve section Kh2u towards minus infinity.

The minimum and maximum ideal Z diaphragm positions of the curve sections Kh2u and Kh2o, i.e. Zh2min and Zh2max, are thus infinite or lie practically so far apart that the corresponding ideal Z diaphragm position can no longer be constructively set. In the upper curve section Kh2o, the ideal Z diaphragm position is at any rate unreachable, as the diaphragm BL with the diaphragm edge BK would have to be arranged above the object plane OE. In the lower curve section Kh2u the ideal Z diaphragm layer can be initially ensured only from the zoom factor βG2 and is then precisely in the boundary position ZDmin. The described contrasting method between the zoom factors βmin and βG2 cannot therefore be used with all advantages. Another suitable contrasting method is preferably to be determined for this.

Figure 23:
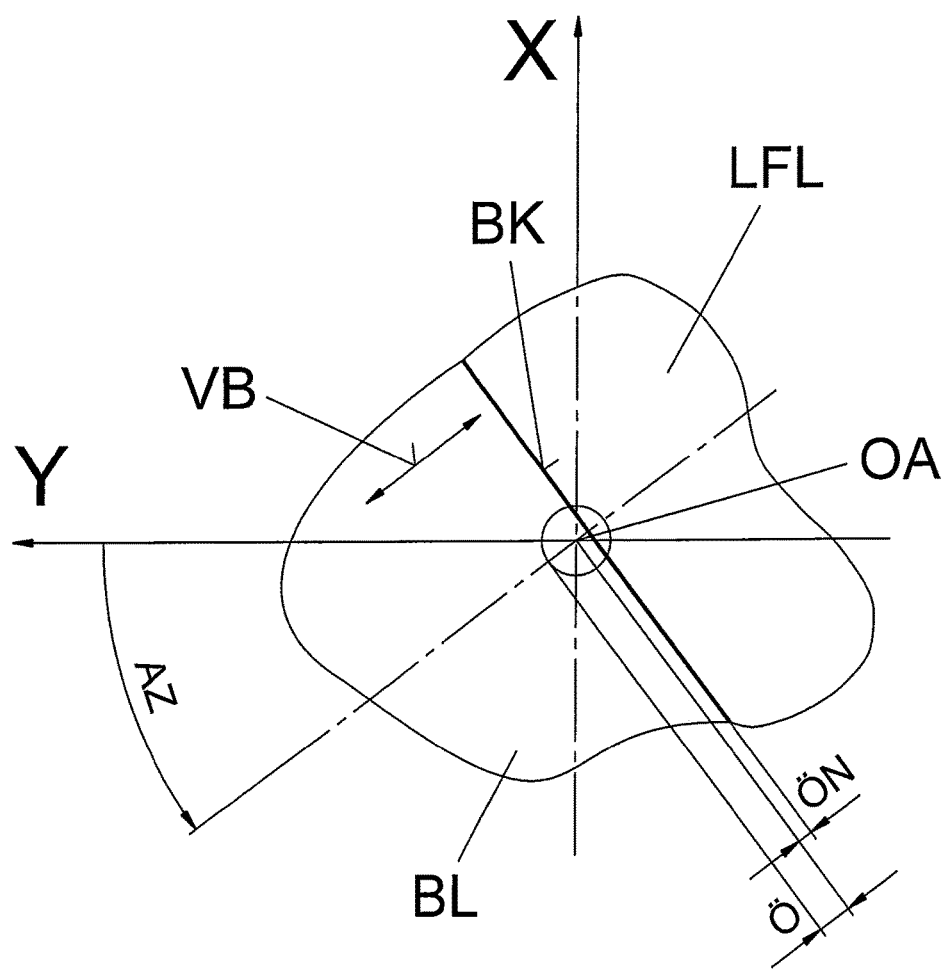
FIG. 23: shows, in a top view, an illustration of the influence of the azimuth angle.

Similarly to FIG. 14, FIG. 23 shows a detailed view of the arrangement according to the invention with a diaphragm setting changed by a rotation about an azimuth angle AZ. According to FIG. 23, the diaphragm edge BK is still in the ideal Z diaphragm position Zh1 and covers the optical axis OA completely so that a negative opening distance ÖN results between the diaphragm edge BK and the optical axis OA. That means that the diaphragm edge BK lies on the opposite side of the beam cross-section, wherein the negative opening distance ÖN still lies within the beam cross-section which is characterized by a radius with the value Ö. However, the diaphragm has been rotated about the surface normal of the object plane OE compared to the original arrangement of FIG. 14 so that the direction VB for adjusting the diaphragm BL with the diaphragm edge BK being parallel to the object plane OE deviates from the original azimuth orientation by the azimuth angle AZ. The surface normal of the object plane OE corresponds to the optical axis OA. The explanations are still valid that have been already been given with respect to FIG. 11. That is, from the covering through the diaphragm BL the whole object field is uniformly affected. The image remains homogenous.

The contrasting method according to the invention is in principle dependent upon direction, that is to say structures of the object OB which are orientated parallel to the diaphragm edge BK in the object plane OE are more greatly emphasised or are particularly rich in contrast. After the rotation of the diaphragm BL with the diaphragm edge BK by the azimuth angle AZ relative to the object OB according to FIG. 23, other object details are thus emphasised or respectively shown with a particularly rich contrast in comparison with the situation before the rotation according to FIG. 14.

In an image acquired with the objective OBJ1 in an arrangement according to FIG. 23, the image of the camera K with the diaphragm edge BK, which is rotated with respect to the object OB about the azimuth angle AZ, is changed in that the change of the illumination azimuth highlights other object details or shows other object details in better contrast. The image still has a very good homogeneity with regard to brightness.

In macroscopes the imaging is usually carried out rotationally symmetrically, i.e., the azimuth angle AZ of the illumination with spatially fixed diaphragm orientation of the device of the invention can also be realised by rotating the object OB about the surface normal of the object plane OE relative to the diaphragm edge BK. As previously described with respect to FIGS. 6 and 7, this is not true for stereoscopes in the typical 3D application because the diaphragm coverage would not be equal for the left channel L and the right channel R. If restricting to one single channel, e.g. the right channel R, for the documentation via a camera, the method in principle also works with stereo microscopes. If the objective OBJ is aligned with the active channel, e.g. the right channel R, according to the 2D position of the objective OBJ, then rotationally symmetric imaging conditions are also present in this case. If, however, the objective OBJ is still in the 3D position, that is central between the left channel L and the right channel R, then the light enters the objective OBJ obliquely from one side and the imaging is no more exactly rotationally symmetric. Still, also in this case azimuth effects can be observed by rotating the object OB about the surface normal of the object plane OE relative to the diaphragm edge BK.

Figure 24:
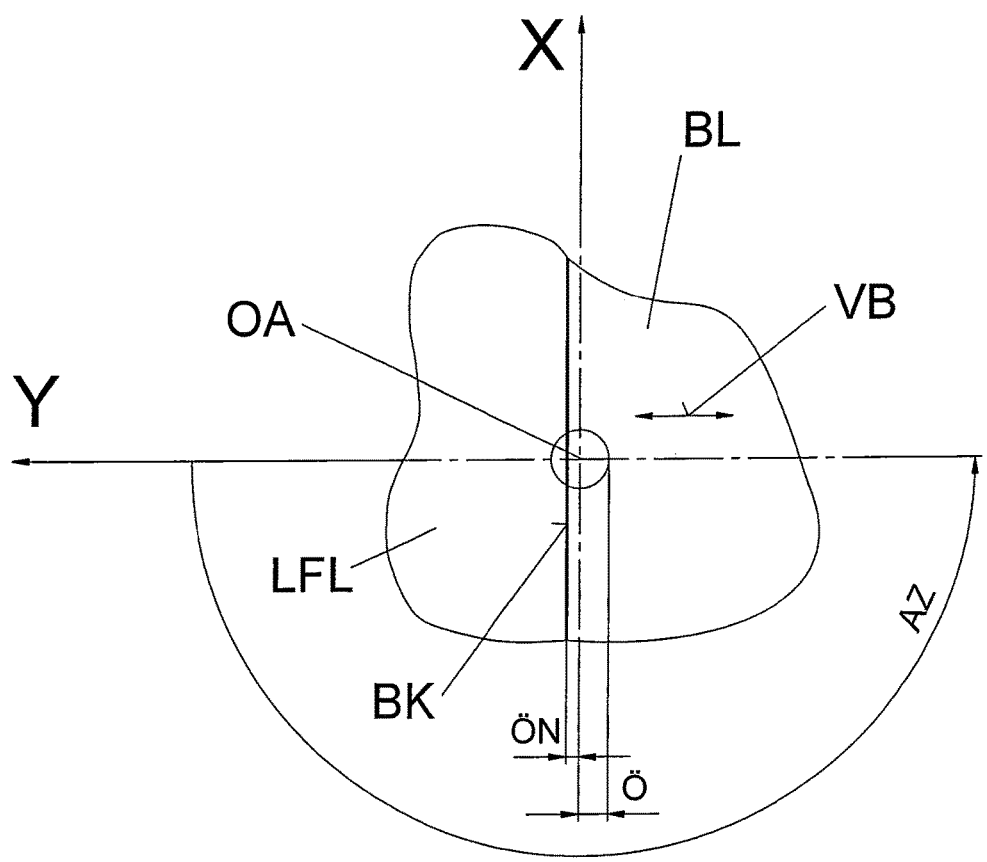
FIG. 24: shows, in a top view, a situation in which a diaphragm which has been rotated by 180° was used.
Figure 25:
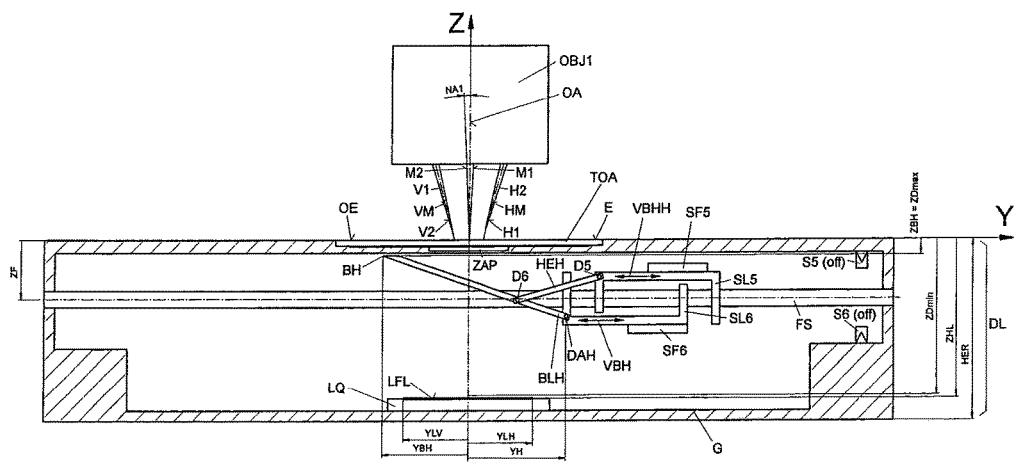
FIG. 25: shows an exemplary embodiment of an apparatus according to the invention with a diaphragm and carriage mechanism.

Similarly to FIG. 23, FIG. 25 shows a detailed view of the arrangement according to the invention with a diaphragm setting changed by a rotation about an azimuth angle AZ. According to FIG. 24, the diaphragm edge BK is still in the ideal Z diaphragm position Zh1 and covers the optical axis OA completely so that a negative opening distance ÖN results between the diaphragm edge BK and the optical axis OA. That means that the diaphragm edge BK lies on the opposite side of the beam cross-section, wherein the negative opening distance ÖN still lies within the beam cross-section which is characterized by a radius with the value Ö. However, the diaphragm has been rotated about the surface normal of the object plane OE compared to the original arrangement of FIG. 14 so that the direction VB for adjusting the diaphragm BL with the diaphragm edge BK being parallel to the object plane OE deviates from the original azimuth orientation by the azimuth angle AZ=180°. The surface normal of the object plane OE corresponds to the optical axis OA.

The rotation about an azimuth angle of 180° corresponds to a special case with physiological meaning; for in this case the spatial imaging is inverted. For example, air bubble cavities in the object OB, with a formerly natural elevated imaging, are inverted, i.e. imaged as recesses, with a diaphragm position that is rotated about an azimuth angle of 180°.

The explanations are still valid that have been already been given with respect to FIG. 11. That is, from the covering through the diaphragm BL the whole object field is uniformly affected. The image remains homogenous.

In an image acquired with the objective OBJ1 in an arrangement according to FIG. 24, the image of the camera K with the diaphragm edge BK, which is rotated with respect to the object OB about the azimuth angle AZ=180°, is changed with respect to the image that has been acquired with the arrangement shown in FIG. 14 in that the change of the change of the illumination azimuth over 180° results in an inverted display of the object OB. The spatial impression is, however, only sufficiently visible with a three-dimensional observation. The image still has a very good homogeneity with regard to brightness.

FIG. 25 shows an embodiment of a transmitted light device DL in the right system as seen from the observer according to FIG. 1, i.e., the X axis points to the right, the Y axis points rearwards, the Z axis points upwards; comprising a diaphragm BLH with a diaphragm edge BH extending linearly in the X direction and being between a light source LQ, which has an illumination area LFL parallel to the XY plane in the negative half space, and the object plane OE which comprises the origin of ordinates and in arranged in the XY plane.

The diaphragm BLH is rotatable around a rotation axis DAH, which is orientated parallel to the diaphragm edge BH and arranged on a first carriage SL6, so that the diaphragm BLH with diaphragm edge BH together with the rotation axis DAH can be displaced along a guide path of the first carriage SL6 in the Y direction. The objective OBJ1 used comprises in principle the beam path of FIG. 3. Furthermore the correlations continue to apply which have already been described in relation to FIG. 5. However, the diaphragm BLH which can be moved along a guide path FS has been displaced for a clear illustration of the inventive arrangement so far into the negative Y direction that it covers the beam cross-section of all back-projected edge beams. Of course, this arrangement according to the invention allows the diaphragm edge BH in Y direction to also be adapted to any beam cross-section, so that the diaphragm edge BH can work according to the invention. The display of the back-projected edge beams is omitted in FIG. 25 due to the display of the diaphragm BLH in an untypical setting position.

Figure 26:
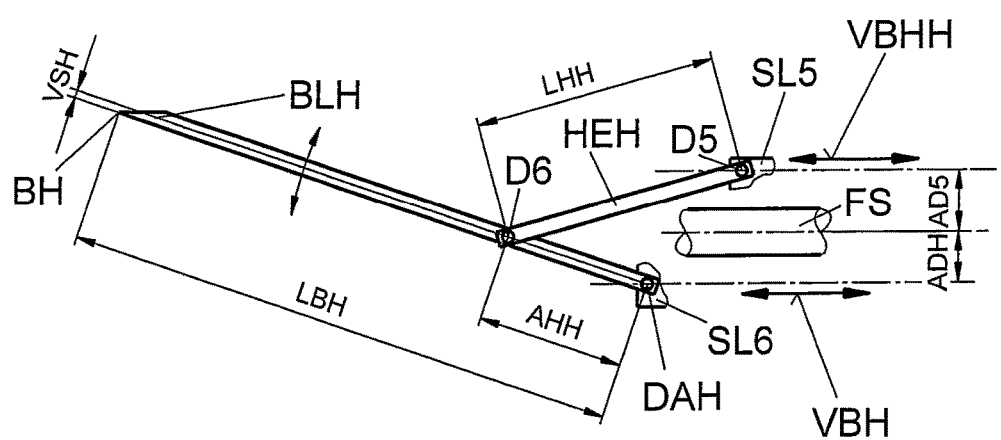
FIG. 26: shows the exemplary embodiment of FIG. 25 in a schematic illustration.

FIG. 26 shows a detailed view with supplementary indications for the lever setting of the diaphragm BLH according to the invention.

A second rotation axis D6 which is orientated parallel to the diaphragm edge BH is located on the diaphragm BLH at a distance AHH from the rotation axis DAH of the first carriage SL6, wherein the rotation axis D6 forms the support for a lever HEH which is mounted with its other end to be rotatable about a further rotation axis D5 orientated parallel to the diaphragm edge BH at a distance LHH from the rotation axis D6 on a second carriage SL5.

The second carriage SL5 can also be displaced together with its rotation axis D5 along the guide path FS of the carriage SL5 in the Y direction.

According to the invention, for homogenisation of the illumination via a movement of the two carriages SL6 and SL5 in the Y direction with superimposed relative movement of the two carriages, even without a change of the X and Y diaphragm coordinates, the diaphragm edge BH can be brought into a Z diaphragm coordinate, in which it is optimally adapted to the currently effective image system which comprises a zoom body MZK with the current zoom factor β and an objective OBJ1. This can be recognised by a sufficiently homogeneous illumination. The diaphragm edge can thereby be moved through the synchronous movement of the two carriages SL6 and SL5 along the Y direction, that is to say parallel to the object plane OE, likewise in the Y direction and without changing the X and Z diaphragm coordinates. The contrast level of the illumination can thereby be set.

In order to calculate the correlation between the settings of the positions of the carriages SL5 and SL6 and the YZ coordinate of the diaphragm edge BH, the known values LBH, VSH, AD5 and ADH shown in FIG. 26 and the value ZF shown in FIG. 25 are additionally required.

Furthermore, it is necessary to know the absolute carriage positions. Cost-effective stepper motors are preferably used as a drive, said stepper motors facilitating a linear movement via a rack and pinion engagement. However, the absolute position of a linear drive with simple stepper motors must be set in a known position. This preferably takes place upon connection through a determined initialisation sequence.

For this, the two carriages SL5 and SL6 are moved synchronously in the direction of the positive Y axis until the switching flags SF5 and SF6 arranged on the carriages SL5 and SL6 have arrived in the reference positions detected via corresponding position sensors S5 and S6, whereby this is characterized by the transition of the switching states S5 (off) and S6 (off) into the switching states S5 (on) and S6 (on). After this initialisation process the absolute position of the carriages is known. By means of the known lever geometry the corresponding YZ coordinates of the diaphragm edge BH can also be determined insofar as the position of the diaphragm edge BH relative to the switching position is known. This can only be determined very imprecisely via fixed measurements and a suitable adjustment process via an electronic offset correction is thus provided. For this, the diaphragm edge is brought into a known optically visible position. The deviations relative to the real or tolerance-based switching point position of the switching flags SF5 and SF6 are balanced out with the offset correction.

By moving the carriages SL5 and/or SL6 in the directions VBHH or VBH along the guide path FS by a certain number of steps of the driving stepper motor relative to the absolute position known through the initialisation process, the corresponding YZ coordinate of the diaphragm edge BH can be calculated. The calculation can also be carried out inversely, that is to say from a predefined movement path of the diaphragm edge BH in the Y and/or Z direction, the necessary carriage paths or the number of stepper motor steps can be calculated.

The diaphragm edge BH can be freely positioned within the transmitted light illumination device DL in Z direction in the free installation space between the object plane OE and the light source LQ. On account of a tolerance-related safety distance, the lowermost actually realisable diaphragm position ZDmin lies just above the light area LFL with the Z coordinate ZHL. Upwards, the uppermost actually realisable diaphragm position ZDmax is not only determined by the thickness of the transparent object support TOA but also through the height of the optionally insertable accessory ZAP, for example polarisation filter, including the support for it. As the diaphragm edge BH remains at the same Z coordinate during the initiation process due to the synchronous movement of the slides S5 and S6, the uppermost actually realisable diaphragm position ZDmax is hereby downwardly displaced by a corresponding tolerance-related safety distance. The diaphragm edge BH is at the momentary Z coordinate ZBH which is according to FIG. 25 identical to the Z coordinate ZDmax.

According to the invention, no further means for homogenizing the illumination are provided or required.

Figure 27:
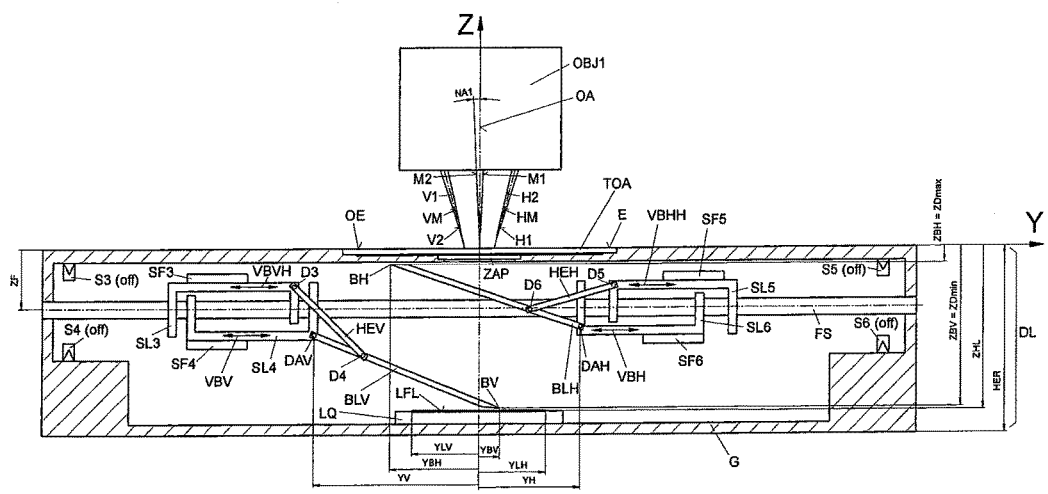
FIG. 27: shows a further exemplary embodiment of an apparatus according to the invention with two diaphragms and respectively assigned carriage mechanism.
Figure 28:
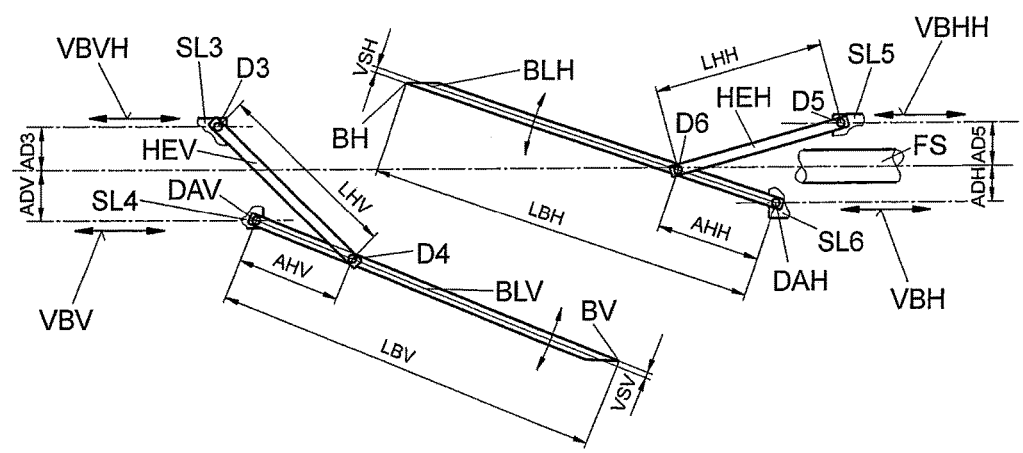
FIG. 28: shows the exemplary embodiment of FIG. 27 in a schematic illustration.

Analogously to FIGS. 25 and 26, the FIGS. 27 and 28 show an embodiment of a transmitted light device DL in the right system as seen from the observer according to FIG. 1, i.e., the X axis points to the right, the Y axis points rearwards, the Z axis points upwards; comprising a detailed view of the lever mechanics.

This exemplary embodiment is characterized in that the diaphragm/carriage system described in FIGS. 25 and 26, consisting of a first carriage SL6 with a rotation axis DAH, a second carriage SL5 with a rotation axis D5, a lever HEH, a diaphragm BLH with an additional rotation axis D6 and a diaphragm edge BH, and the guide paths FS for the carriages SL6 and SL5 through a further diaphragm/carriage system consisting of a first carriage SL4 with a rotation axis DAV, a second carriage SL3 with a rotation axis D3, a lever HEV, a diaphragm BLV with an additional rotation axis D4 and a diaphragm edge BV, and the guide paths FS for the carriages SL4 and SL3, is arranged on the side lying opposite the Y direction with identical functions. The diaphragm edge can thus be moved optionally from the negative direction or from the direction of the positive Y axis into the optical path. All other explanations to FIGS. 25 and 26 apply correspondingly. A housing has the reference numeral G in FIGS. 25 and 27. A front lever has the reference numeral HEV in FIGS. 27 and 28.

In addition, the following reference numerals are significant in FIGS. 26 and 28: AD3: distance between the guide path FS and the rotation axis D3; ADV: distance between the guide path FS and the rotation axis DAV and AHV: lever length between the rotation axes DAV and D4.

Figure 30:
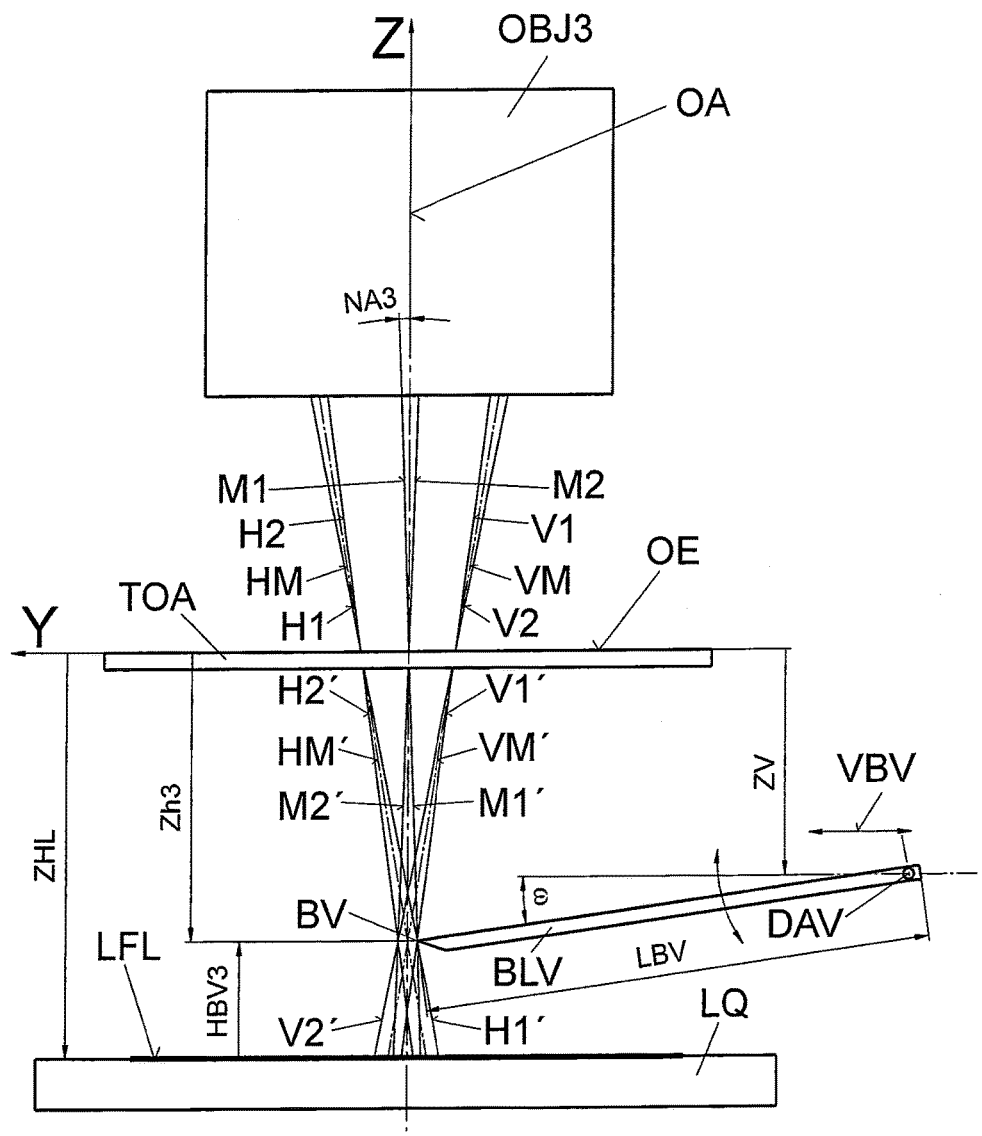
FIG. 30: shows, in a side view, essential components of the optical path with a further objective for the apparatus of FIGS. 27 and 28.

In addition, the following reference numerals are significant in FIGS. 27, 28 and 30: D3: rotation axis for lever HEV on the carriage SL3; DAV: rotation axis front diaphragm.

The settable Z diaphragm coordinates of the two diaphragm—slide systems can also cover different regions of the complete setting options of the Z diaphragm edge coordinates, so that the installation space between ZDmin and ZDmax is split into two regions.

Figure 29:
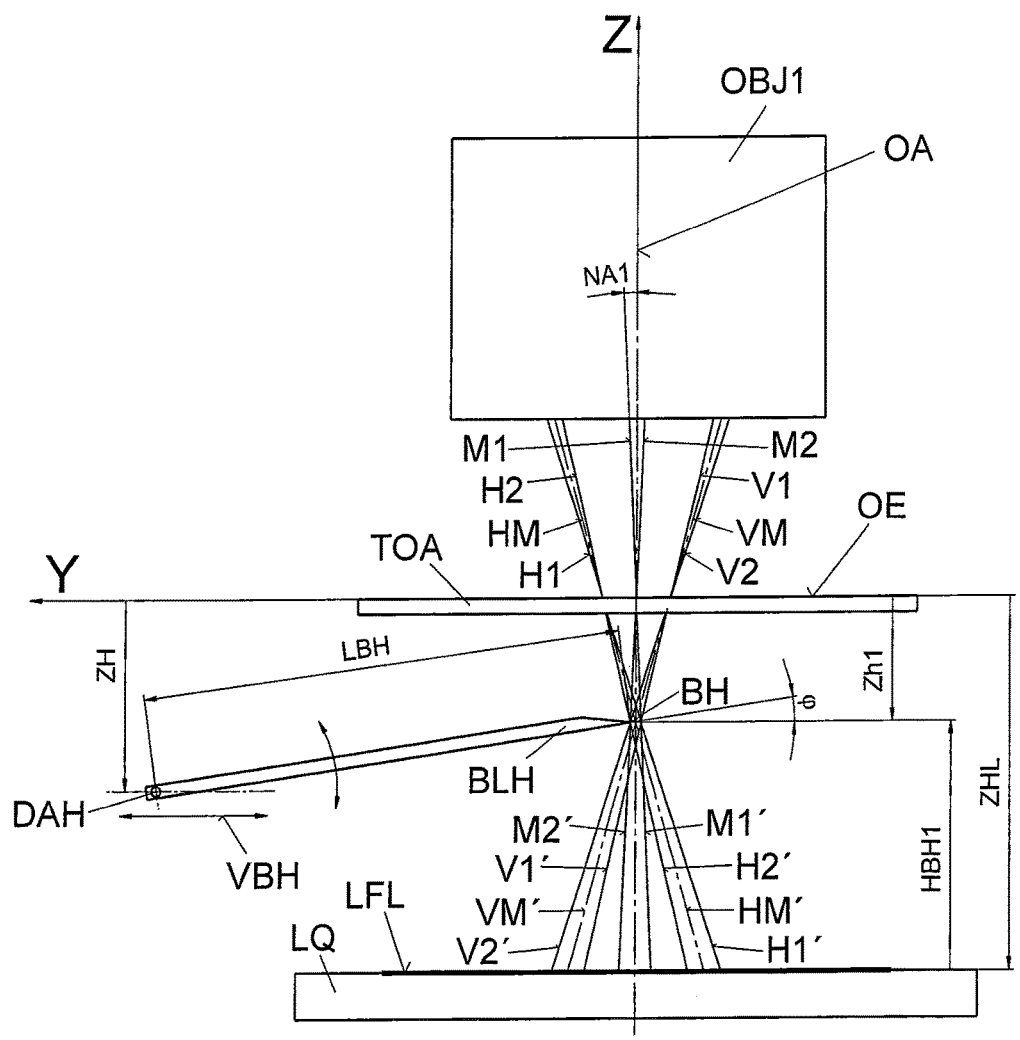
FIG. 29: shows, in a side view, essential components of the optical path with a first objective in the apparatus shown in FIGS. 27 and 28.

In FIGS. 26, 28 and 29 the reference numeral LBH identifies a distance between the rear diaphragm edge BH and the pivot point DAH of the rear diaphragm BLH. Correspondingly, LBV identifies a distance between the front diaphragm edge BV and the pivot point DAV of the front diaphragm BLV. A length of the front lever HEV between the rotation axes D3 and D4 is identified in FIG. 28 by the reference numeral LHV.

In FIG. 27, a switching flag 3 for activating the position sensor S3 is identified by the reference numeral SF3. Correspondingly, SF4 identifies a switching flag 4 to activate the position sensor S4.

Furthermore the following reference numerals are significant in FIGS. 25 and 27: YH: Y coordinate of the rear rotation axis DAH; YBH: Y coordinate of the rear diaphragm edge BH; YBV: Y coordinate of the front diaphragm edge BV; YLH: Y coordinate of the rear light area limit; YLV: Y coordinate of the front light area limit; ZBH: Z coordinate of the rear diaphragm edge BH and ZBV: Z coordinate of the front diaphragm edge BV. The reference numeral ZAP in FIGS. 25 and 27 identifies accessories which can optionally be inserted in the adapter plate AP or the interface for this (e.g. polarisation filters, insert diaphragms, colour filters, etc.).

In FIGS. 27 and 28, a displacement direction of the lever adjustment for the front diaphragm is identified with the reference numeral VBVH. In FIGS. 26 and 28, the reference numeral VSH identifies an offset between the plane which spans across the pivot point axes DAH, D6 and the rear diaphragm edge BH. VSV identifies in FIG. 28 an offset between the plane which spans across the pivot point axes DAV, D4, and the front diaphragm edge BV.

In another variant at least larger partitions or the whole installation space between ZDmin and ZDmax of the two diaphragms can be used, so that it can be chosen in the regions common to both diaphragms whether a regular diaphragm orientation without an azimuth angle is set, or a diaphragm orientation that is inverted, i.e. rotated about 180°, relative to the regular azimuth orientation is set.

FIG. 29 shows the relevant parts of the diaphragm geometry of FIGS. 27 and 28 with the optical path similarly to FIG. 3, whereby the diaphragm BLH is located in the Z direction in the ideal diaphragm position Zh1. Similarly to FIGS. 3 and 8 to 10, the diaphragm BLH is placed in the Y direction only neighbouring the beam cross-section which is formed by the back-projected edge beams. HBH 1 identifies in FIG. 29 a height distance from the light area LFL to the rear diaphragm BLQH in the ideal Z diaphragm position for the objective OBJ1 on the zoom body MZK with the current zoom factor $\beta$. ZH identifies in FIG. 29 a Z coordinate of the rear rotation axis DAH.

FIG. 30 shows the relevant parts of the diaphragm geometry of FIGS. 27 and 28 with the optical path similarly to FIG. 4, wherein the diaphragm BLV is located in the Z direction in the ideal diaphragm position Zh3 but it is placed in the Y direction, similarly to FIGS. 7 to 10, only neighbouring the beam cross-section formed by the back-projected edge beams. ZV identifies in FIG. 30 a Z coordinate of the front rotation axis DAV.

By varying the Y coordinate of the diaphragm edge BV and/or displacement in the direction VBV, the contrast level can be changed in FIGS. 29 and 30. Further possibly necessary adaptations to the properties of the object OB (not shown here) according to FIG. 5 can, if necessary, be realised by a correction of the Z coordinate of the diaphragm edge BV, so that the ideal Z diaphragm position Zh3 suitable for the object OB becomes effective again.

An image recorded through the objective OBJ3 with the arrangement according to FIGS. 3 and 4, thus without means according to the invention for contrast enhancement between the light source LQ and the object plane OE, has a relatively weak contrast. Hardly any structures and/or phase objects can be recognised.

If further images are recorded with the same object OB and the same optically effective objective—zoom body combination consisting of objective OBJ3, zoom body MZK with zoom factor β, these images can be directly compared with each other.

An image recorded using an apparatus of the type described in DE 10 2004 017 694 B3, which works with a diaphragm in a fixed Z coordinate which can be displaced only in the Y direction, is highly inhomogeneous. The contrast has only improved in comparison with the contrast of the image recorded with the arrangement according to FIGS. 3 and 4 in the transition zone between a lower dark and an upper bright image region.

An image recorded with the device according to the invention with an optical path according to FIG. 30 for illumination, wherein the diaphragm edge has been displaced in the direction of the optical axis, is still homogeneous. In relation to the image recorded with the arrangement according to FIGS. 3 and 4, however, the contrast has improved very greatly. This can be achieved by the following adjustment process:

Similarly to FIG. 13, initially the diaphragm edge BH is placed touching the optical axis OA so that a sufficient contrast is still to be expected also in the ideal diaphragm position Zh3. Then, via an optimisation of the homogeneity, similarly to the explanations given to FIGS. 16, 17, 19, 20, the ideal Z diaphragm position Zh3 is set. Subsequently, the contrast is increased by the further covering of the optical path similarly to FIG. 14 so far that a transmitted light—bright field characteristic can just now be recognised and no inhomogeneities can be recognised in the camera image. In the case of smaller fields of vision, in principle, greater contrasts are possible.

Particular advantages follow when combining the device according to the invention with an interconnected system similarly to FIG. 1, as all current system settings are then known. The momentarily active objective OBJ is selected via the coded objective changer COW. The positions of the ideal Z diaphragm positions Zh1 are also hereby known, insofar as they have previously been determined in trials. The ideal Z diaphragm positions Zh1 also depend upon the known zoom factor β of the motorised zoom body MZK. For each combination of objective OBJ and motorised zoom body MZK there is accordingly a curve with an ideal Z diaphragm position in dependence upon the zoom factor β which is preferably electronically stored in the firmware of the motorised transmitted light device. During operation, the current system state can be recognised and via the curve adapted to this the ideal Z diaphragm position can be reproduced for the corresponding zoom factor β.

Using the known correlations, all ideal Z diaphragm positions for standard objects can be previously determined as curves, for example Kh1, Kh2 according to FIG. 22, with all objective—zoom body combinations of objective OBJ and zoom body MZK with zoom factor β. These curves determined in trials are advantageously generally approximated by approximation functions frZi(β) which can be described with a relatively small number of parameters so that lower electronic processing resources with shorter calculation time are required.

Similarly, the best possible contrast settings and/or Y values determined for the standard objects can also be described as approximation functions fRYi(β) with a relatively small number of parameters, so that lower processing resources with shorter calculation time are also required here.

If the diaphragms are adjusted in a motorised manner and a device is present for displaying and storing the diaphragm positions that are set, the stored illumination settings can be reproduced again. Through the additional combination of the motorised device according to the invention with a further device, which has a camera K, special software for image processing and a device to perform a feedback control EM, the ideal Z diaphragm position Zh1 can also be automatically determined and/or set. For this, the image processing software evaluates the camera image in relation to the brightness gradient parallel to the coordinate direction VB, in which the active diaphragm BL is moved for contrast variation, and transmits the brightness gradient to the device for performing a feedback control EM and/or the feedback controller EM. The +/− sign of the brightness gradient hereby serves as direction information and the absolute value as a measure for the deviation from the ideal Z diaphragm position, wherein the feedback controller EM sends movement instructions to the transmitted light device DL according to the invention in order to minimise the error of the feedback control, said movement instructions leading via the corresponding movement of the drive motors as actuators to a reduction in the error of the feedback control. The feedback control is thus embodied by a counter-feedback control. The ideal Z diaphragm position is achieved when the absolute value of the brightness gradient cannot be minimised any further.

The automatic setting of the ideal Z diaphragm position Zh1 requires a setting, fixed during the process, of the position of the diaphragm BL with diaphragm edge BK in the direction VB parallel to the object plane OE. For this, preferably the indications relating to the current objective OBJ1, the zoom body MZK used and the current zoom factor β are electronically enquired and the corresponding contrast setting is predefined from these via previously determined diaphragm settings. However, the method also functions with a fixed setting of the diaphragm edge BK in the direction VB relative to the optical axis OA, see FIG. 13.

As already explained, mainly on account of the unknown influences of the object OB and its environment, for example transparent object support TOA, Petri dish with nutrient solution, etc., a suitable operating element is preferably provided, for example an adjust scroll wheel SADJ, to allow the client to vary the diaphragm position perpendicularly to the object plane OE. When activating the contrast method according to the invention and/or changing the zoom factor β, firstly the current system environment is determined from the objective OBJ and zoom body MZK with the currently effective zoom factor β and then the default setting for this system environment previously determined for this is pre-set. This can then be manipulated via the adjust scroll wheel SADJ. For example, by rotating the adjust scroll wheel SADJ, initially the homogenisation can be carried out by moving the diaphragm BL with the diaphragm edge BK in the direction hVB. After pushing the adjust scroll wheel SADJ, the rotation of the adjust scroll wheel SADJ causes a contrast variation via the movement of the diaphragm BL with the diaphragm edge BK in the direction VB. In the case of flat, level objects, the adjusting resource requirements thereby remain relatively low. In most cases, a usable image is already present through the default settings of the diaphragm BL with diaphragm edge BK.

A large object height OH requires, however, within the scope of this operating concept, with each change in the zoom factor β, considerable adjusting efforts for homogenisation by moving the diaphragm BL with diaphragm edge BK in the direction hVB. These adjusting efforts can be minimised by an offset adjustment through a once determined correction path in the direction hVB. For this, a wizard can be activated for the whole system via the operating unit BE with integrated touchscreen. Said wizard initially invites the user to focus on the object detail of interest with the motorised focussing device MFT with the greatest zoom factor β previously set automatically via the zoom body MZK. Subsequently, the possibly present individual eye defect of the user can be compensated via the diopter compensation on the oculars OK with the smallest zoom factor β previously automatically set via the zoom body MZK.

The user can then be invited, with the smallest zoom factor β already set, to carry out a setting of the homogenisation via the rotation of the adjust scroll wheel SADJ on the transmitted light device DL according to the invention. The setting is preferably carried out with the smallest zoom factor, as the setting of the homogenisation functions most sensitively with this. The homogenisation carried out can be confirmed by the user via a button, wherein the adjustment path set in the direction hVB is stored as an offset value. Afterwards, upon activation of the contrast method according to the invention and/or change of the zoom factor β, the current system environment can initially be further determined from the objective OBJ and zoom body MZK with the currently effective zoom factor β. In particular, the offset value can be added to a default setting for this system environment, previously determined for this, before this setting is pre-set. This pre-set setting can then be further manipulated via the adjust scroll wheel SADJ.

Living and/or moving object details of objects OB which move for example in a nutrient solution in a Petri dish can also change their position perpendicularly to the object plane OE during the observation. For further observation, therefore, subsequent focussing via the motorised focussing device MFT can be required. Without further measures, the setting of the homogenisation would thereby no longer coincide, since the distance between the object details of interest and the diaphragm edge would no longer be identical as a result the subsequent focussing. This disadvantage can be avoided if the offset value previously determined via the wizard is also fixedly associated with the movement of the motorised focussing device, wherein the diaphragm BL with the diaphragm edge BK would have to be moved synchronously with the motorised focussing device MFT in the direction hVB and/or in the Z direction. This function can be activated for example by an additionally optionally activatable button in the wizard. After activation of this button the diaphragm BL with the diaphragm edge BK is automatically adjusted, with subsequent focussing via the motorised focussing device, so that the distance between the focussed object detail and the diaphragm edge always remains constant without further change in the system settings.

The movements of the diaphragm BL with diaphragm edge BK in the direction VB for the contrast setting and in the direction hVB for homogenisation do not compulsorily have to be settable independently of each other, which can for example be caused via setting directions deviating from the directly effective directions, for example parallel to the object plane OE perpendicular to the diaphragm edge BK for contrast; perpendicular to the object plane OE for homogenisation. In principle, however, the movement components must nonetheless be present in the directly effective directions and it must be possible for all relevant YZ coordinates of the diaphragm edge BK to be purposefully approached.

An illumination optimisation according to the invention can likewise be realised with only a degree of freedom for setting the homogenisation if the contrast, thus the Y coordinate, is fixedly pre-set. For example the diaphragm edge BK could be placed, similarly to FIG. 13, touching the optical axis OA. In the case of deviations in the setting direction from the direction hVB of the surface normal of the object plane OE, the contrast level can also be correspondingly changed. Optimisation of the illumination according to the invention is nonetheless also present here with only a degree of freedom for setting the diaphragm position if each ideal diaphragm position Zh1 can be approached and the contrast always remains within the usable range according to the meaning of the method according to the invention.

The linearly extending diaphragm edge BK can also be moved along curved paths insofar as each ideal diaphragm position Zh1 can be approached by the arrangement and the contrast always remains within the usable range according to the meaning of the method according to the invention.

The most ideal form in terms of cost is a linear diaphragm edge BK as this can be easily produced without great resources. Slightly curved diaphragm edges BK can also be used in principle but then, with the tilting of the diaphragm BL with fixed XYZ coordinates of a single point on the diaphragm edge BK with increasing distance from this point along the diaphragm edge BK, the Y and Z values also change, which is in practice difficult to manage. Curves of the diaphragm edge BK which lie in the region of the usual manufacturing tolerances and/or which do not yet lead to visible non-homogeneities do not play a role here.

Furthermore it is possible to use an array which can be switched in terms of pixels such as for example an LCD array as a height-adjustable diaphragm. This design has the advantage that the transmission pattern of the diaphragm can be adapted to the pupil form. In addition, other patterns are also advantageous. For example, the reversal of the diaphragm edge could be realised through electronic control. A rotation of the diaphragm would also be feasible. Last but not least, a rapid change of the transmission pattern to different forms would be possible, these forms bringing about, above the flicker frequency of the eye, approximately 50 Hz, a mixed contrast effect.

By adapting the observation aperture of the imaging system, that is to say by slightly reducing the image-side aperture via the adjustment of the image-side, preferably motorised, aperture diaphragm using the corresponding operating element BMAM, a further improvement in the contrast can be achieved in certain imaging situations. Insofar as the aperture diaphragm is motorised and/or connected to the whole system, these settings can also be stored and reproduced again as required.

Without limitation the invention can be generalised in that for example the beam path in the transmitted light cover is folded through deflection optics such as mirrors, and in that lenses are used as relay optics.

Figure 31:
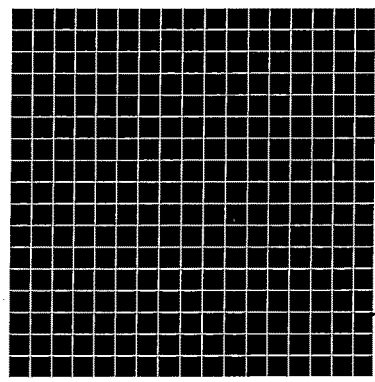
FIGS. 31 to 35: show states of a variant, wherein a liquid crystal array acts as a diaphragm.

A series of states of a liquid crystal array 20 to be used as a diaphragm is shown schematically in the figures. FIG. 31 shows a situation in which all pixels of the liquid crystal array 20 are set as impermeable.

Figure 32:
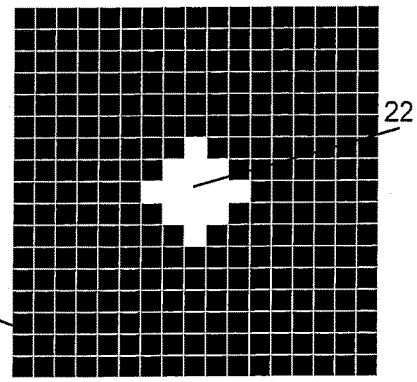
Figure 34:
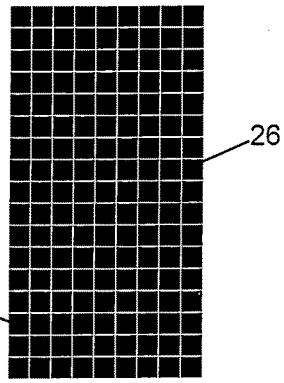
Figure 35:
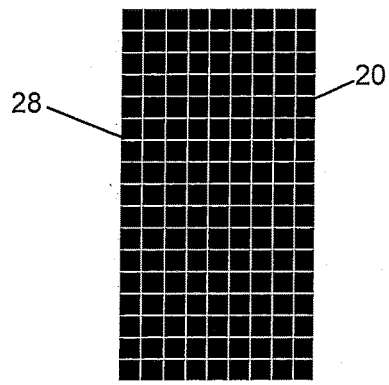

In FIG. 32, a central region 22 of the liquid crystal array 20 is transparent. FIG. 32 shows a situation with two transparent regions 24. FIGS. 34 and 35, finally, show cases in which a respective half of the liquid crystal array 20 is set as impermeable and the other half as transparent. Diaphragm edges 26, 28 are thereby formed which can be used for the apparatus according to the invention and for the method according to the invention.

Figure 36:
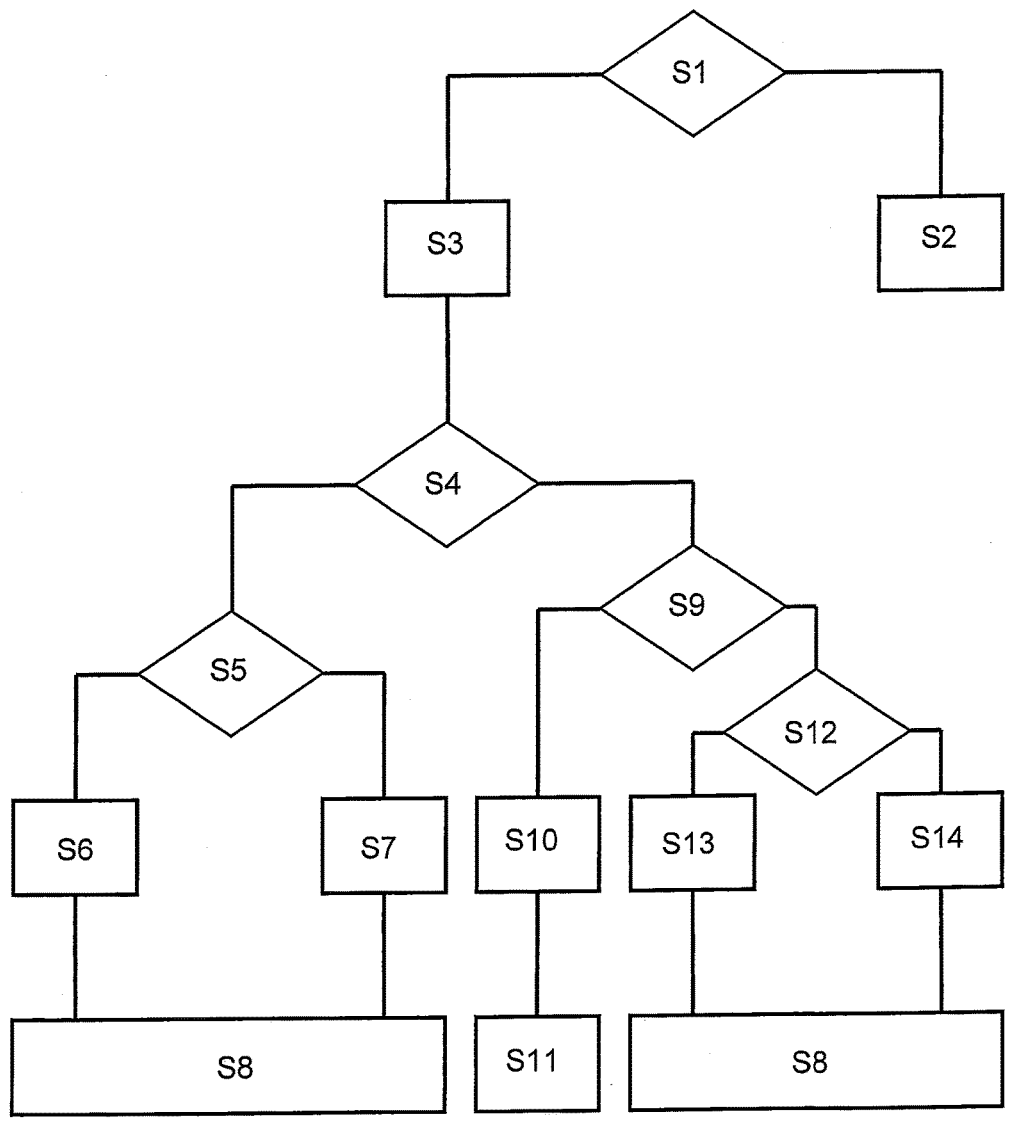
FIG. 36: shows a flowchart of a method according to the invention for setting the most suitable illumination for a light microscope.

FIG. 36 shows schematically the method steps S1 to S14 of a method according to the invention for setting the most suitable illumination for a light microscope. In this way a homogenous image plane with a maximal possible contrast can be reached. The method according to the invention can be carried out in particular with an apparatus according to the invention for transmitted light illumination for a light microscope. The illumination is thereby adjusted by moving the diaphragm edges of an apparatus according to the invention to a suitable position.

The method according to the invention is explained using an exemplary embodiment with four diaphragms which respectively comprise a linear diaphragm edge. These four diaphragms are described as front, rear and two side diaphragms. According to the invention, however, a different number of diaphragms can be used. In particular an iris diaphragm can also be used. The method steps described below are then to be correspondingly adapted.

In step S1 it is checked whether a microscope setting, namely an objective—zoom body combination which is momentarily used in the light microscope and a zoom magnification associated therein can be called up. This can take place for example via a CAN bus. If the answer is "yes", step S3 follows, otherwise step S2.

In step S2 all available diaphragms are opened, that is to say none of the available diaphragm edges cuts the illuminating beam. In this connection the rear diaphragm is opened in that both associated carriages which serve for movement of the diaphragm are moved into the reference position of the rear diaphragm. The reference position of the rear diaphragm can be the accessible position which has the greatest Y value. The front diaphragm is similarly moved by moving both its two carriages into its reference position. Here, it is at the accessible position which has the smallest Y value. In addition the two side diaphragms are opened in that their respective reference positions are reached. For the first side diaphragm, this is the position with the minimum adjustable X value. For the second side diaphragm this is the position with the maximum adjustable X value.

In step S3, with the enquiry concerning the objective—zoom body combination and the zoom magnification set, an ideal Z position for a diaphragm edge is determined. This can take place for example with the aid of a stored value table, in which ideal Z positions for different objective—zoom body combinations and different zoom magnifications are stored. The value table can be determined by preceding measurements or through theoretical calculations. For zoom magnifications, for which no value is stored in the value table, an ideal Z position can be determined through interpolation of the values from the value table. The ideal Z position of the diaphragm edge can thereby be defined in that the lighting beam path of the light microscope has a waist at this Z position. Step S4 follows this step.

In step S4 it is checked whether the ideal Z position of the diaphragm edge lies within the available installation space. If this applies, step S5 follows, otherwise step S9.

It is ascertained in step S5 which of the available diaphragm edges can be moved to the ideal Z position. Depending upon the embodiment of the apparatus according to the invention, not a single diaphragm can be moved over the whole available installation space. Instead the front diaphragm can be moved into a region of lower Z values to maximum ZDmin+HBVmax, while the rear diaphragm can be moved in a region of greater Z values than ZDmin+HBVmax. HBVmax describes the maximum height distance which the front diaphragm can assume to the light area/illuminating area. If it is determined in step S5 that the ideal Z position of the diaphragm edge lies in the movement area of the front diaphragm, step S6 then follows. If on the other hand the ideal Z position lies in the movement area of the rear diaphragm, step S7 follows. In practice the movement areas of the front and rear diaphragm might overlap. Nonetheless, a diaphragm is selected in step S5 according to the abovementioned criteria.

In step S6 the front diaphragm is moved to the ideal Z position and the rear diaphragm is opened.

In step S7 on the other hand the rear diaphragm is moved to the ideal Z position and the front diaphragm is opened. The opening can thereby take place as described in step S2. In case of embodiments of the apparatus according to the invention, in which precisely one height-adjustable diaphragm edge is present, the steps S5 to S7 can be replaced by the step that this height-adjustable diaphragm edge is moved to the ideal Z position.

Step S8 follows both step S6 and step S7. In step S8 the two side diaphragms are positioned. The position thereof is determined—similarly to step S3—depending upon the objective—zoom body combination used and the zoom magnification thereby set. The two side diaphragms are then moved to the appropriate positions. The setting of all the available diaphragms and thus also the method according to the invention are hence complete.

Step S9 is described below. This is carried out if it is ascertained in step S4 that the ideal Z position of the diaphragm edge lies outside of the available installation space. It is determined in step S9 whether the use of a prism film is useful. If a prism film is introduced at a certain angle into the illuminating beam bundle, the propagation of the illuminating beam bundle is influenced in a known way. If it is determined in step S9 that by using a prism film the illumination for the light microscope can be improved, step S10 follows, otherwise step S12.

In step S10, initially the prism film is incorporated into the beam path. In addition the rear diaphragm is set to a YZ position which is determined in dependence upon the objective—zoom body combination used and the zoom magnification set. The front diaphragm can be moved to a Y position which is also determined in dependence upon the objective—zoom body combination and the zoom magnification set. The Z position of the front diaphragm can be adjusted to a position ZDmin slightly above the light source.

Step S11 follows step S10. In step S11, the side diaphragms are moved to X positions which are determined in dependence upon the objective—zoom body combination and the set zoom magnification, wherein it is taken into account that the prism film is in the beam path.

If it is determined in step S9 that improved illumination cannot be achieved with prism film, step S12 follows, in which no prism film is used. It is rather checked which of the available diaphragms can be moved closest to the ideal Z position. If it is ascertained that the ideal Z position lies below the available installation space, step S13 follows. If on the other hand the ideal Z position is too high, step S14 follows.

In step S13 the front diaphragm is positioned at the smallest possible Z value. In addition it can be provided that the Y position of the front diaphragm is dependent upon the objective—zoom body combination used and the zoom magnification set so that no trimming of the beam path can take place. The rear diaphragm is opened in this case, whereby this can take place as described in step S2. The previously mentioned step S8 for setting the two side diaphragms then follows.

If on the other hand it is ascertained in step S12 that the ideal Z position is too high for the available installation space, in step S14 the rear diaphragm is set to the highest possible Z position for a trim-free setting similarly to the process in step S13. The front diaphragm is opened in this case. Step S8 likewise follows for setting the side diaphragms.

All available diaphragms are thus set in the best possible way and the method according to the invention is concluded.

By adapting the observation aperture of the imaging system, that is to say by slightly reducing the image-side aperture via the adjustment of the image-side, preferably motorised, aperture diaphragm using the corresponding operating element BMAM, a further improvement in the contrast can be achieved in certain imaging situations. Insofar as the aperture diaphragm is motorised and/or connected to the whole system, these settings can also be stored and reproduced again as required.

It was illustrated using FIG. 22 that the objective OBJ2 of FIG. 1 has a fundamentally different curve pattern from that of the objectives OBJ1 and OBJ3. The curve pattern of objective OBJ2 is typical for a certain number of further objectives OBJ.

Figure 37:
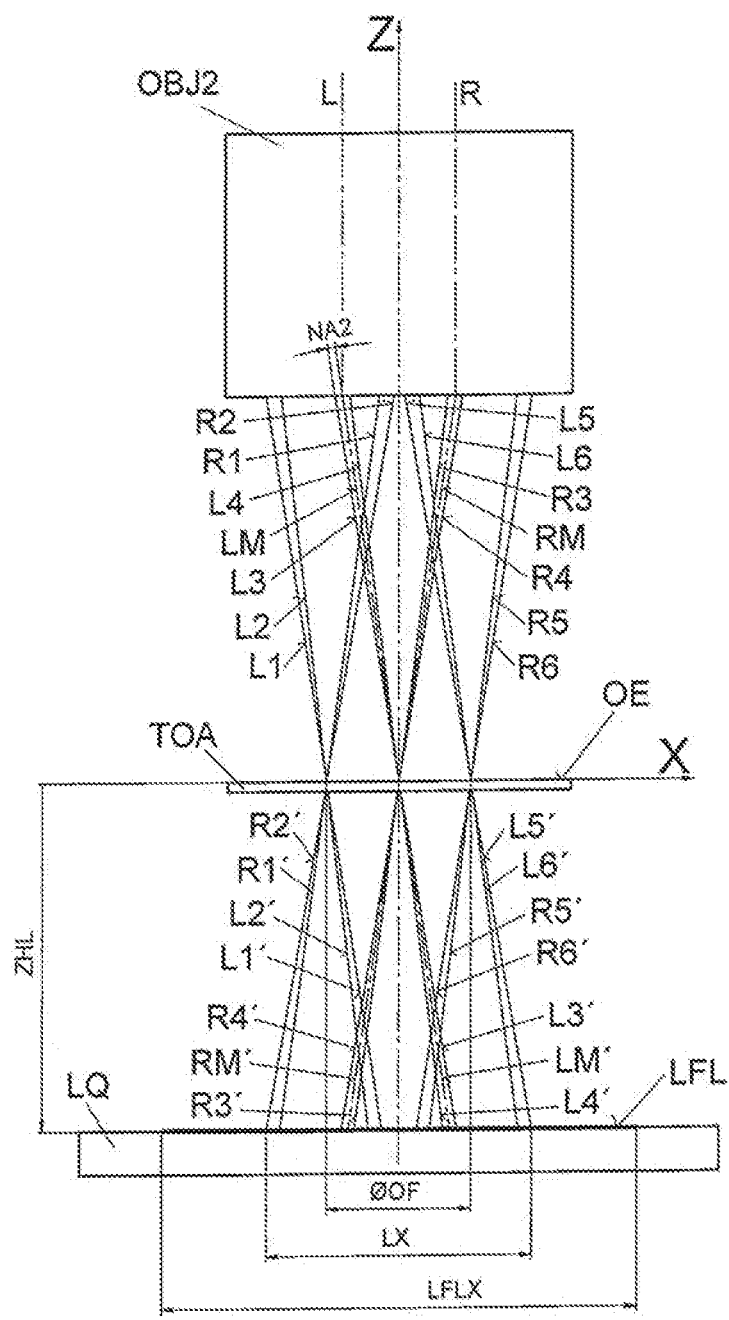
FIG. 37: shows, in a front view, a schematic illustration of edge beams of an objective in a situation, for which the use according to the invention of a prism film is suited.
Figure 38:
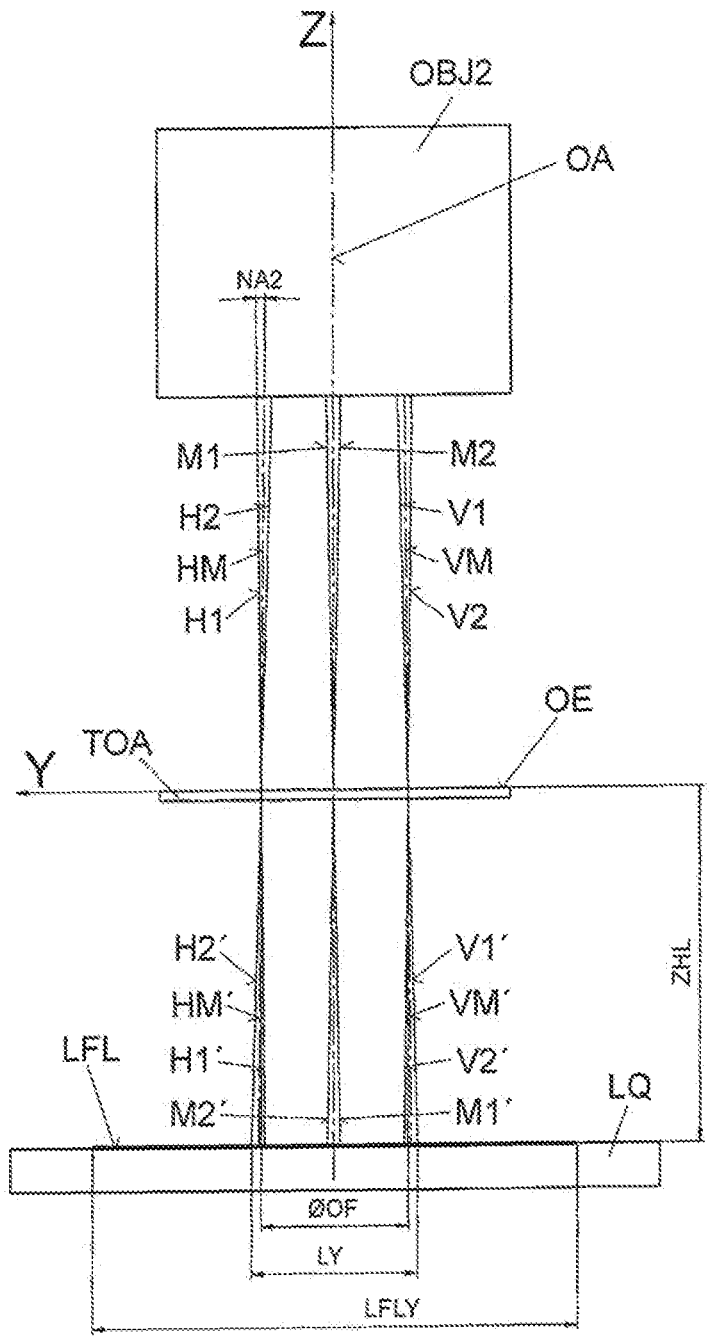
FIG. 38: shows, in a side view, a schematic illustration of edge beams for an objective in a situation, for which the use according to the invention of a prism film can be suitably applied.

In order to illustrate this problem, the boundary light beams are shown in FIGS. 37 and 38 starting from the object plane OE or from the top side of the transparent object support TOA, these boundary light beams being particularly relevant for the description of the image through the objective OBJ2 shown.

The light beams H1 and H2 and the middle light beam HM come from the rear object field edge, wherein the light beams H1 and H2 represent the theoretical aperture limitations of the depicted objective OBJ1 with the momentarily effective zoom factor 11 NA2 refers to the objective aperture of the objective OBJ2 in FIGS. 37 and 38.

Similarly, the light beams V1, V2 and VM come from the front object field edge, wherein V1 and V2 identify the theoretical aperture limitations of the objective OBJ1 shown with the currently effective zoom factor β.

It can be seen in FIGS. 37 and 38 that the light area LFL of the light source LQ has an extension LFLX in X direction and IFLY in Y direction. For a vignetting-free homogeneous illumination using the objective OBJ2 shown with the momentarily effective zoom factor β, however, only the light area extensions LX in X direction and LY in Y direction are required.

The illustrations in FIGS. 37 and 38 refer to a motorised zoom body MZK with an objective OBJ2 according to FIG. 1, wherein βP2 is effective as the current zoom factor according to FIG. 22.

It can be easily recognised from FIGS. 37 and 38 that there is no accessible ideal Z diaphragm position in the available installation space, in which a diaphragm BL with a diaphragm edge BK according to FIG. 37 could be meaningfully arranged. The insertion of a diaphragm in the X or Y direction would lead, due to the light beams hereby filtered out, to a darkening in the corresponding object field region, that is to say the illumination would be highly inhomogeneous due to the unilateral illumination. For example, the incorporation of a diaphragm from the positive Y direction would initially completely filter out the rear light beams H1, HM and H2, whereby the rear limit of the object field would be totally darkened.

The problem of the inaccessible illumination pupil is circumvented by the use of a prism film to change the light distribution.

The distance ZHL from the light area LFL to the object plane OE or the upper side of the transparent object support TOA is additionally identified here.

FIG. 39 shows the view of FIG. 38, wherein the back-projected light beams are not shown. According to the invention means are provided between the light source LQ and the transparent object support TOA which convey the illuminating light into a different light distribution.

At a distance HPR from the light area LFL of the light source LQ, there is the rotation axis DAPR, about which a prism film PR can be rotated or tilted. Due to the current angle of inclination φ with respect to the object plane OE, the effective length of the prism film PRYL can also be described as a projection onto the object plane OE or the Y axis. The proportion of PRYL on the positive Y half-axis is PRYP, the proportion of PRYL on the negative Y half-axis is identified by PRYN.

FIG. 40 shows an enlarged detailed view of the prism film PR and illustrates its working principle. The light beam STE entering along the optical axis OA meets the main flank HF of a micro prism PRM comprising a micro prism structure PRS with the division TE and the prism angle £. The light beam leaves the prism film PR as an outgoing light beam STA at a deflection angle δ with respect to the optical axis OA, that is to say relative to its original direction as an incident beam STE. The micro prisms PRM respectively also have a subsidiary flank NF which, together with the main flank, in practice brings about a certain beam deflection. With the inclination φ of the prism film PR, not only the deflection angle δ changes through the beams STE deflected via the main flank HF, but also the light portions between the main flank HF and the subsidiary flank NF. In addition the transitions between the main flanks HF and the subsidiary flanks NF are respectively identified by rapid angle changes which also bring about advantageous contrasting effects.

Due to the plurality of adjacent micro prism structures PRS, this deflection behaviour also applies to light beams which are incident in parallel.

According to the invention for example a prism film PR of the type IDF II of the company 3M can be used. It consists of a carrier material TM, to which a micro prism structure PRS comprising micro prisms PRM is applied, so that a total thickness of t results. With this arrangement, with an angle of inclination φ of the prism film PR of 0°, the deflection angle δ is approximately 20°. The structure of the prism film thereby continues in the X direction.

Figure 41:
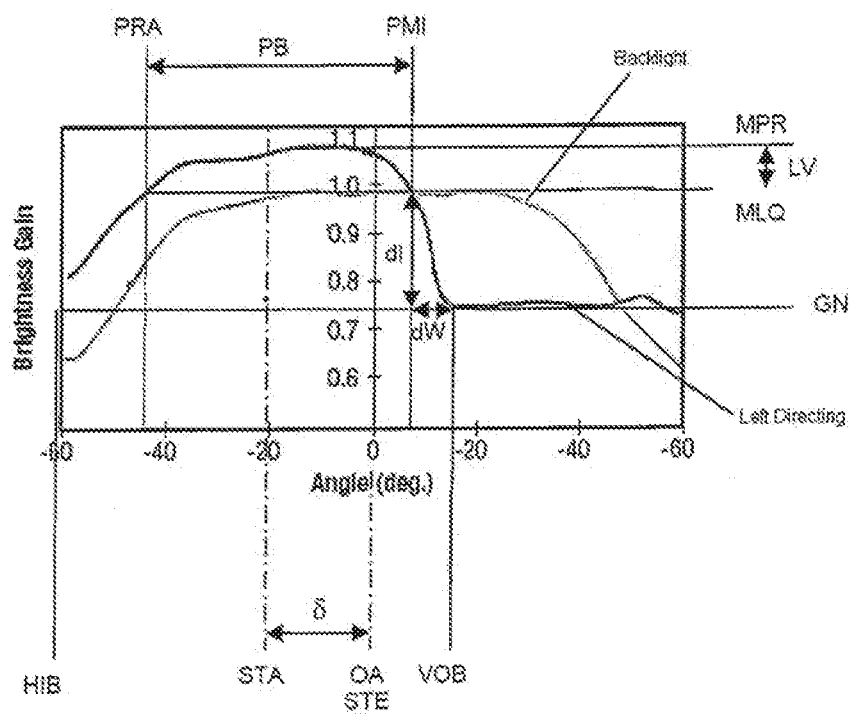
FIG. 41: shows a diagram clarifying light distributions measured with and without prism film.

In order to illustrate the function, FIG. 41 shows the measured deflection characteristic, published by 3M, of the IDF II prism film PR. The previously described deflection characteristic in FIG. 40 applies only to the main propagation direction STA of the illuminating light subject to the precondition of an incident light beam STE, orientated perpendicularly to the light area LFL, on the solely effective main flank HF of the micro prism PRM comprising the micro prism structure PRS. Starting from a light source LQ, the illustration in FIG. 41 shows two intensity curves over the angle according to the prism film:

the light distribution of a light source LQ without prism film; curve: "backlight", the light distribution of the same light source LQ with orientation of the deflection to the left; curve: "IDF II Left Directing".

The prism film PR is advantageously orientated so that the deflection is always inclined away from the user in such a way that dazzling can be excluded. This corresponds according to FIG. 39 to a deflection into the YZ plane with positive half-axes. In the illustration of FIG. 41 therefore only one direction is considered: the orientation of the deflection to the left; curve: "left directing".

The light distribution for the redistributed illuminating light has a main propagation direction STA which differs from the original main propagation direction of the illuminating light STE. The direction of the middle axis of the imaging optical path OA deviates from the direction of the main propagation direction of the redistributed illuminating light STA which shines through the object by the deflection angle δ. An inclined light illumination from one side is thereby achieved. That is to say, a clearly recognisable asymmetrical light distribution is produced from an originally symmetrical light distribution. The light distribution does not cause any fundamental limitation of the angle spectrum compared with the original main propagation direction of the illuminating light OA, but instead only an intensity lowered to a clearly reduced base level GN in certain angle regions and a light amplification in the remaining angle region between the front limit VOB and the rear limit HIB.

The large maximum difference between the different levels of the light intensity (MPR in relation to GN) of closely adjacent angle regions (from VOB to approximately OA) leads, in combination with the inclined light illumination, to a clearly visible contrast enhancement.

In addition the prism film PR causes, in a relatively large angle region, through the redistribution of the illuminating light, a light amplification LV compared with the maximum level MLQ of the light intensity of the light source LQ without prism film PR. That is to say, certain light portions which would completely disappear with normal filtering-out, are used through the redistribution for a brightness and contrast enhancement. The base level GN of the light intensity at least present in all relevant angle regions and the good mixing of the light beams from different regions of the micro prism structure PRS ensure homogeneous illumination with a transmitted light—bright field characteristic. In spite of the deflection via the prism film PR through refraction, the mixing over different regions of the micro prism structure PRS also leads to an illumination which is homogeneous in terms of colour.

A plateau width PB of the light intensity of the redistributed illuminating light around the main propagation direction STA between the plateau edges PMI and PRA is also indicated in FIG. 41. PMI thereby identifies the edge of the plateau width PB which has the shorter distance from the original main propagation direction STE. On the other hand PRA identifies the edge of the plateau width PB which has the greater distance from the original main propagation direction STE. PB is defined by the reduction or increase in the light intensity to the value MLQ.

The advantages described in relation to FIG. 41 can be achieved in a particular way if the prism film PR is orientated so that the micro prism structure PRS points towards the light source LQ. If the micro prism structure PRS is orientated in the direction of the object plane OE, a middle beam deflection is indeed produced which corresponds approximately to the angle δ, but the light distribution according to FIG. 41 then no longer applies. The application of the prism film PR according to the invention thus advantageously refers to an orientation of the micro prism structure PRS in the direction of the light source LQ. In this orientation, the contrast can be varied with the angle φ, as the deflection characteristic of the prism film PR hereby changes within the usable range. This change in the deflection characteristic via the angle φ is very advantageous as it is only through this that an optimal adaptation to different optical imaging systems can be achieved, that is to say to different combinations of objective OBJ and zoom body MZK with zoom factor β. Practical trials have shown that the optimal settings for the angle φ are so different for different optical imaging systems that a uniform setting with a fixed angle φ for this would be disadvantageous. A contrast improvement would indeed be achieved but the deflection characteristic would not yet be optimal.

FIG. 41 shows only an angle region of +/−60°. Through trials it has been ascertained that with a light source LQ which radiates light in the whole angle range of +/−90°, in the case of use according to the invention of an IDF II prism film PR together with this light source LQ, a certain base brightness is also still present in the two edge angle regions between 60° and 90°.

A high intensity white light LED surface light with a directed illumination characteristic, that is to say it does not radiate light evenly in all directions, provides particularly good contrasts. The light intensity decreases instead with increasing deviation from the axis orientated perpendicularly to the light area LFL. This applies in particular for the edge regions. A light distribution thereby results which is still relatively similar, with an indicated nominal value of +/−30° for the angle range, to the light distribution of the curve "backlight" in FIGS. 37 and 38 (light source without prism film PR). Also with this light source LQ, when the prism film PR is used according to the invention in the whole angle region +/−90°, at least a certain base brightness is present. This has been confirmed through trials.

Figure 42:
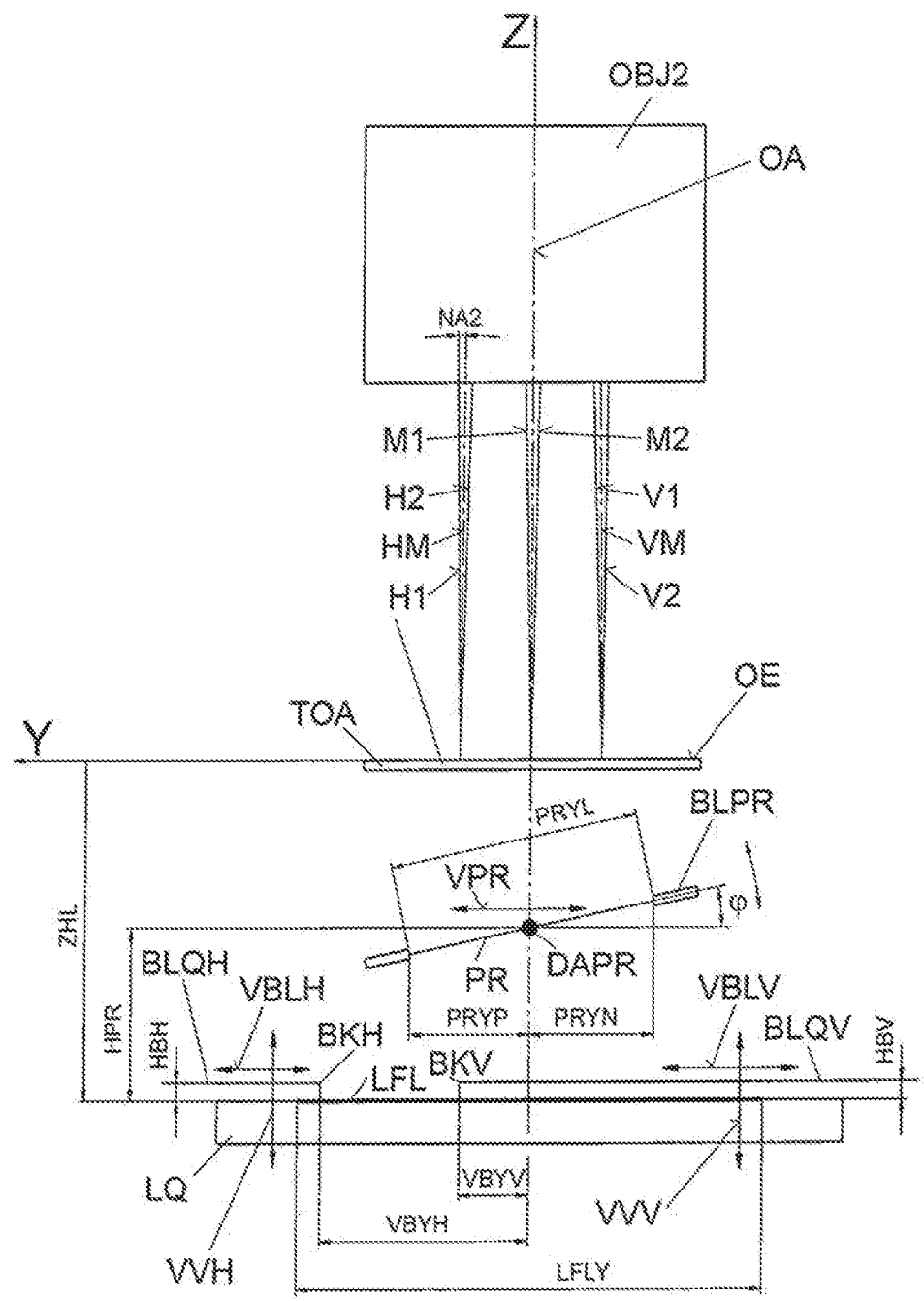
FIG. 42: shows an exemplary embodiment of an apparatus according to the in-vention with a prism film and two additional diaphragms.
Figure 43:
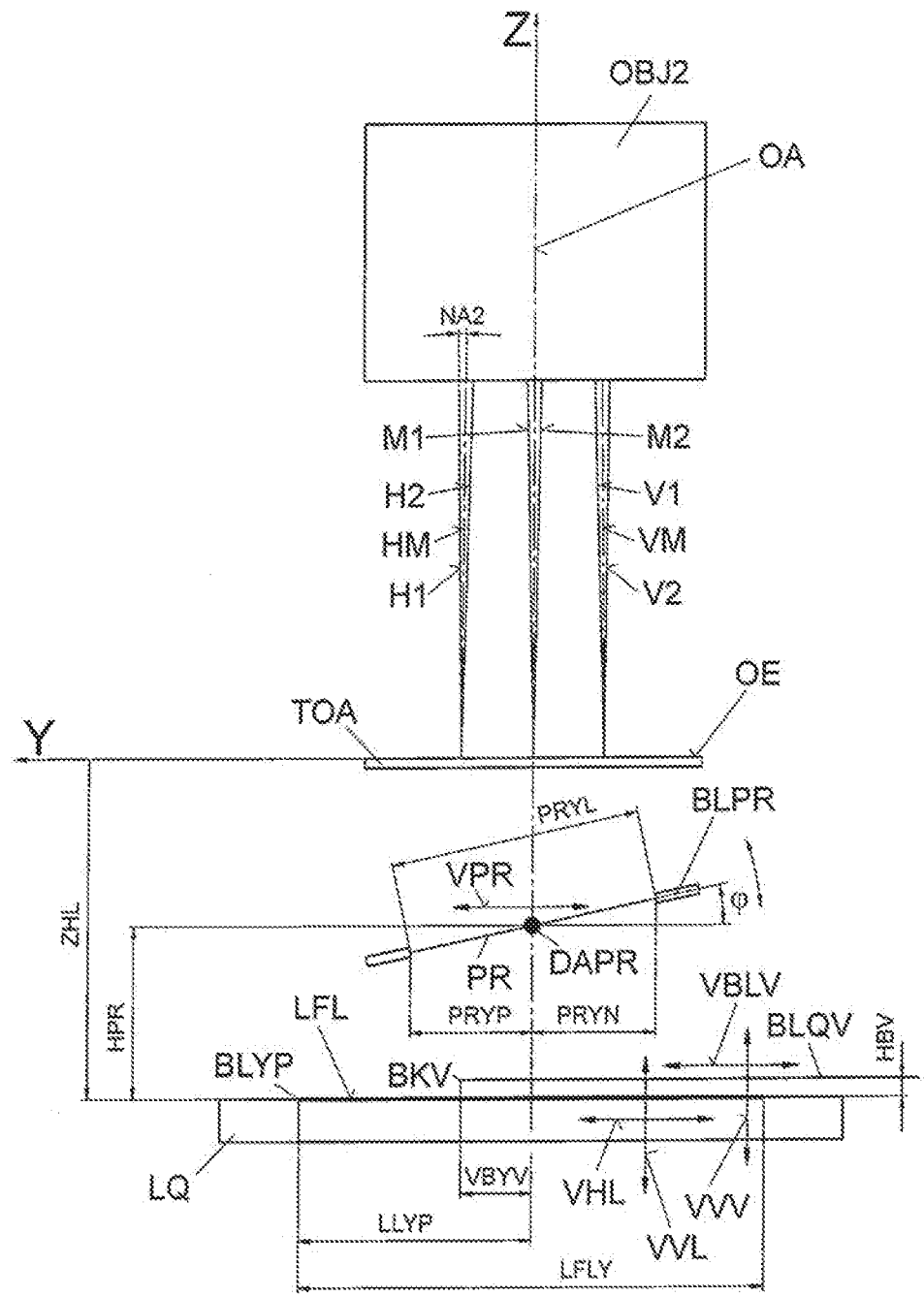
FIG. 43: shows a further exemplary embodiment of an apparatus according to the invention with a prism film and an additional diaphragm.

FIGS. 42 and 43 show possibilities for influencing the starting illumination in order to further increase the contrast. For this, only the relevant side views from the left are shown. The same reference numerals apply as in the previously described figures.

It can be recognised in FIG. 42 that the proportion LFLY of the light area LFL effective in the Y direction is additionally limited by a rear diaphragm BLQH and a front diaphragm BLQV. The rear diaphragm BLQH can be positioned in the displacement directions VBLH and WH in such a way that its diaphragm edge BKH is arranged at a distance HBH from the light area LFL and at a distance VBYH from the optical axis OA. Similarly, the front diaphragm BLQV can be positioned in the displacement directions VBLV and WV so that its diaphragm edge BKV is arranged at a distance HBV from the light area LFL and at a distance VBYV from the optical axis OA. It is to thereby be observed that the two diaphragm edges BKH and BKV lie in the direction of the positive Y half-axis. Through suitable positioning of the diaphragm edges BKH and BKV, the effective illumination can be adapted to the current optical system environment so that a clearly visible contrast improvement results.

FIG. 43 shows a modified variant, in which one of the two adjustable diaphragms can be omitted. In t his case, the rear diaphragm BLQH is omitted. Instead, the light source LQ can be positioned in the displacement direct ions VHL and VVL. The rear edge of the effective light area LFL thereby act s as a diaphragm edge BLYP. LED surface light s which can be used as a light source LQ usually have a sheet metal housing which ends with the light area and can thus be used as a diaphragm edge BLYP. It is to be observed that when the light source LQ is positioned in the displacement direct ion VVL, the distance HBV from the light area LFL to the front diaphragm BLQV also changes. That is to say, this distance must possibly be corrected once more afterwards. All other descriptions and functions correspond to those of FIG. 42.

By way of a third embodiment, however, an array of light sources in the light source LQ is conceivable, said array being selectively switched on and off in order to achieve the diaphragm effects.

Figure 44:
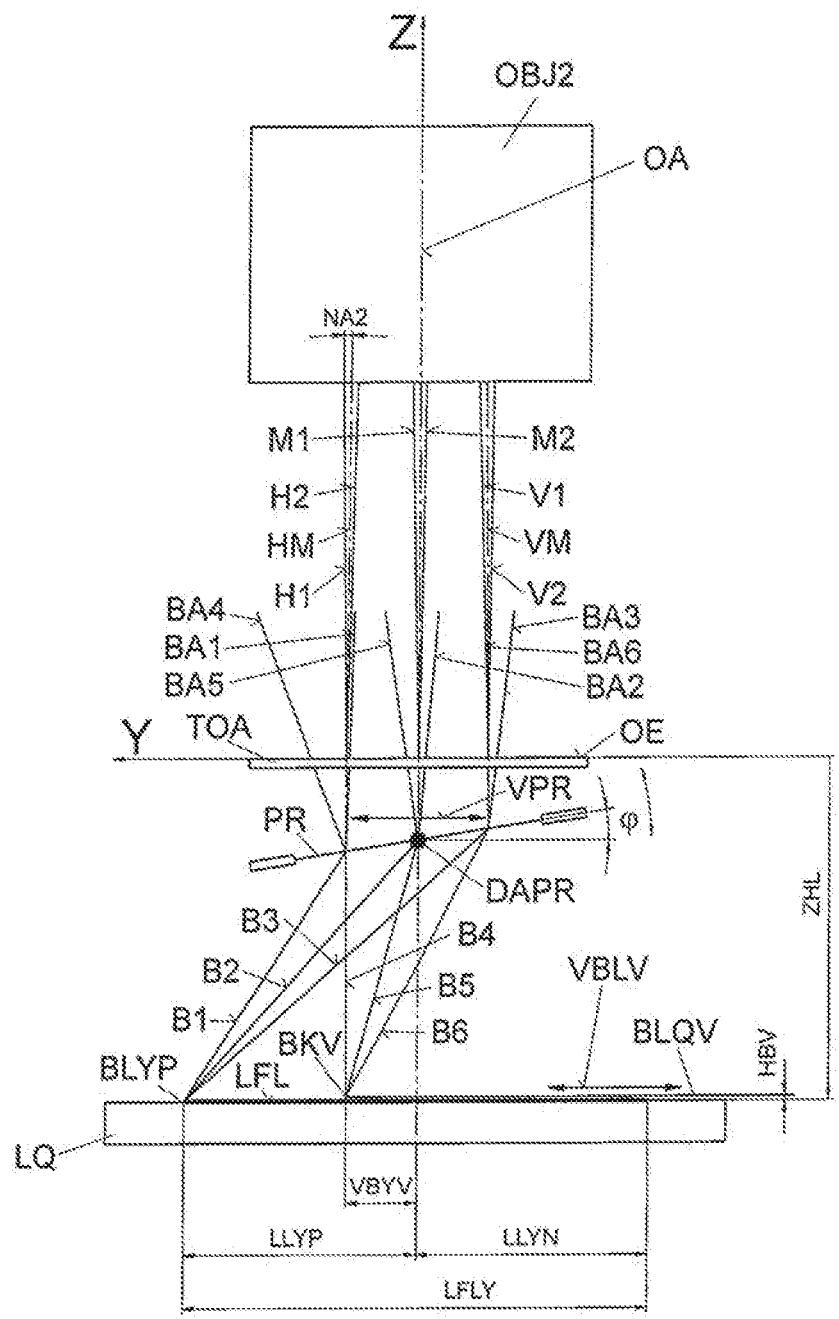
FIG. 44: shows a variant of the apparatus shown in FIG. 43.

FIG. 44 shows, on the basis of FIG. 43, a simplified possibility for increasing the contrast with an illustration of the corresponding main propagation directions of the illuminating light starting from the effective diaphragm edges BLYP (illuminating light beams B1, B2, B3) and BKV (illuminating light beams B4, B5, B6). In contrast with FIG. 43 a possibility of positioning the light source LQ is omitted, that is to say the diaphragm edge BLYP is in a fixed position. In addition the distance HBV is selected to be as small as structurally justifiable so that the front diaphragm BLQV, when positioning in the displacement direction VBLV, does not in any case grind on the light area LFL or on adjacent housing parts of the light source LQ. This distance HBV can be fixedly pre-set in structural terms so that a displacement possibility of the front diaphragm BLQV perpendicularly to the light area LFL can be omitted. The effective light area in the Y direction LFLY is thus reduced through the front diaphragm edge BKV and the light field limit BLYP in the Y direction.

LLYN indicates the expansion of the light area LFL in the negative Y direction here and LLYP indicates the expansion in the positive Y direction.

The distance from BLYP to the optical axis OA is LLYP here. The distance from BKV to the optical axis OA is VBYV. It is again to be observed that the two effective diaphragm edges BLYP and BKV lie in the direction of the positive Y half-axis.

The corresponding illuminating light beams BA1 to BA6 deflected by the prism film PR which can be displaced in the direction VPR result from the illuminating light beams B1 to B6, wherein these illuminating light beams BA1 to BA6 reproduce, for rough orientation, only the main propagation direction of the illuminating light according to the prism film. It can be recognised in FIG. 44 that the back-projected beams V1, VM, V2, M1, OA, M2, H1, HM, H2, which are characteristic for the imaging through the objective OBJ2 when using the motorised zoom body MZK with the set zoom factor β and the resulting effective aperture NA2, lie within the angle region. This angle region spans across the two deflected illuminating light beams which result from the two illuminating light beams starting from the two diaphragm edges BLYP and BKV.

Through the additionally effective narrowing of the light area LFL, certain light portions which predominantly do not cause or constitute usable scattered light can be filtered out. This has been demonstrated by trials. The contrast-increasing light distribution through the micro prism structure PRS pointing according to the invention to the light source LQ is principally maintained with a minimum base brightness. That is to say, the filtering-out of individual light portions does not lead to an inhomogeneous illumination and/or to resolution losses.

As the impairing light portions can change with the optically effective system environment, it is advantageous if at least the front diaphragm BLQV can be freely positioned in the displacement direction VBLV.

Figure 47:
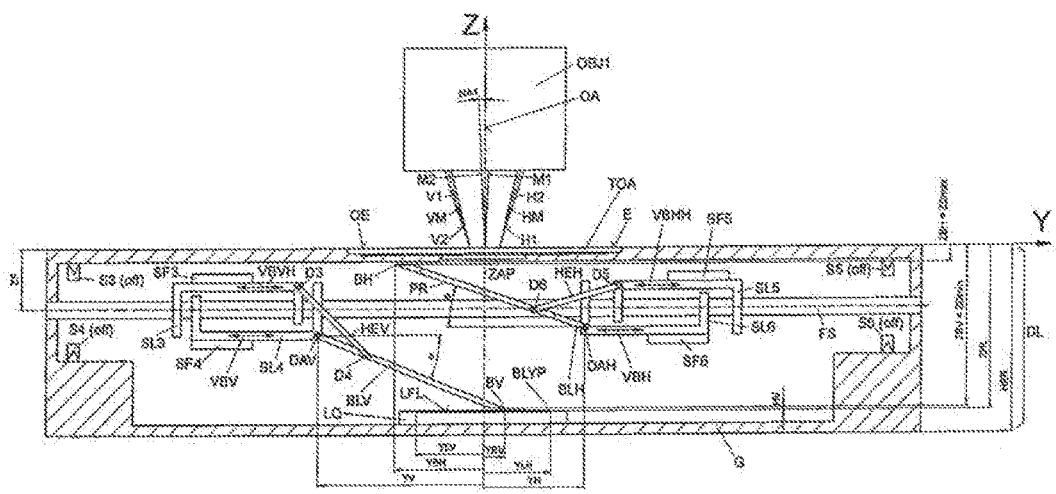
FIG. 47: shows an exemplary embodiment of an apparatus according to the invention with two diaphragm edges and a prism film.
Figure 48:
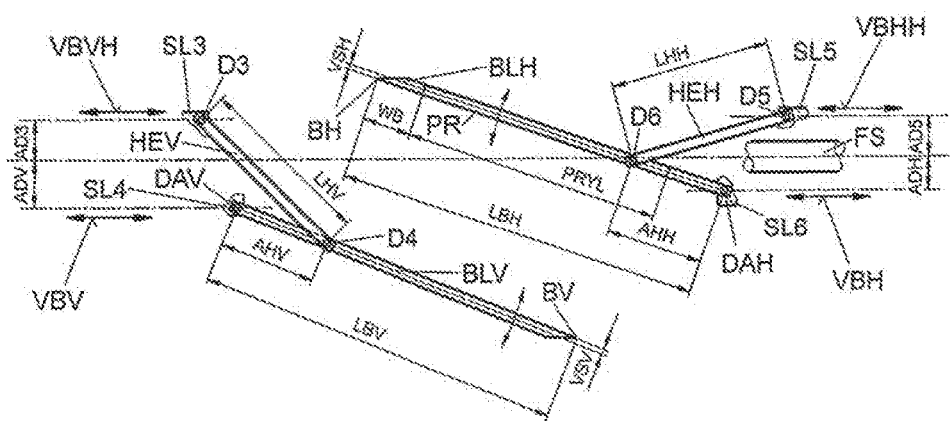
FIG. 48: shows a schematic illustration of the exemplary embodiment of FIG. 47.

The FIGS. 47, 48 show an embodiment of a transmitted light device DL in the right system as seen from the observer according to FIG. 1, i.e., the X axis points to the right, the Y axis points rearwards, the Z axis points upwards; comprising a detailed view of the lever mechanics. The same reference signs still apply.

This exemplary embodiment is characterized in that the two diaphragm/carriage systems are maintained in principle so that the contrast method can continue to be used with the height-adjustable diaphragm. However, the means for contrasting according to the invention are now in the diaphragm BLH, thus the prism film PR according to the invention. The whole arrangement according to the invention with prism film PR corresponds to the optical operating principle which was previously described using FIGS. 39, 40, 41, 44.

With the change in the Z coordinate ZBH of the diaphragm BLH, the angle φ between the prism film PR and the object plane OE also changes so that the prism film can be tilted according to the invention about a rotation axis parallel to the object plane. This rotation axis is now called DAH. Having regard to its operating principle, however, it is comparable with the previously described rotation axis DAPR, so that the field of protection of this application also includes the rotation axis DAH.

It can be recognised in FIG. 48 that the prism film has an effective length PRYL. There is an effective diaphragm width WB between the prism film PRYL and the diaphragm edge BH. This diaphragm width WB is preferably dimensioned so that coverage of the beam cross-section is still possible without the prism film PRYL notably impairing the function of a contrast method, wherein the diaphragm edge is positioned in dependence upon an effective entrance pupil in the direction of the optical axis.

The two diaphragms are moved via respectively two carriages, namely SL3 and SL4 and also SL5 and SL6. In order to detect the position of the carriages, a respective position sensor S3, S4, S5 and S6 and respectively an auxiliary position sensor S5H and S6H are present. Through switching flags SF3, SF4, SF5 and SF6, the position of the carriages relative to the position sensors S3, S4, S5 and S6 can be ascertained.

In the position of the carriages shown in FIG. 47, the position sensors S3, S4, S5 and S6 are not triggered and are accordingly "off".

The following are also indicated: D3 indicates a rotation axis for a lever HEV, via which the carriage SL3 is connected to the diaphragm BLV, wherein the rotation axis D3 is located at the connection point between the lever HEV and the carriage SL3, D4 indicates a rotation axis for the lever HEV at the connection to the diaphragm BLV; D5 indicates a rotation axis for a lever HEH, via which the carriage SL5 is connected to the diaphragm BLH, wherein the rotation axis D5 is located at the connection point between the lever HEH and the carriage SL5, and D6 indicates a rotation axis for the lever HEH at the connection to the diaphragm BLH.

LHH describes the length of the rear lever HEH between the rotation axes D5 and D6. LHV identifies the length of the front lever HEV between the rotation axes D3 and D4. FS indicates a guide path of a linear guide, e.g. via a guide rod. The carriages SL3, SL4, SL5 and SL6 can be moved on the guide path FS. The guide path is located at the Z coordinate ZF in relation to the object support.

The rear diaphragm can be displaced for variation of the contrast transversely to the optical axis OA. This is achieved through a synchronous movement of the carriages SL5 and SL6 along the displacement direction VBH or VBHH.

The same applies correspondingly to the front diaphragm, whereby the displacement directions VBV and VBHV are indicated in FIG. 47.

The components of the transmitted light device DL are arranged in a housing G.

In addition, FIG. 48 shows the distance AD3 between the guide path FS and the rota tion axis D3 and the distance AD5 between the guide path FS and the rotation axis D5. ADV identifies the distance between the guide path FS and the rotation axis DAV, while ADH indicates the distance between the guide path FS and the rotation axis DAH. Furthermore the lever length AHH between the rotation axes DAH and D6 and the lever length AHV between the rotation axes DAV and D4 are indicated.

YH and ZH (see also FIGS. 45 and 46) identify the momentary Y and Z coordinates of the rear rotation axis DAH. YBH indicates the momentary Y coordinate of the rear diaphragm edge BH. YBV identifies the momentary Y coordinate of the front diaphragm edge and YBV identifies the momentary Y coordinate of the front diaphragm edge BV. YV and ZV identify the momentary Y and Z coordinates of the front rotation axis DAV. In addition, accessories ZAP, or the interface for them, which can optionally be inserted in an adapter plate AP, are shown. The accessories ZAP can be for example polarisation filters, insert diaphragms or colour filters.

Figure 45:
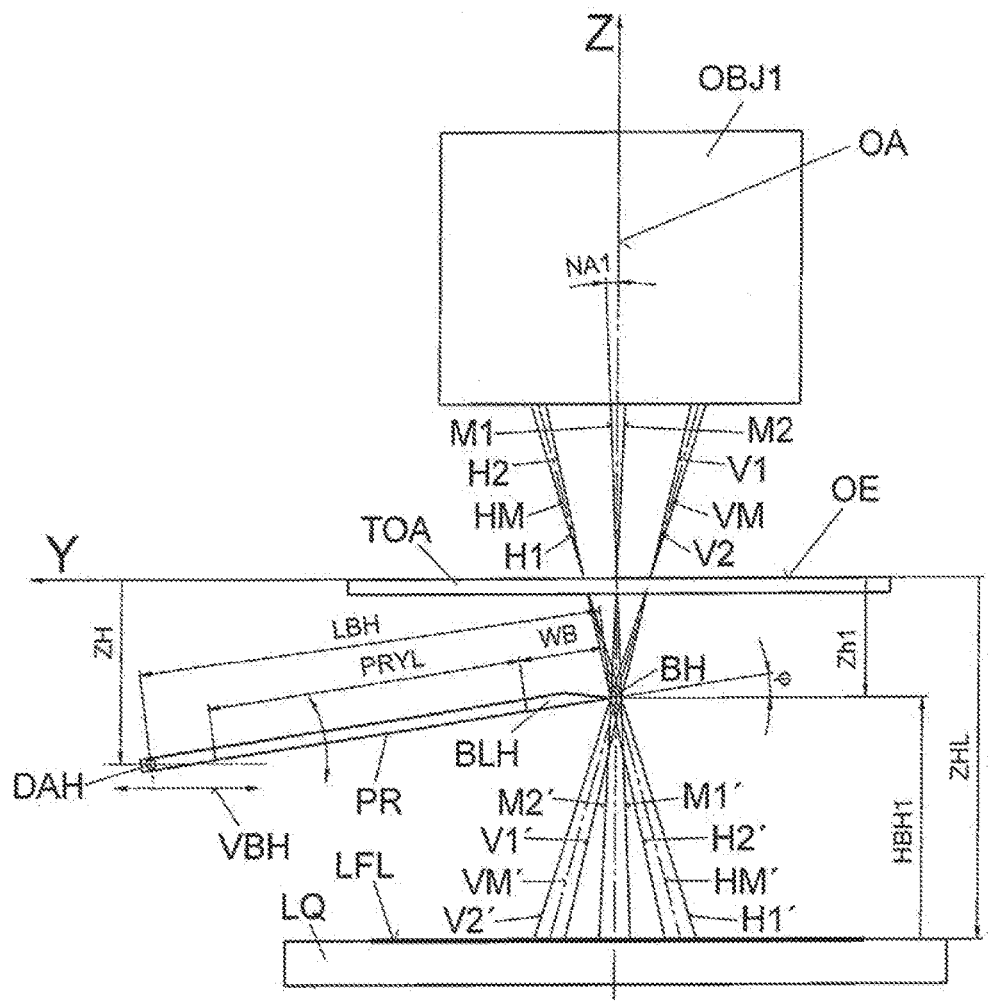
FIG. 45: shows an exemplary embodiment of an apparatus according to the invention, wherein the prism film is not optically effective.
Figure 46:
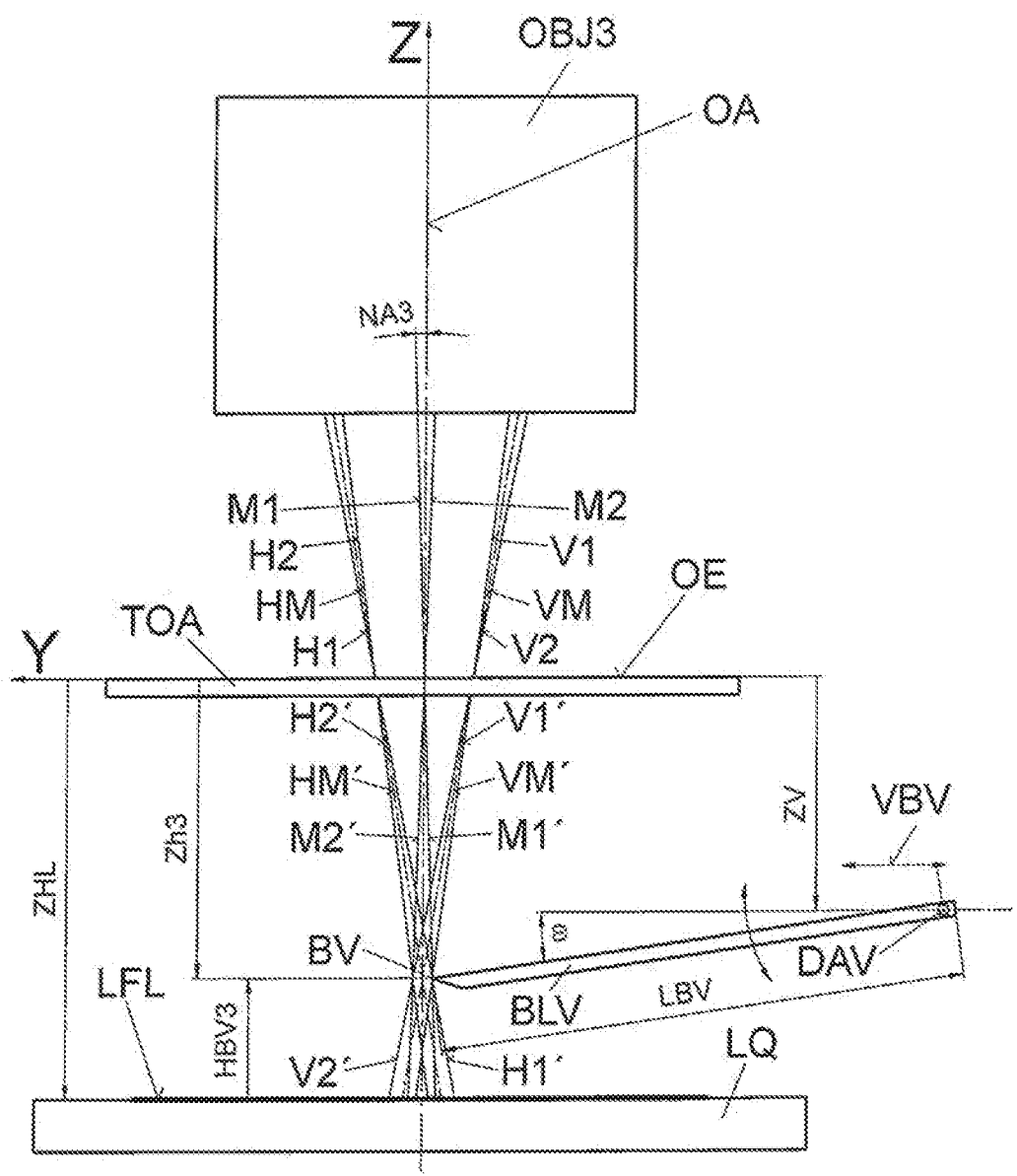
FIG. 46: shows a further exemplary embodiment of an apparatus according to the invention, wherein the prism film is not optically effective.

FIGS. 45 and 46 show the operating principle of the device according to the invention according to FIGS. 47, 48, thus when using a contrast method, wherein a dia phragm edge is positioned in the direction of the optical axis for setting the contrast, for the two different objectives OBJ1 and OBJ3. The prism film PR integrated in the dia phragm BLH is not thereby optically effective in this application. The same reference numerals and descriptions as those of the previously shown figures continue to apply.

FIG. 45 additionally shows the height distance HBH1, which defines the distance from the light area LFL to the rear diaphragm edge BH in the ideal Z diaphragm position for the objective OBJ1 on the zoom body MZK with the current zoom factor β.

Correspondingly, FIG. 46 shows with HBV3 the height distance from the light area to the front diaphragm edge BV in the ideal Z diaphragm position for the objective OBJ3 on the zoom body MZK with the current zoom factor β.

FIG. 45 further indicates with LBH the distance between the rear diaphragm edge BH and the pivot point DAH of the rear diaphragm BLH. Similarly, in FIG. 46, LBV indicates the distance between the front diaphragm edge BV and the pivot point DAV of the front diaphragm BLV.

The settable Z diaphragm coordinates of the two diaphragm—slide systems can also cover different regions of the complete setting options of the Z diaphragm edge coordinates, so that the installation space between ZDmin and ZDmax is split into two regions.

In another variant at least larger partitions or the whole installation space between ZDmin and ZDmax of the two diaphragms can be used, so that it can be chosen in the regions common to both diaphragms whether a regular diaphragm orientation without an azimuth angle is set, or a diaphragm orientation that is inverted, i.e. rotated about 180°, relative to the regular azimuth orientation is set.

An image which has been recorded through the right channel R of the objective OBJ2 with an arrangement according to FIGS. 37 and 38, wherein there are no means according to the invention for contrast enhancement between the light source LQ and the object plane OE, and wherein a zebrafish preparation with carrier glass is used as the object OB, has relatively low contrast. Hardly any structures and/or phase objects can be recognised.

If further images are recorded with the same object OB and the same optically effective objective—zoom body combination comprising objective OBJ2, zoom body MZK with zoom factor β, these images can be directly compared with each other.

An image of the object, wherein a usual VisiLED HCT base, which works with a diaphragm which can only be displaced in the Y direction in a fixed Z coordinate, was used for illumination, is highly inhomogeneous. It is only in a transition zone between a lower dark and an upper bright image region that the contrast has improved in relation to the image which was recorded without means according to the invention for contrast enhancement.

In the case of an image, for which the device according to the invention was used for illumination with an optical path as shown in FIGS. 39, 40, 41, 47, 48, and wherein the diaphragm BLV shown in FIGS. 47 and 48 was moved completely out of the optical path, so that it was not effective during the camera recording, the image is still homogeneous. In relation to the image which was recorded without means according to the invention for contrast enhancement, however, the contrast has clearly improved.

This was achieved through the following adjustment method:

The diaphragm BLH of FIGS. 47 and 48 is positioned so that the prism film PR is preferably irradiated without trimming. Subsequently, the Z coordinate ZBH is varied so that the contrast acquires a maximum value.

In the case of an image of the object, wherein the device according to the invention with an optical path as in FIGS. 39, 40, 41, 44, 47, 48 is used for illumination, and wherein the diaphragm BLV shown in FIGS. 47 and 48 was effective during recording by the camera, the image is still homogeneous. In relation to the image which was recorded without means according to the invent ion for contrast enhancement, however, the contrast has very greatly improved.

This was achieved through the following adjustment method:

The diaphragm BLH of FIGS. 47, 48 is positioned so that the prism film PR is preferably irradiated without trimming. Subsequently, the Z coordinate ZBH is varied so that the contrast acquires a maximum value.

After that, the diaphragm edge BV with constant Z coordinate ZBV=ZDmin is brought out of the negative Y direction into the optical path until a colour vignetting at the image edge becomes visible. Subsequently, the Z coordinate ZBH is varied again so that the contrast acquires a maximum value and the diaphragm BV with constant Z coordinate ZBV=ZDmin is again moved so far out of the optical path until the vignetting is no longer visible in the image.

With the apparatus and the method according to the second aspect of the invention a method for transmitted light illumination is provided which is suited in particular for illuminating low-contrast transmitted light objects on stereo microscopes and macroscopes. In addition, applications of this method in transmitted light devices are described. The invention provides a cost-effective transmitted light—bright field illumination method which is suited in particular for illuminating low-contrast transmitted light objects in the smaller overview magnifications on stereo microscopes and macroscopes. The method provides a very homogeneous illumination, does not significantly limit the resolution capacity and provides adequate illumination intensities. In addition, it can also be used with a low structural height of the transmitted light device without visible impairments and is preferably suited for objectives, of which the ideal Z diaphragm positions are at a greater distance from the object support and/or possibly lie above it. Furthermore, the illumination method according to the invention can be combined with other illumination methods which are suited for accessible ideal Z diaphragm positions, so that all illumination methods can be applied in a single transmitted light device. Finally, the favourable illumination settings can also be easily set and reproduced for untrained users. In addition the method is also suited for cost-effective objective—zoom body combinations which do not have corrected pupil planes which are fixed over the zoom range and do not compulsorily have to be usable for polarisation optical methods.

FIG. 49 shows a table with an overview of different imaging systems with optical paths, the beam positions in the entrance plane of the objective and beam positions and beam dimensions in a plane of the light area. The microscope types differ through their imaging systems which have observation channels arranged differently in relation to the objectives.

It is possible with special objective changers within the scope of the stereoscopic observation systems to set the objectives so that a switch can be made between 3D observation and 2D observation.

In the first line of the table, different imaging systems are indicated, namely Discovery 3D, Discovery 2D, Lumar 3D, Lumar 2D and AxioZoom 2D.

Discovery 3D thereby describes a stereo microscope with a left channel L and a right channel R, wherein both channels L, R must be used and illuminated.

Discovery 2D describes a stereo microscope with a left channel L and a right channel R, wherein the objective is arranged at the right channel R so that only the right channel R is to be illuminated.

Lumar 3D is intended to be understood as a fluorescence stereo microscope with a left channel L and a right channel R, wherein both channels L, R are forwardly offset in relation to the object centre in order that a third channel (not shown) for fluorescence excitation can also irradiate the objective. Both channels are thus to be illuminated here.

Lumar 2D describes a fluorescence stereo microscope with a left channel L and a right channel R, wherein likewise both channels are forwardly offset in relation to the object centre so that a third channel (not shown) for fluorescence excitation can irradiate the objective. However, only the right channel is thereby used for observation. That is to say, only the right channel R is to be illuminated.

Finally, AxioZoom 2D describes a macroscope with one channel, that is to say only this one channel is to be illuminated.

The columns two to six in the table in FIG. 49 indicate the abovementioned imaging systems. The first column provides information regarding the content of the table for the different imaging systems.

The second line shows the front views with the principal optical path to the imaging systems, wherein only the main beams are shown. An XYZ coordinate system serves for orientation. The light beams go from a light area LFL and run through a diaphragm plane, an object plane OE, on which a sample to be examined can be located, and an objective OBJ. This is indicated by two symbolic main planes.

The third line shows the top views, thus as seen from above through the objective OBJ, with the principal optical paths to the imaging systems. Only the main beams used on the imaging side are shown. These are represented as bold circles and constitute illumination centres. This third line shows the positions of the main beams on the imaging side in the XY plane. For the imaging systems Discovery 3D, Discovery 2D and AxioZoom 2D, the illumination centres lie on the X axis. On the other hand, for the imaging systems Lumar 3D and Lumar 2D, the illumination centres are forwardly offset and do not therefore lie on the X axis. In addition it can be recognised that the imaging systems, in which two channels are to be illuminated, thus Discovery 3D and Lumar 3D, have two illumination centres, whereas the remaining imaging systems with merely one channel to be illuminated have only one illumination centre.

The bottom line shows the top views, that is to say as seen from above directly onto the light area LFL, with the principally required light area LFL for complete illumination for the corresponding imaging systems. The main beams used as illumination centres are represented by bold circles. The encirclements around these main beams identify the effective portions of the light area. According to the invention the light area LFL is to be covered outside of the encirclements by diaphragms. The entry of scattered light into the objective OBJ is thereby reduced and the contrast is improved. The encirclements around the main beams can be determined through a back-projection of the imaging edge beams, similarly to FIGS. 3 to 7.

FIG. 50 shows a table with different diaphragm forms which are suited for the previously described imaging systems.

The diaphragm forms shown can be realised according to the invention with one or preferably more diaphragms. In order to reduce undesired scattered light, the diaphragms are arranged in the diaphragm plane shown in the second line of FIG. 49.

In the second line of the table of FIG. 50, top views, thus views from above onto the diaphragm plane, with the principal optical path to the imaging systems are shown. The optical path is illustrated by the bold circles. In addition the respectively ideal diaphragm form for scattered light reduction is shown. These ideal diaphragm forms are dependent, amongst other things, upon the ideal size of the light area LFL of FIG. 49.

In the third line of the table of FIG. 50, the top views with the principal optical path to the imaging systems are shown. An approximated diaphragm form for scattered light reduction is respectively shown. These diaphragm forms can be realised according to the invention through a combination of an iris diaphragm with two diaphragms each having a linearly extending diaphragm edge. The iris diaphragm and the two diaphragms having a linear diaphragm edge can be displaced in the XY plane independently of each other. The two linear diaphragm edges preferably extend parallel to a connecting direction of the two channels L and R to be illuminated. The ideal diaphragm form from the second line can hereby be approximated very well.

In the fourth line of the table of FIG. 50, the top views are in turn shown with the principal optical path to the imaging systems. Here, a more greatly simplified diaphragm form for scattered light reduction is shown. These diaphragm forms can be realised according to the invention through a combination of four diaphragms each having a linearly extending diaphragm edge. These four diaphragms can in turn be displaced in the XY plane independently of each other.

Figure 51:
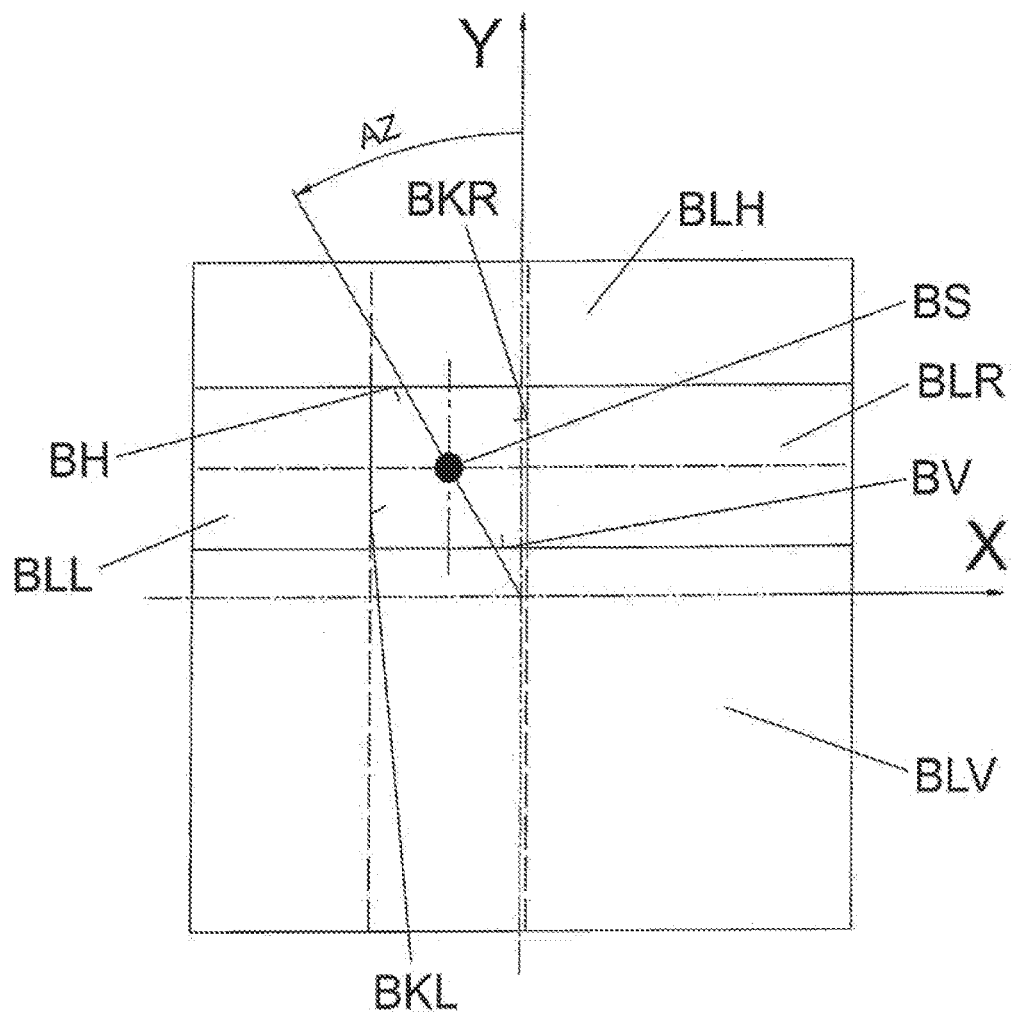
FIG. 51: shows a schematic view of four diaphragms of an apparatus according to the invention which are set for a certain microscope type.

FIG. 51 shows, schematically, four diaphragms of an apparatus according to the invention. The positioning of the diaphragms is adapted to the imaging system Lumar 2D, that is to say the simplified diaphragm form from the bottom line, fifth column of FIG. 50 is set.

The four diaphragms comprise a left diaphragm BLL having a linear diaphragm edge BKL, a right diaphragm BLR having a linear diaphragm edge BKR, a front diaphragm BLV having a linear diaphragm edge BV and a rear diaphragm BLH having a linear diaphragm edge BH. A rectangle is left free between them, in which the illumination centre BS lies. This is arranged at an azimuth angle AZ in relation to the positive half-axis of the XYZ coordinate system.

By displacing the four diaphragms in the XY plane, the other diaphragm forms from the bottom line of the table of FIG. 50 can also be set.

Figure 52:
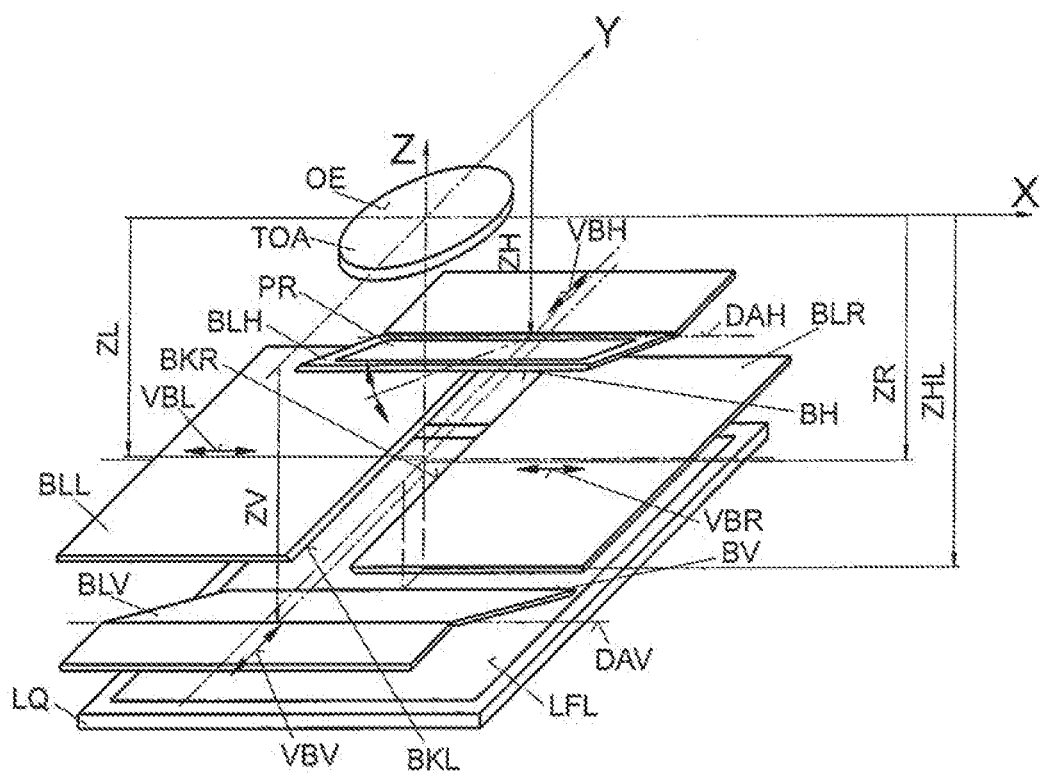
FIG. 52: shows a schematic perspective view of four diaphragms of an apparatus according to the invention.

FIG. 52 shows a schematic perspective illustration of four diaphragms BLL, BLR, BLV and BLH of an apparatus according to the invention. A light source LQ with a light area LFL is present below the diaphragms. The transparent object support TOA which represents the object plane OE is located above the diaphragms.

The diaphragms BLL, BLR, BLV and BLH each have a linear diaphragm edge BKL, BKR, BV and BH so that the simplified diaphragm forms from the fourth line of the table of FIG. 50 can be set. BKL describes the left diaphragm edge and BKR correspondingly the right diaphragm edge. In the positioning of the four diaphragms illustrated, the diaphragm form is adapted to the imaging system Lumar 2D. As shown in the fourth column in FIG. 7, a free space between the four diaphragms is set for the imaging system AxioZoom 2D, said free space being square and the illumination centre BS lying on it.

In order to be able to set the size and position of the free space between the four diaphragms for the respective imaging system, the diaphragms can be displaced in the XY plane.

According to the invention the diaphragms are preferably adjustable not only in the XY plane for the reduction of scattered light but also in the Z direction. The advantages described above can hereby be achieved.

The following references are also relevant in FIG. 52: VBH=displacement direction of the rear diaphragm; VBL: displacement direction of the left diaphragm; VBR=displacement direction of the right diaphragm; and VBV which describes a displacement direction of the front diaphragm. ZH describes in FIG. 52 the Z coordinate of the rear rotation axis DAH. ZL and ZR respectively refer in FIG. 52 to the Z coordinates of the left and right diaphragm edge. Finally, ZV describes the Z coordinate of the front rotation axis DAV.

According to the invention it can be provided that in dependence upon the objective—zoom body combination used, a previously defined diaphragm form is adjusted. With a change from a 2D to a 3D observation, the diaphragm shape adjusts without further action from the user, for instance. The previously defined diaphragm forms are defined by the respective positions of the available diaphragms.

According to the invention a contrast mode "azimuth" can be selected. In this mode, the form of the free space between the diaphragms is fixed but the X-Y position of the free space can be changed. Different contrasts are hereby possible during the observation.

The diaphragms are not required to lie according to the invention in the same Z plane. In the embodiment shown the four diaphragms are offset relative to each other in the Z direction. The diaphragm edge BV of the lowermost diaphragm BLV and the diaphragm edge BH of the uppermost diaphragm BLH are additionally height adjustable. In this connection, it is possible to rotate them about a front rotation axis DAV or a rear rotation axis DAH, respectively. No height adjustment is provided for the left and right diaphragm.

The most ideal form in terms of cost is a linear diaphragm edge BK as this can be easily produced without great resources. Slightly curved diaphragm edges BK can also be used in principle but then, with the tilting of the diaphragm BL with fixed XYZ coordinates of a single point on the diaphragm edge BK with increasing distance from this point along the diaphragm edge BK, the Y and Z values also change, which is in practice difficult to manage. Curves of the diaphragm edge BK which lie in the region of the usual manufacturing tolerances and/or which do not yet lead to visible non-homogeneities do not play a role here.

Furthermore it is possible to use an array which can be switched in terms of pixels such as for example an LCD array as a height-adjustable diaphragm. This design has the advantage that the transmission pattern of the diaphragm can be adapted to the pupil form. In addition, other patterns are also advantageous. The reversal of the diaphragm edge, thus switching to a diaphragm edge offset or rotated by 180°, is then to be realised for example through electronic control. A rotation of the diaphragm is also possible. Last but not least, a rapid change of the transmission pattern to different forms is possible, these forms bringing about, above the flicker frequency of the eye, approximately 50 Hz, a mixed contrast effect.

States of a liquid crystal array 20 to be used as a diaphragm are shown schematically in FIGS. 31 to 35.

Figure 33:
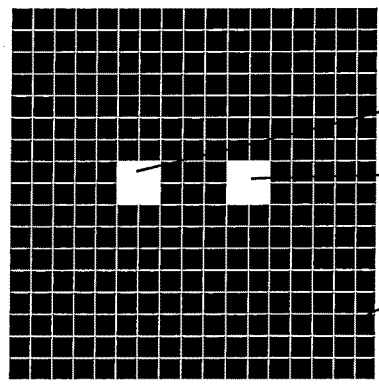

FIG. 31 shows a situation in which all pixels of the liquid crystal array 20 are set as impermeable. In FIG. 32, a central region 22 of the liquid crystal array 20 is transparent. A round diaphragm form can hereby be approximated. FIG. 33 shows a situation with two transparent regions 24. This is suitable for a microscope type with two channels clearly separated from each other. Finally, FIGS. 34 and 35 show cases, in which half of the liquid crystal array 20 is set as impermeable and the other half as transparent. Diaphragm edges 26, 28 are thereby formed which can be used for the apparatus according to the invention and the method according to the invention. Very good approximations to the ideal diaphragm forms shown in the table of FIG. 50 can advantageously be achieved with the liquid crystal array 20.

Figure 53:
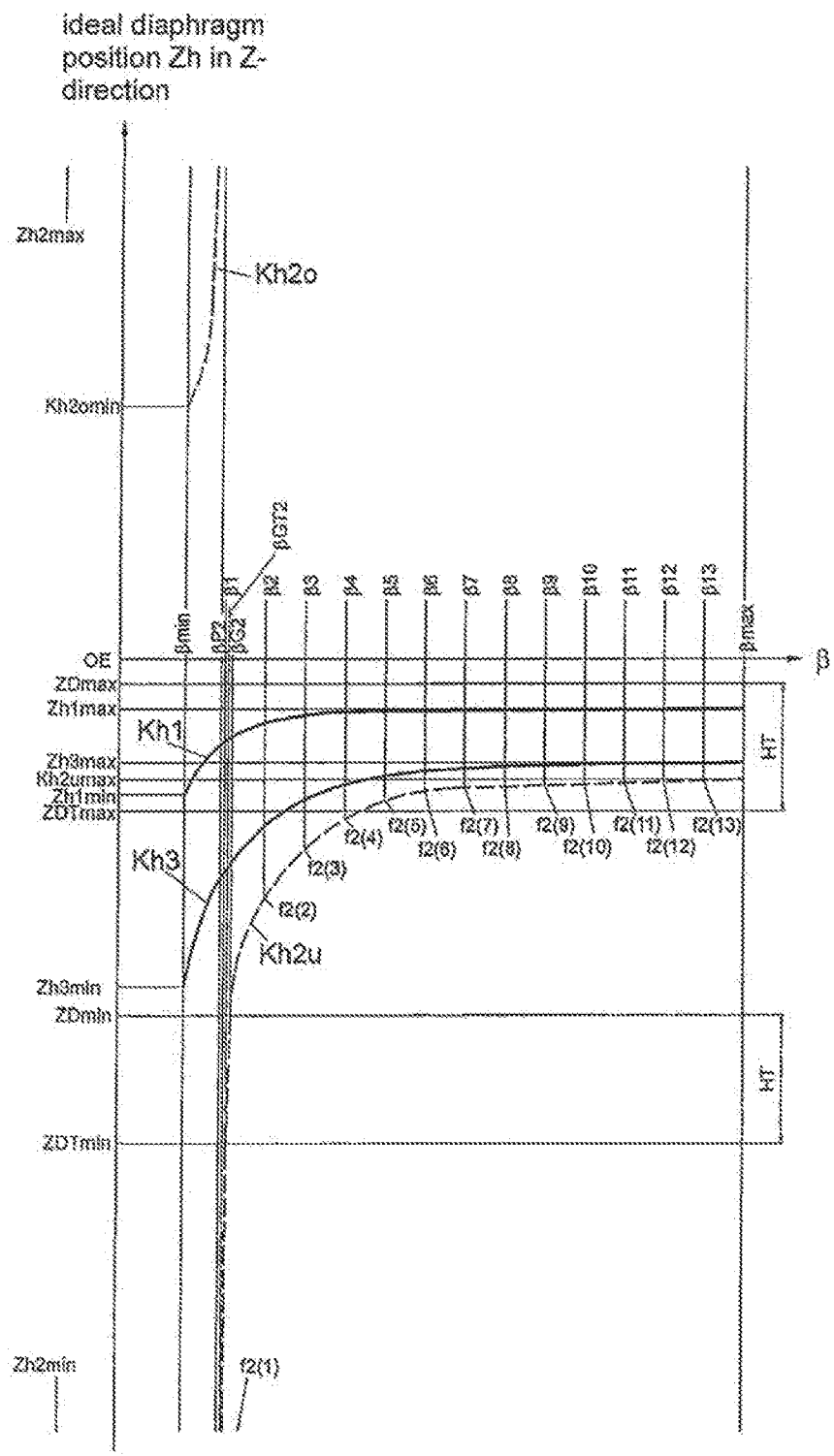
FIG. 53: shows a diagram, in which the optimal positions for the diaphragm edge are plotted in dependence upon the zoom factor.

FIG. 53 shows by way of example the determined curves Kh1, Kh2o with Kh2u and Kh3 for the ideal Z diaphragm positions Zh to the three objectives OBJ1, OBJ2, OBJ3 of FIG. 1 in dependence upon the zoom factor $\beta$ of the motorised zoom body MZK used in relation to the XYZ coordinate system, of which the origin lies in the object plane OE. The curves respectively begin with the smallest zoom factor $\beta$min and end at the largest zoom factor $\beta$max of the zoom body MZK of FIG. 1.

Ideal diaphragm positions in Z direction for magnifications β1, β2 to β13 are indicated with f2(1), f2(2) to f2(13) and these have been determined with the objective OBJ2 on the motorised zoom body MZK.

Without a sample support table the ideal Z diaphragm positions of the two curves Kh1 and Kh3 of the corresponding objectives OBJ1 and OBJ3 lie, with typical curve form in the XYZ coordinate system between ZDmin and ZDmax which corresponds to the region, in which a height-adjustable diaphragm can be constructively realised. These boundaries thus characterise the usable installation space for the contrast method according to the invention within the contrast device DL according to the invention. In normal use, the uppermost diaphragm position ZDmax is defined by the transparent object support TOA in the transmitted light device DL. The diaphragm may not contact the transparent object support TOA from below under any circumstances. The lowermost diaphragm position ZDmin results from the limited construction height HER of the transmitted light device DL in FIG. 1, which must remain below a certain height for ergonomic reasons. The housing of the transmitted light device DL of FIG. 1 has a height HER of approximately 100 mm. A transmitted light illumination device DL without further accessories should not be higher.

The minimum ideal Z diaphragm positions of the curves Kh1 and Kh3 are called Zh1 min and Zh3 min. Accordingly the maximum ideal Z diaphragm positions of these curves are called Zh1max and Zh3max. The minimum ideal Z diaphragm position of the upper curve section Kh2o is identified by Kh2omin and the maximum ideal Z diaphragm position of the lower curve section Kh2u with Kh2umax.

The objective OBJ2 of FIG. 1 has in principle a different curve progression which is typical for certain objectives OBJ. It can be seen in FIG. 53 that the curve for the objective OBJ2 comprises two curve sections Kh2o and Kh2u. Between these curve sections, in case of a zoom factor β P2, there is a pole position, i.e. the curve progression springs here from the top curve section Kh2o from plus infinity to the lower curve section Kh2u towards minus infinity.

The minimum and maximum ideal Z diaphragm positions of the curve sections Kh2u and Kh2o, i.e. Zh2 min and Zh2max, are thus infinite or lie practically so far apart that the corresponding ideal Z diaphragm position can no longer be constructively set. In the upper curve section Kh2o, the ideal Z diaphragm position is at any rate unreachable, as the diaphragm BL with the diaphragm edge BK would have to be arranged above the object plane OE. In the lower curve section Kh2u the ideal Z diaphragm layer can be initially ensured only from the zoom factor 3G2 and is then precisely in the boundary position ZDmin. The described contrasting method between the zoom factors βmin and 3G2 cannot therefore be used with all advantages. Another suitable contrasting method is preferably to be determined for this.

Figure 54:
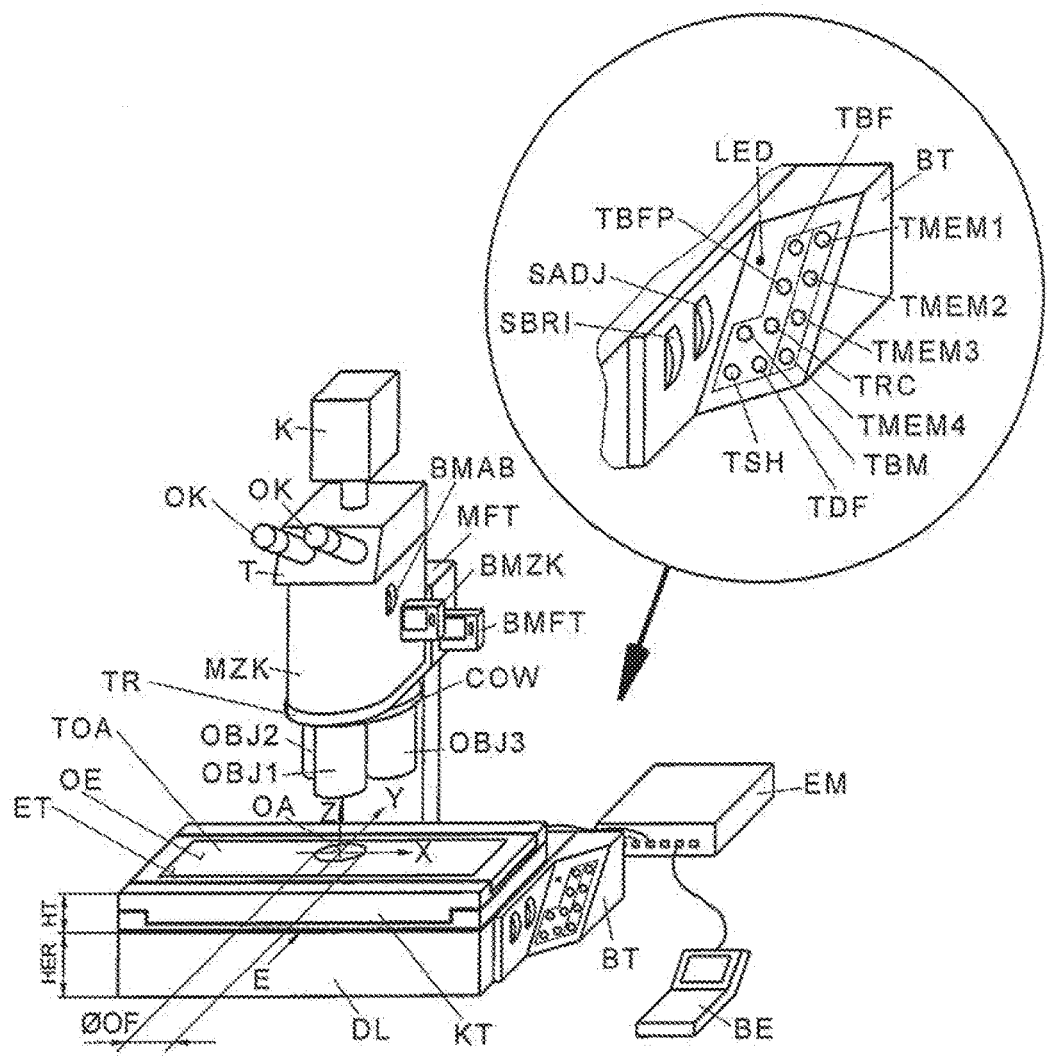
FIG. 54: shows a perspective view of a microscope system according to the invention with a light microscope and an apparatus for transmitted light illumination according to the invention.

In addition, optimal diaphragm positions for a microscope system are shown in FIG. 53, in which a sample support table KT is placed on the apparatus for transmitted light illumination DL. Such a microscope system is initially described with reference to FIG. 54. FIG. 54 shows a perspective view of a microscope system according to the invention with a light microscope and an apparatus according to the invention for transmitted light illumination. The components shown correspond to those of FIG. 1 but a sample support table KT or, in short table KT, is placed additionally on the transmitted light device DL. The corresponding reference numerals of FIG. 1 apply here.

The table KT provides additional installation space for accessories. For example a ring light can be used within the table KT. In comparison with the light source LQ, the sample can be illuminated with the ring light at a very great angle of inclination, through which a dark field observation is particularly effectively possible.

In order to assemble the table KT on the apparatus for transmitted light illumination, the latter has assembly means, for example a form with recesses, into which a lower region of the table KT engages.

Through the additional table KT the object plane OE is moved from plane E into plane ET, i.e. by the distance HT upwards. As the origin of the XYZ coordinate system lies according to definition in the object plane OE, the origin of the XYZ coordinate system in FIG. 54 is thus displaced in relation to FIG. 1 likewise by the distance HT upwards, that is to say in the direction of positive Z values.

In the graph of FIG. 53, the idea of ideal diaphragm position means that the usable installation space can be displaced, without further measures, by the same amount HT downwards, i.e. in the direction of negative Z values. Having regard to the old XYZ coordinate system according to FIG. 1, the boundaries ZDmin and ZDmax for the installation space usable inside of the apparatus according to the invention for transmitted light illumination are obtained. The coordinates of this usable installation space with a table KT in the new XYZ coordinate system are downwardly displaced by HT in relation to the coordinate system of FIG. 1 without a table. The lowermost possible ideal Z diaphragm position is with the table thus ZDTmin instead of ZDmin without a table and the possible uppermost ideal Z diaphragm position is with table ZDTmax instead of ZDmax without table.

The applicability of the contrast method according to the invention thus changes under certain circumstances. For this method, only those curve regions of the curves Kh1, Kh2o, Kh2u and Kh3 which lie in the aforementioned usable installation space can be used, i.e. in a region in which the setting of the ideal Z diaphragm position can be constructively realised.

The installation space within the table KT, thus the Z value range between ZDTmax and ZDmax, is also to be usable as far as possible for the diaphragm. An apparatus designed for this purpose according to the invention for transmitted light illumination is described below with reference to FIG. 55.

Figure 55:
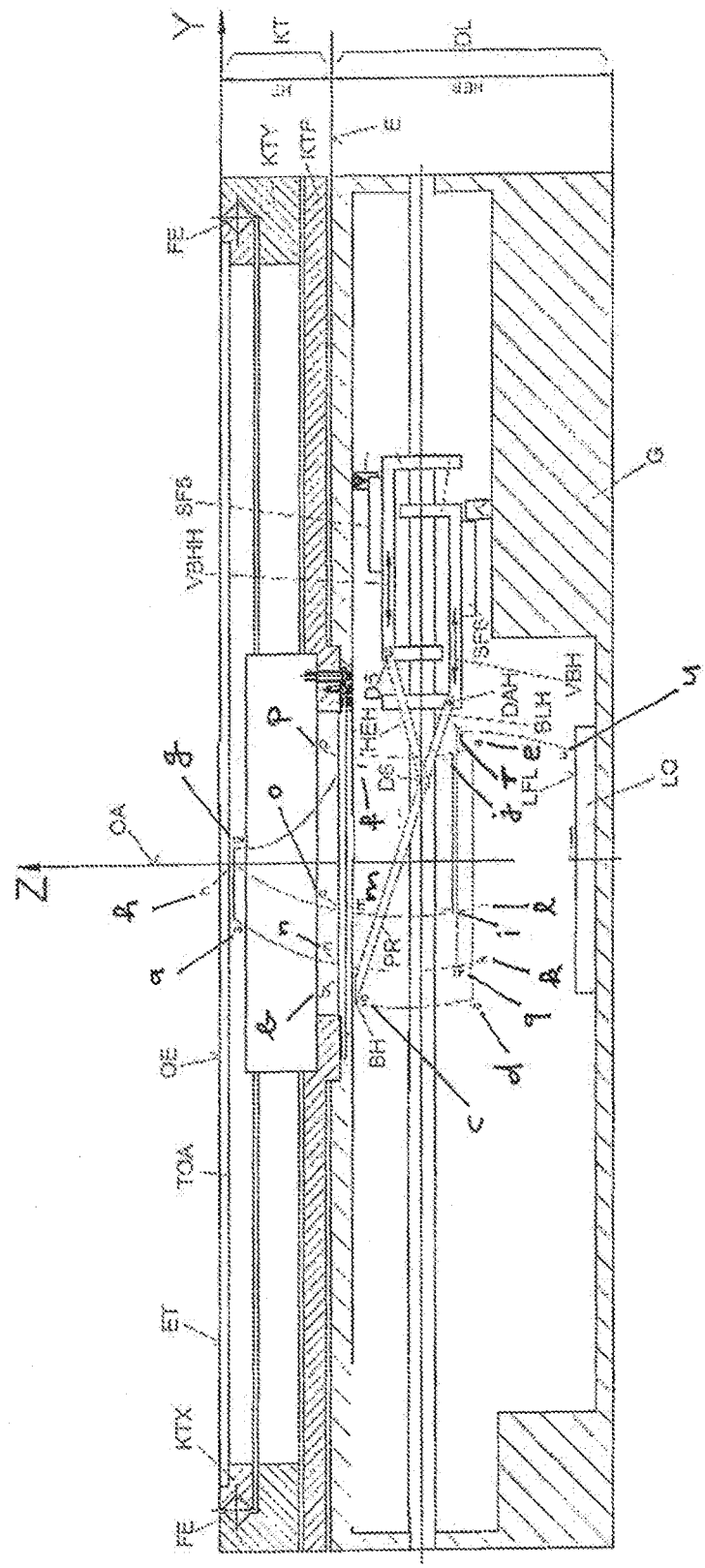
FIG. 55: shows an exemplary embodiment of an apparatus according to the invention with a diaphragm and a set-up sample support table.

FIG. 55 shows an exemplary embodiment of an apparatus for transmitted light illumination DL according to the invention. This is shown in the right system, as seen by the user in FIG. 1, thus X axis to the right, Y axis backwards, Z axis upwards. The apparatus DL has a diaphragm BLH with a diaphragm edge BH running linearly in the X direction. The diaphragm BLH is arranged between a light source LQ, of which the light surface LFL is arranged parallel to the XY plane in the negative Z half space and the object plane OE. The object plane OE, on which a sample to be examined is found forms the coordinate origin.

The diaphragm BLH is rotatable around a rotation axis DAH, which is orientated parallel to the diaphragm edge BH and arranged on a first carriage, so that the diaphragm BLH with diaphragm edge BH together with the rotation axis DAH can be displaced along a guide path of the first carriage in the Y direction. The objective OBJ1 used comprises in principle the beam path of FIG. 3. Furthermore the correlations continue to exist which have already been described in relation to FIGS. 3 to 24. However, the diaphragm BLH which can be moved along a guide path has been displaced for a clear illustration so far into the negative Y direction that it engages into the beam cross-section of all back-projected edge beams. Of course, this arrangement according to the invention allows the diaphragm edge BH in Y direction to also be adapted to any beam cross-section, so that the diaphragm edge BH can work according to the invention.

For homogenisation of the illumination via a movement of the two carriages in the Y direction with superimposed relative movement of the two carriages, even without a change of the X and Y diaphragm coordinates, the diaphragm edge BH can also be brought into a Z diaphragm coordinate, in which it is optimally adapted to the currently effective image system which includes a zoom body MZK with the actual zoom factor β and an objective OBJ1. This can be recognized by a sufficiently homogeneous illumination. The diaphragm edge can be moved through the synchronous movement of the two carriages along the Y direction, that is to say parallel to the object plane OE, likewise in the Y direction and without changing the X and Z diaphragm coordinates. The contrast level of the illumination can thereby be set.

The apparatus for transmitted light illumination DL additionally has assembly means for an optional table KT. In the embodiment shown, along with this, a table KT is assembled on the housing G of the apparatus for transmitted light illumination. The upper housing wall G, i.e. the housing wall lying opposite the light source LQ, has a depression as a holding means for a sample at the level of plane E. With the mounted table, a holding device TOA is provided by the table KT at the level of the plane ET. Through the special design of the carriage element, the diaphragm BLH can be moved beyond the plane E of the original object support into the installation space below the table KT. Typical curve patterns of the end of the diaphragm edge BH with pure rotation about DAH are shown as lines d-c, q-n-a, l-m-h and e-p. Combined with a side displacement VBH, different coverage of the pupil can be achieved but this time within the inner space of the table KT.

Figure 56:
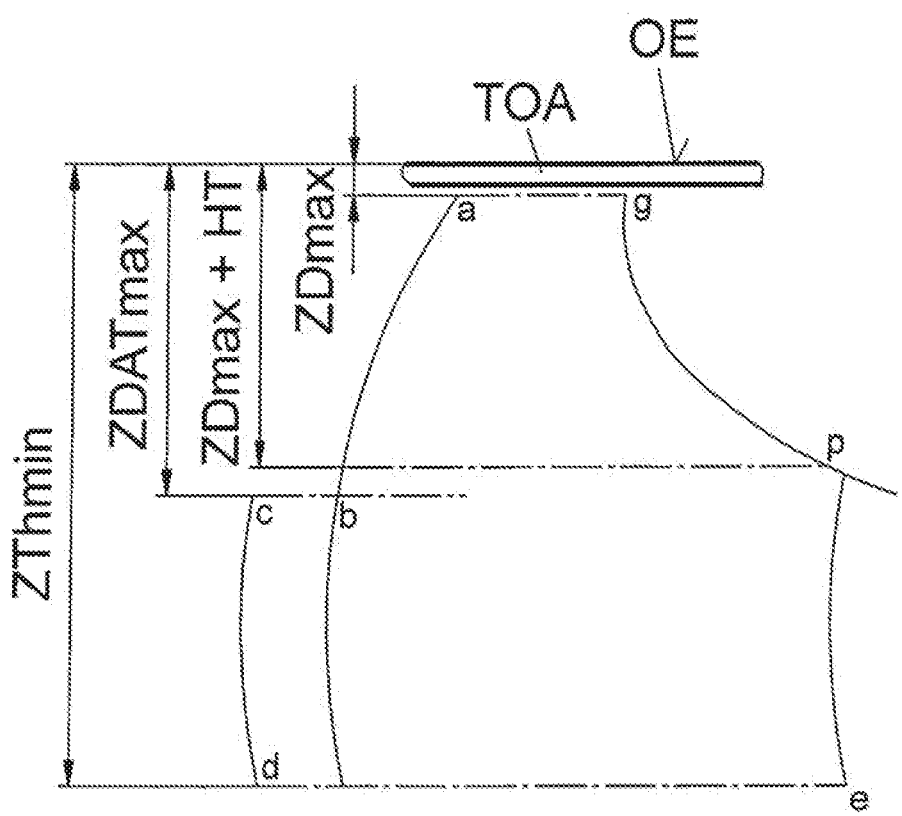
FIG. 56: shows an enlarged section of FIG. 55.

FIG. 56 shows, in an enlarged illustration, the contours of the travel curves of the diaphragm edge BH of the apparatus according to the invention of FIG. 55. The out er contour of the optically effective region of the diaphragm edge BH is characterized by the curve points d-c-b-a-g-p-e-d. If the effective pupil of the observation system lies close below the transparent object support TOA, the diaphragm edge with the apparatus according to the invention can be moved towards this point. Depending upon construction, ZDmax represents the Z coordinate of the uppermost diaphragm posit ion. The Z value is hereby measured starting from the object plane OE. In order to avoid contact of the diaphragm with the transparent object support TOA, the amount of ZDmax is slightly greater than the thickness of TOA. Correspondingly ZDATmax constitutes the maximum Z coordinate when using an adapt er plat e AP, whereas ZThmin is the minimum Z coordinate of the diaphragm edge BH. The greatest possible Z coordinate without optional table of the height HT is identified in FIG. 56 by ZDmax+HT.

A second diaphragm (not shown) is preferably present which can be positioned at least in a region below ZThmin, thus below the positions d and e, as far as the light source LQ. If only a single diaphragm is present, this is preferably arranged and movable so that its Z position can lie in the whole region between the light source and the transparent object support of the optional sample support table.

The diaphragm edge BH can be freely positioned within the transmitted light illumination device DL in Z direction in the free installation space between the object plane OE and the light source LQ, see FIG. 11. On account of a tolerance-related safety distance, the lowermost actually realisable diaphragm position ZDmin lies just above the light area LFL with the Z coordinate ZHL. Upwards, the uppermost actually realisable diaphragm position ZDmax is not only determined by the thickness of the transparent object support TOA but also through the height of the optionally usable adapter plates AP, for example polarisation filter, including the support for this. The uppermost actually realisable diaphragm position ZDmax is hereby downwardly displaced by a corresponding tolerance-related safety distance.

According to the invention no further means for homogenisation of the illumination are provided or necessary.

Figure 57:
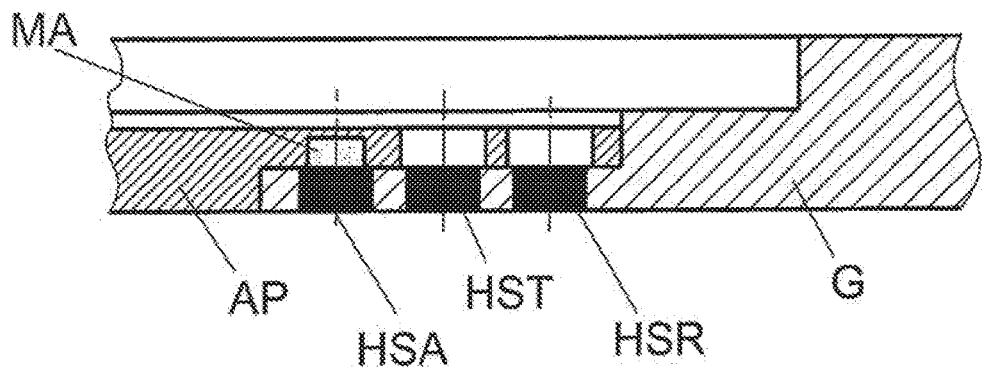
FIG. 57: shows a section of an apparatus according to the invention with means for recognising different attachments whereby an additional adapter plate is present.
Figure 58:
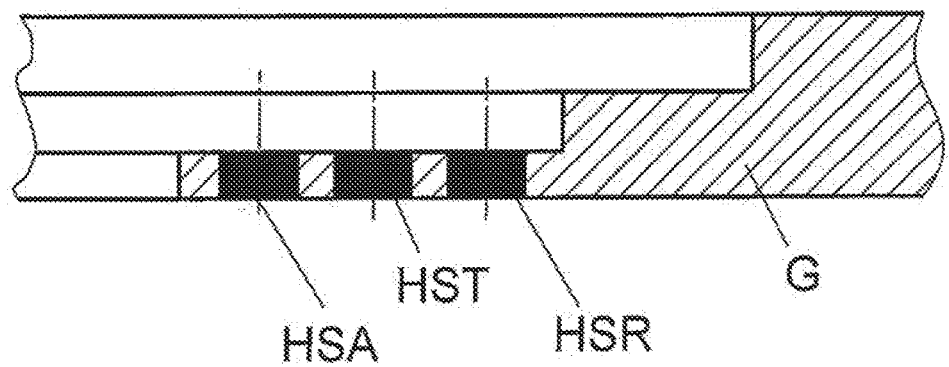
FIG. 58: shows a cut-out of an apparatus according to the invention with means for detecting different attachments, wherein no additional attachments are present.
Figure 59:
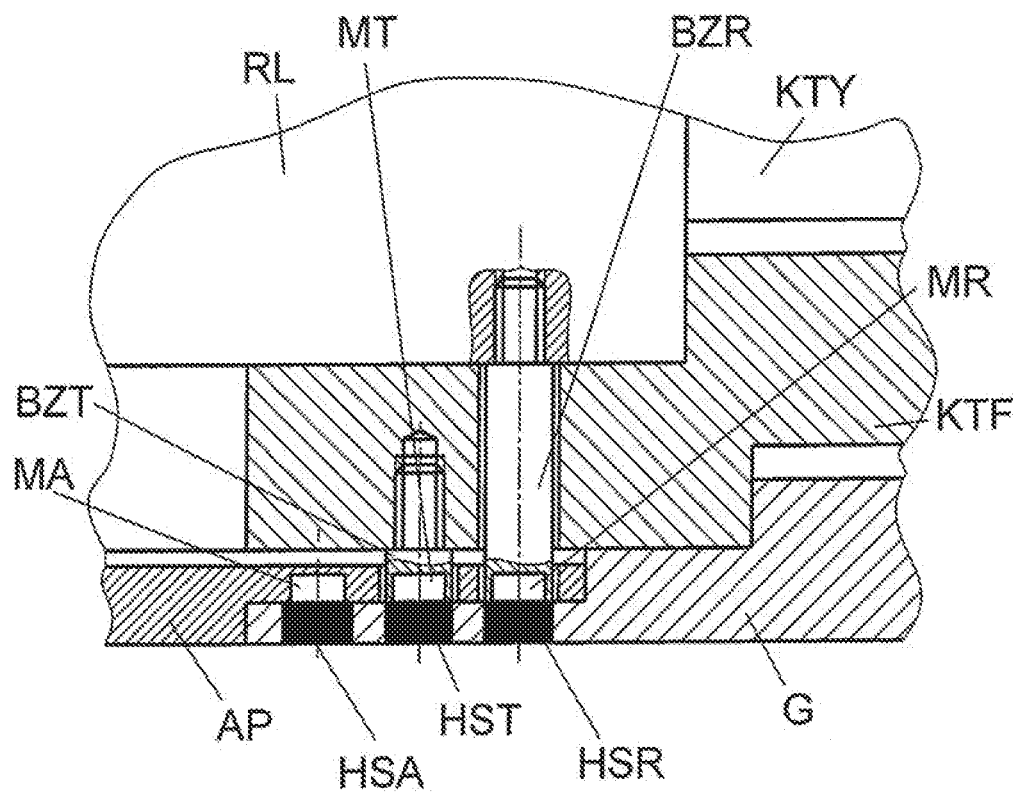
FIG. 59: shows a cut-out of an apparatus according to the invention with means for detecting different attachments, wherein an adapter plate, a sample support plate and a ring light are present.

FIGS. 57 to 59 show a cut-out of the housing G of the device for transmitted light illumination DL of FIG. 55. A region of the housing G is shown beside the passage opening. Means for recognising different attachments are provided on the housing G. These include at least means HST for determining the presence and in particular the identity of a sample support table KT, means HSA for determining the presence and in particular the identity of an adapter plate AP introduced into the passage opening and means HSR for determining the presence and in particular identity of accessories inserted in the sample support table KT such as a ring light RL. These means HSA, HST, HSR are shown in the example shown with Hall sensors HSA, HST, HSR.

The adapter plate AP, the table KT and the ring light RL have magnets MA, MT, MR, the presence of which can be determined by the Hall sensors HSA, HST, HSR.

If for example an adapter plate AP is introduced into the transmitted light cover DL, the Hall sensor HSA reacts via the magnet MA contained therein. The same applies correspondingly if the table KT is used with its magnet MT lying opposite the Hall sensor HST. The Hall sensor HSR serves with the magnet MR correspondingly for the detection of a ring light.

In order to fix the magnet MR to the ring light RL an auxiliary pin BZR is present on the ring light RL. Correspondingly, an auxiliary pin BZT is present on the table KT to fix the magnet MT to the table KT.

FIG. 57 shows an exemplary embodiment, in which an adapter plate AP is inserted into the passage opening. A magnet MA of the adapter plate AP is thereby positioned above the sensor HSA which thus recognises the presence and identity of the adapter plate AP. Due to the fact that no ring light RL or table KT are present in this embodiment, the sensors HST and HSR are not addressed.

In the situation shown in FIG. 58 on the other hand neither an adapter plate AP nor a table KT nor a ring light RL are present. Consequently none of the sensors HSA, HST, HSR reports the presence of these elements.

In the example shown in FIG. 59, both a table KT and a ring light and an adapter plate AP are present. By means of the magnets MT, MR and MA thereof, the Hall sensors HST, HSR and HSA register the presence of the table KT, ring light RL and adapter plate AP. The table KT has a base plate KTF with a passage. When the ring light RL is inserted, the magnet MR of the ring light RL projects through the passage as far as a detection region of the Hall sensor HSR. In addition a Y carriage KTY of the cross table KT is shown.

From the recognition of these components, a control device according to the invention determines how great the maximum height adjustment of the diaphragm BH is. A collision with the lower side of the corresponding component is thus avoided.

According to the invention a safety mechanism can further be provided which guarantees that the diaphragm edge BH cannot be moved in a motorised manner, if for example the table KT has been removed and the diaphragm lies above the surface of the housing G. Alternatively, in this situation, the diaphragm edge can also be moved below the Z coordinate of the surface of the housing G. The user is thereby to be prevented from injuring himself through motorised movement of the diaphragm BH when the table KT has not been placed on the housing G.

The adjustment of the diaphragm edge in dependence upon the attachments recognised with the Hall sensors is described by reference to FIG. 60.

Figure 60:
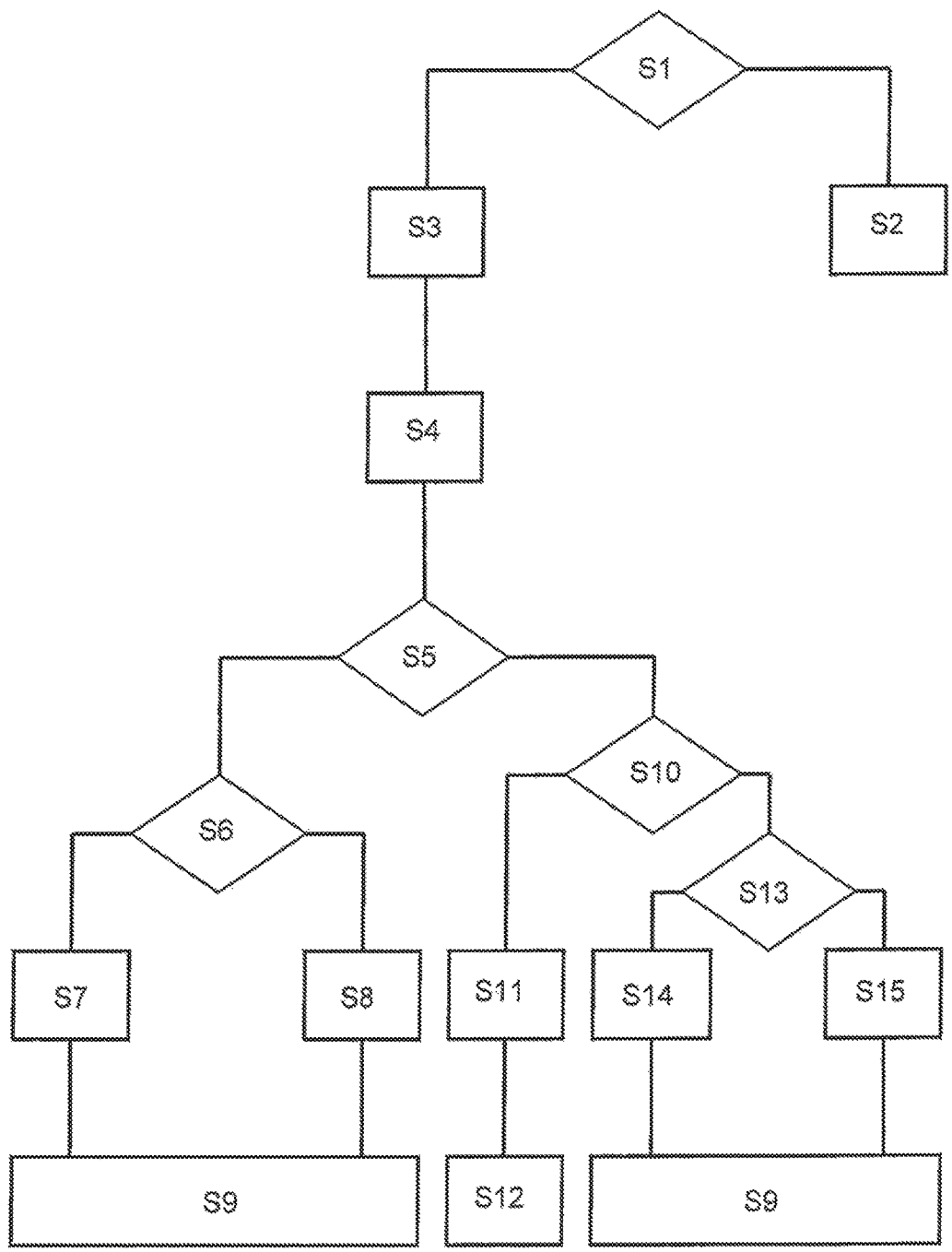
FIG. 60: shows a flowchart of a method according to the invention for setting a best possible illumination for a light microscope.
Figure 61:
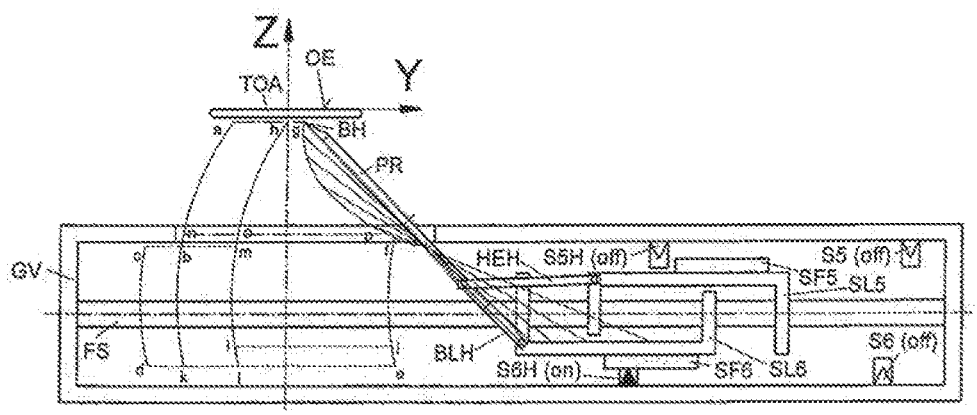
FIGS. 61 to 65 show steps of a method according to the invention for determining the absolute position of a diaphragm edge of an apparatus according to the invention.
Figure 62:
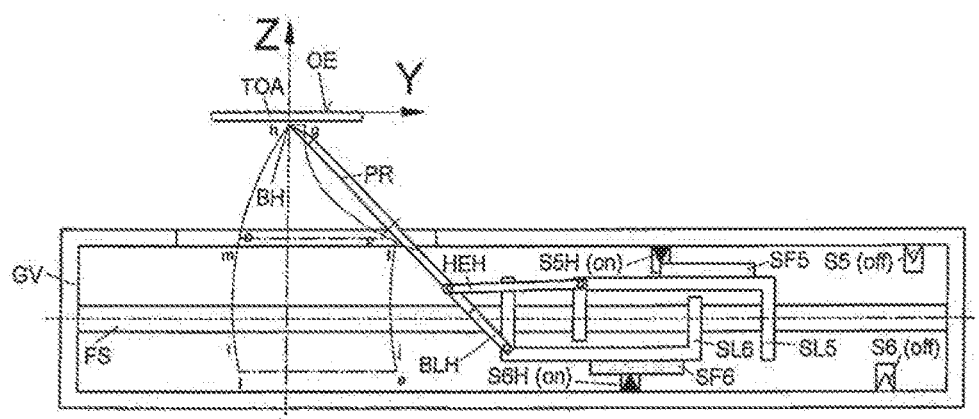
Figure 63:
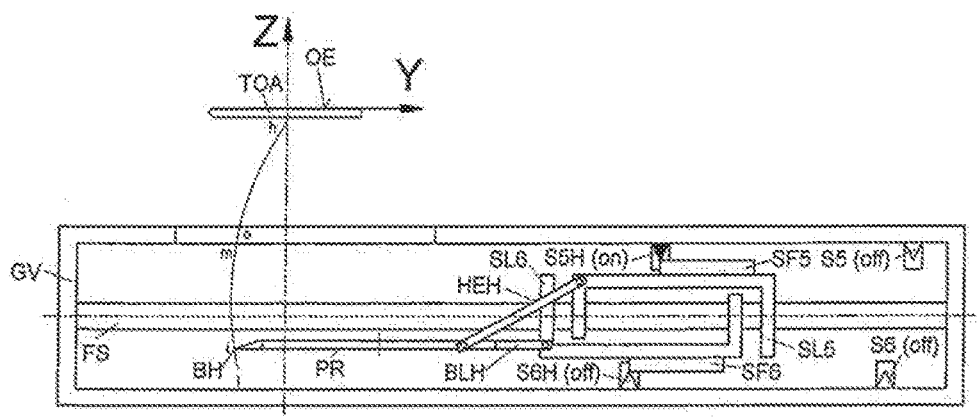
Figure 64:
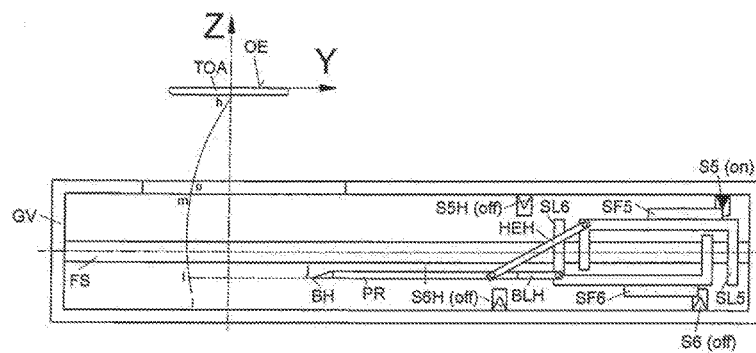
Figure 65:
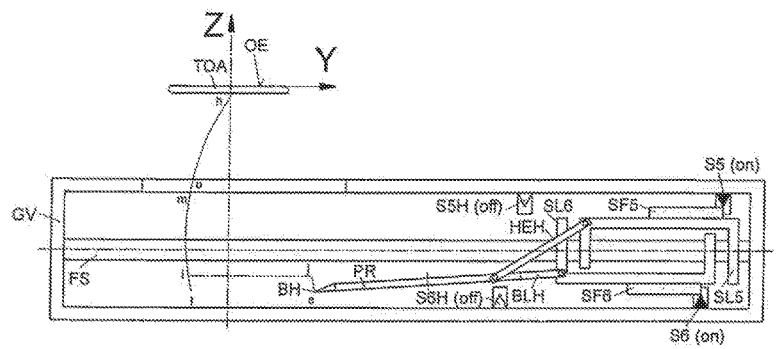

FIG. 60 shows schematically the method steps S1 to S15 of a method according to the invention for setting the most suitable illumination for a light microscope. The method according to the invention can be carried out in particular with an apparatus according to the invention for transmitted light illumination for a light microscope. The illumination is thereby adjusted by moving the diaphragm edges of an apparatus according to the invention to a suitable position.

The method according to the invention is explained using an exemplary embodiment with four diaphragms which respectively comprise a linear diaphragm edge. These four diaphragms are described as front, rear and two side diaphragms. According to the invention, however, a different number of diaphragms can be used. In particular an iris diaphragm can also be used. The method steps described below are then to be correspondingly adapted.

In step S1 it is checked whether a microscope setting, namely an objective—zoom body combination which is momentarily used in the light microscope and a zoom magnification associated therein can be called up. This can take place for example via a CAN bus. If the answer is "yes", step S3 follows, otherwise step S2.

In step S2 all available diaphragms are opened, that is to say none of the available diaphragm edges cuts the illuminating beam. In this connection the rear diaphragm is opened in that both associated carriages which serve for movement of the diaphragm are moved into the reference position of the rear diaphragm. The reference position of the rear diaphragm can be the accessible position which has the greatest Y value. The front diaphragm is similarly moved by moving both its two carriages into its reference position. Here, it is at the accessible position which has the smallest Y value. In addition the two side diaphragms are opened in that their respective reference positions are reached. For the first side diaphragm, this is the position with the minimum adjustable X value. For the second side diaphragm this is the position with the maximum adjustable X value.

In step S3, with the enquiry concerning the objective—zoom body combination and the zoom magnification set, an ideal Z position for a diaphragm edge is determined. This can take place for example with the aid of a stored value table, in which ideal Z positions for different objective—zoom body combinations and different zoom magnifications are stored. The value table can be determined by preceding measurements or through theoretical calculations. For zoom magnifications, for which no value is stored in the value table, an ideal Z position can be determined through interpolation of the values from the value table. The ideal Z position of the diaphragm edge can thereby be defined in that the lighting beam path of the light microscope has a waist at this Z position. Step S4 follows this step.

In step S4, the available installation space is determined. This constitutes a free movement space, in which the Z position of the diaphragm edges can be moved. A maximum Z position of the available installation space can be defined through additional means used. The minimum Z position of the available installation space can be a position directly beside the light source. The following indications relate to the variant of the apparatus according to the invention, in which, by way of additional devices, a sample support table KT, an adapter plate AP and a ring light RL can be used. The determination of the available installation spaces takes place with sensors, for example Hall sensors, in order to recognise said additional means.

If the sensors ascertain in step S4 that no additional device is used, the maximum Z position Zmax is fixed to a Z position ZDmax directly below the holding means TOA for the sample to be examined.

If the sensors in step 4 recognise that an adapter plate AP is used, the available installation space is limited to a Z position which lies directly below the adapter plate AP. This Z position can be described as ZDAmax if no sample support table is used and as ZDATmax if a sample support table is used. It is irrelevant whether a ring light RL is present in these cases for the determination of the available installation space, as the receiving position for a ring light RL is above the adapter plate AP.

If in step 4 a sample support table KT is recognised but neither an adapter plate AP nor a ring light RL are present, the maximum Z position Zmax is fixed to a Z position ZDmax which is directly below the holding device TOA of the sample support table KT.

If on the other hand it is ascertained in step S4 through the sensors that, besides the sample support table KT, also a ring light RL but no adapter plate AP is present, the maximum Z position Zmax is fixed to a Z position ZTRmax which is located directly below the ring light RL.

Step S4 is now complete and step S5 follows. In step S5 it is checked whether the ideal Z position of the diaphragm edge determined in step S3 lies within the available installation space determined within step S4. If this applies, step S6 follows, otherwise step S10.

It is ascertained in step 6 which of the available diaphragm edges can be moved to the ideal Z position. Depending upon the embodiment of the apparatus according to the invention, not a single diaphragm can be moved over the whole available installation space. Instead the front diaphragm can be moved into a region of lower Z values to maximum Zmin+HBVmax, while the rear diaphragm can be moved in a region of greater Z values than Zmin+HBVmax. HBVmax thereby describes the maximum height distance which the front diaphragm can assume relative to the light area. If it is determined in step S6 that the ideal Z position of the diaphragm edge lies in the movement area of the front diaphragm, step S7 then follows. If on the other hand the ideal Z position lies in the movement area of the rear diaphragm, step S8 follows. In practice the movement areas of the front and rear diaphragm might overlap. Nonetheless, a diaphragm is selected in step S6 according to the above-mentioned criteria.

In step S7 the front diaphragm is moved to the ideal Z position and the rear diaphragm is opened.

In step 8 on the other hand the rear diaphragm is moved to the ideal Z position and the front diaphragm is opened. The opening can thereby take place as described in step S2.

In case of embodiments of the apparatus according to the invention, in which precisely one height-adjustable diaphragm edge is present, the steps S6 to S8 can be replaced by the step that this height-adjustable diaphragm edge is moved to the ideal Z position.

Step S9 follows both step 7 and step 8. In step S9 the two side diaphragms are positioned. The position thereof is determined—similarly to step 3—depending upon the objective—zoom body combination used and the zoom magnification thereby set. The two side diaphragms are then moved to the appropriate positions. The setting of all the available diaphragms and thus also the method according to the invention are hence complete.

Step S10 is described below. This is carried out if it is ascertained in step S5 that the ideal Z position of the diaphragm edge lies outside of the available installation space. It is determined in step S10 whether the use of a prism film is meaningful. If a prism film is introduced at a certain angle into the illuminating beam bundle, the propagation of the illuminating beam bundle is influenced in a known way. If it is determined in step S10 that by using a prism film the illumination for the light microscope can be improved, step S11 follows, otherwise step S13.

In step S11, initially the prism film is incorporated into the beam path. In addition the rear diaphragm is set to a YZ position which is determined in dependence upon the objective—zoom body combination used and the zoom magnification set. The front diaphragm can be moved to a Y position which is also determined in dependence upon the objective—zoom body combination and the zoom magnification set. The Z position of the front diaphragm can be adjusted to a position Zmin slightly above the light source.

Step S12 follows step S11. In step S12, the side diaphragms are moved to X positions which are determined in dependence upon the objective—zoom body combination and the set zoom magnification, wherein it is taken into account that the prism film is in the beam path.

If it is determined in step S10 that improved illumination cannot be achieved with prism film, step S13 follows, in which no prism film is used. It is rather checked which of the available diaphragms can be moved closest to the ideal Z position. If it is ascertained that the ideal Z position lies below the available installation space, step S14 follows. If on the other hand the ideal Z position is too high, step S15 follows.

In step S14 the front diaphragm is positioned at the smallest possible Z value. In addition it can be provided that the Y position of the front diaphragm is dependent upon the objective—zoom body combination used and the zoom magnification set so that no trimming of the beam path can take place. The rear diaphragm is opened in this case, whereby this can take place as described in step S2. The previously mentioned step S9 for setting the two side diaphragms then follows.

If on the other hand it is ascertained in step S13 that the ideal Z position is too high for the available installation space, in step S15 the rear diaphragm is set to the highest possible Z position for a trim-free setting similarly to the process in step S14. The front diaphragm is opened in this case. Step S9 likewise follows for setting the side diaphragms.

All available diaphragms are thus set in the best possible way and the method according to the invention is concluded.

An apparatus according to the invention with four diaphragms which is suitable for carrying out the method described for adjusting the most suitable lighting is described below by reference to FIG. 52.

FIG. 52 shows a schematic perspective view of four diaphragms BLL, BLR, BLV and BLH of an apparatus according to the invention. Below the diaphragms, a light source LQ with a light area LFL is present. Above the diaphragms there is the transparent object support TOA which represents the object plane OE.

The diaphragms BLL, BLR, BLV and BLH each have a linear diaphragm edge BKL, BKR, BV and BH and thus form a rectangular free space. In order to be able to adjust the size and position of the free space, the diaphragms can be displaced in the XY plane. According to the invention the diaphragms are not only adjustable in the XY plane for reducing the scattered light, but also displaceable in the Z direction. The following references are also relevant in FIG. 52: VBH=displacement direction of the rear diaphragm; VBL: displacement direction of the left diaphragm; VBR=displacement direction of the right diaphragm; and VBV which describes a displacement direction of the front diaphragm. ZH describes in FIG. 52 the Z coordinate of the rear rotation axis DAH. ZL and ZR respectively refer in FIG. 52 to the Z coordinates of the left and right diaphragm edge. Finally, ZV describes the Z coordinate of the front rotation axis DAV.

According to the invention it can be provided that in dependence upon the objective—zoom body combination used, a previously defined diaphragm form is adjusted. The previously defined diaphragm forms are defined by the respective positions of the available diaphragms.

According to the invention a contrast mode "azimuth" can be selected. In this mode, the form of the free space between the diaphragms is fixed but the X-Y position of the free space can be changed. Different contrasts are hereby possible during the observation.

The diaphragms are not required to lie according to the invention in the same Z plane. In the embodiment shown the four diaphragms are offset relative to each other in the Z direction and their movement spaces overlap each other in the Z direction. The diaphragm edge BV of the lowermost diaphragm BLV and the diaphragm edge BH of the uppermost diaphragm BLH are additionally height adjustable, that is to say they can be moved in Z direction. In this connection, it is possible to rotate them about a rotation axis DAV, DAH. No height adjustment is provided for the left and right diaphragm.

The most ideal form in terms of cost is a linear diaphragm edge BK as this can be easily produced without great resources. Slightly curved diaphragm edges BK can also be used in principle but then, with the tilting of the diaphragm BL with fixed XYZ coordinates of a single point on the diaphragm edge BK with increasing distance from this point along the diaphragm edge BK, the Y and Z values also change, which is in practice difficult to manage. Curves of the diaphragm edge BK which lie in the region of the usual manufacturing tolerances and/or which do not yet lead to visible non-homogeneities do not play a role here.

In order to position the height adjustable diaphragm edges BV and BH, these are preferably connected to two carriages which are driven with stepper motors. For both side diaphragm edges BKL and BKR, a stepper motor for moving in the X direction is sufficient. The carriages of the height adjustable diaphragm edges BV and BH can be formed as described in connection with FIG. 55.

In order to be able to calculate the YZ coordinates of the diaphragm edges BV and BH from the setting of the carriages, it is necessary in addition to know the absolute carriage positions. Cost-effective stepper motors are preferably used as a drive, said stepper motors facilitating a linear movement via a rack and pinion engagement. However, the absolute position of a linear drive with simple stepper motors must be set in a known position. This preferably takes place upon connection through a determined initialisation sequence.

If upon initialisation of the stepper motors, both the carriages shown in FIG. 55 moved synchronously into the end position in which switching flags of the carriages have reached corresponding position sensors for the end position, the Z coordinate of the diaphragm edge would remain constant. If the diaphragm has been moved out into the table installation space, for example because the transmitted light apparatus has been disconnected with the diaphragm in this position, such an initialisation would lead to a collision with the housing.

In order to avoid this, the initialisation according to the invention described below is carried out, the sequence of which is shown schematically in FIGS. 61 to 65. Here, the diaphragm BLH is moved through two carriages SL5 and SL6 from an unknown position into a lowermost position. Insofar as the carriage SL5 is connected via a rear lever HEH with the diaphragm BLH, said diaphragm BLH can be rotated. The object plane OE on the transparent object support TOA is provided here above the housing G by a sample support table (not shown).

The carriages SL5 and SL6 have switching flags SF5 and SF6 which cooperate with position and auxiliary position sensors S5, S6 as well as S5H and S6H. If S5H is off, that is to say the switching flag SF5 is not in the region of this sensor, according to the arrangement according to the invention the diaphragm edge BH is within the area h-om-i-l-e-j-f-p-g-h, see FIG. 61. Both carriages SL5 and SL6 are now moved forwards synchronously until the sensor SH5 switches on. The diaphragm edge is now on the curve h-o-m-i-l, see FIG. 62. The lower carriage SL6 is then moved until SL6 switches to off. The diaphragm edge is now at point i, see FIG. 63. Both carriages can now be moved back synchronously until the sensor S5 switches on, see FIG. 64. The dia phragm apparatus has thus arrived at the starting state without the diaphragm BLH impacting against a part of the housing. If the carriage SL6 continues to move until also sensor S6 switches on, the diaphragm has reached the lowermost plane, see FIG. 65.

Interruption-free and simple operation of the diaphragm arrangement is guaranteed through the arrangement according to the invention of the sensors S5, S6, SH5 and SH6 and through the dimensions of the switching flags SF5 and SF6.

After this initialisation process, the absolute position of the carriages is known. Using the lever geometry it is also possible to determine the corresponding YZ coordinates of the diaphragm edge BH insofar as the position of the diaphragm edge BH relative to the switching position is known. This can only be determined very imprecisely via fixed measures and a suitable adjustment process by means of an electronic offset correction is thus provided. In this connection the diaphragm edge is brought into a known optically visible position. The deviations relative to the real or tolerance-based switching point position of the switching flags SF5 and SF6 are balanced out with the offset correction.

The field of utilisation can advantageously be extended with the apparatus according to the invention through a sample support table without expensive absolute measurement systems for position detection and for position setting of the diaphragms being required.

By reference to FIG. 55 it is possible, through the movement of the two carriages in the directions VBHH or VBH along a guide path by a certain number of steps of the driving stepper motor, to move the associated diaphragm edge by a certain YZ value. As the absolute position of the carriages is known through the initialisation process, the corresponding YZ coordinate of the diaphragm edge BH can be calculated. The calculation can also be carried out inversely, that is to say from a predefined movement path of the diaphragm edge BH in the Y and/or Z direction the carriage paths and the number of steps of the stepper motor required for this can also be calculated.

With the present invention a cost-effective transmitted light illumination method and an apparatus for transmitted light illumination are provided which are particularly suited for illuminating low-contrast transmitted light objects in the smaller overview magnifications in the bright field on stereo microscopes and macroscopes.

The method provides homogeneous illumination in a very large field of vision. Furthermore, the resolution is not unnecessarily reduced and sufficient illumination intensities are provided. An essential advantage is also that the apparatus according to the invention can be used in a usual construction height HER, see FIG. 1, by transmitted light devices without visible interference. The inventive method can in particular also be combined with other illumination methods so that in principle all illumination methods can be used with a single transmitted light device.

Most favourable or optimal illumination settings can thus also be easily set and reproduced by untrained users.

Finally the method is suitable in particular for cost-optimized objective—zoom body combinations which do not have corrected pupil planes fixed over the zoom region and need not compulsorily be suitable for polarisation-optic methods.

LIST OF REFERENCE SYMBOLS a Special Y-Z position of the rear diaphragm edge
A Half angle of the illuminating light with effective lamellae film
A0 Half angle of the illuminating light without lamellae film
AB Distance between the object plane OE and the uppermost edge LO of the lamellae film LAF
ABmin Minimum distance from AB, at which the lamellae structures are just not yet visible in the image in an interference-causing manner
AD3 Distance between the guide path FS and the rotation axis D3
AD5 Distance between the guide path FS and the rotation axis D5
ADH Distance between the guide path FS and the rotation axis DAH
ADV Distance between the guide path FS and the rotation axis DAV
AHH Lever length between the rotation axes DAH and D6
AHV Lever length between the rotation axes DAV and D4
AP Adapter plate with bonded magnet MA
AZ Azimuth angle of the illumination
α Adjustment angle of the deflecting mirror SP
ASPH Aspheric illumination optic
β Currently effective zoom factor of the zoom body
β Support point No. 1 between βmin and βmax for the description of the zoom factor curves via approximation functions
β2 Support point No. 2 between βmin and βmax for the description of the zoom factor curves via approximation functions
β3 Support point No. 3 between βmin and βmax for the description of the zoom factor curves via approximation functions
β4 Support point No. 4 between βmin and βmax for the description of the zoom factor curves via approximation functions β5 Support point No. 5 between βmin and βmax for the description of the zoom factor curves via approximation functions
β6 Support point No. 6 between βmin and βmax for the description of the zoom factor curves via approximation functions
β7 Support point No. 7 between βmin and βmax for the description of the zoom factor curves via approximation functions
β8 Support point No. 8 between βmin and βmax for the description of the zoom factor curves via approximation functions
β9 Support point No. 9 between βmin and βmax for the description of the zoom factor curves via approximation functions
β10 Support point No. 10 between βmin and βmax for the description of the zoom factor curves via approximation functions
β11 Support point No. 11 between βmin and βmax for the description of the zoom factor curves via approximation functions
β12 Support point No. 12 between βmin and βmax for the description of the zoom factor curves via approximation functions
β13 Support point No. 13 between βmin and βmax for the description of the zoom factor curves via approximation functions
βA1 Limit zoom factor without table and with adapter for the objective No. 1
βAT3 Limit zoom factor with table and with adapter for the objective No. 3
βG2 Limit zoom factor without table for the objective No. 2
βGT2 Limit zoom factor with table for the objective No. 2
βmax Maximal settable zoom factor
βmin Minimal settable zoom factor
βP2 Zoom factor at which the curve for the objective No. 2 has a pole position
b Special YZ position of the rear diaphragm edge
B1 Illuminating light border ray 1
B2 Illuminating light border ray 2
B3 Illuminating light border ray 3
B4 Illuminating light border ray 4
B5 Illuminating light border ray 5
B6 Illuminating light border ray 6
BA1 Illuminating light border ray 1 after passing through the prism film PR
BA2 Illuminating light border ray 2 after passing through the prism film PR
BA3 Illuminating light border ray 3 after passing through the prism film PR
BA4 Illuminating light border ray 4 after passing through the prism film PR
BA5 Illuminating light border ray 5 after passing through the prism film PR
BA6 Illuminating light border ray 6 after passing through the prism film PR
BB Effective width of the diaphragm BL
BE Operating unit for the whole system
BH Diaphragm edge rear
BK Diaphragm edge
BKL Diaphragm edge left
BKR Diaphragm edge right
BL Diaphragm
BLH Rear diaphragm
BLL Left diaphragm
BLQH Rear diaphragm
BLQV Front diaphragm
BLR Right diaphragm
BLV Front diaphragm
BLYP Limiting edge of the illuminating area in the positive Y direction
BMAB Operating element for motorised aperture diaphragm MAB
BMFT Operating element for the motorised focussing device
BMPR Structure width of the micro prisms of the prism film PR
BMZK Operating element for the motorised zoom body
BS Illumination centre
BT Operating element for the transmitted light device DL
BV Diaphragm edge front
BWI Angle between the border rays STL and STR of the illumination
BZR Auxiliary pin for fixing the magnet MR to the ring light RL
BZT Auxiliary pin for fixing the magnet MT to the table KT
c Special YZ position of the rear diaphragm edge
COW Coded objective changer
δ Deflection angle through the tilted prism film PR
øOF Diameter of the object field to be illuminated
øOF1 Diameter of the object field to be illuminated for the objective OBJ1 at the zoom body MZK with the momentary zoom factor β
øOF2 Diameter of the object field to be illuminated for the objective OBJ2 at the zoom body MZK with the momentary zoom factor β
øOF3 Diameter of the object field to be illuminated for the objective OBJ3 at the zoom body MZK with the momentary zoom factor β
d Special YZ position of the rear diaphragm edge
D3 Rotation axis for the lever HEV at the slide SL3
D4 Rotation axis for the lever HEV at the diaphragm BLV
D5 Rotation axis for the lever HEH at the slide SL5
D6 Rotation axis for the lever HEH at the diaphragm BLH
DA Rotation axis
DAPR Rotation axis of the prism film PR
DAH Rotation axis rear diaphragm
DAV Rotation axis front diaphragm
DG Thickness of the transparent object support TOA or the glass plate
dl Transmission light intensity difference for characterizing the gradient
DL Transmitted light device
dW Transmission angle region for characterizing the gradient
ε Prism angle of the micro prisms of the prism film PR
e Special YZ position of the rear diaphragm edge
E Plane at the level of the object support on the transmitted light device; this plane is generally formed through the upper side of the transmitted light device
EM Electronic module for controlling the whole system (signal processing, etc.)
EP Entrance pupil of the objective
ET Plane at the level of the object support on the table; this plane is generally formed by the upper side of the table
f Special YZ position of the rear diaphragm edge
f2(1) Ideal diaphragm position in Z direction for the objective OBJ2 on the motorised zoom body MZK at the support point No. 1, i.e. at β1
f2(2) Ideal diaphragm position in Z direction for the objective OBJ2 on the motorised zoom body MZK at the support point No. 2, i.e. at β2 f2(3) Ideal diaphragm position in Z direction for the objective OBJ2 on the motorised zoom body MZK at the support point No. 3, i.e. at β3 f2(4) Ideal diaphragm position in Z direction for the objective OBJ2 on the motorised zoom body MZK at the support point No. 4, i.e. at β4 f2(5) Ideal diaphragm position in Z direction for the objective OBJ2 on the motorised zoom body MZK at the support point No. 5, i.e. at β5 f2(6) Ideal diaphragm position in Z direction for the objective OBJ2 on the motorised zoom body MZK at the support point No. 6, i.e. at β6 f2(7) Ideal diaphragm position in Z direction for the objective OBJ2 on the motorised zoom body MZK at the support point No. 7, i.e. at β7 f2(8) Ideal diaphragm position in Z direction for the objective OBJ2 on the motorised zoom body MZK at the support point No. 8, i.e. at β8 f2(9) Ideal diaphragm position in Z direction for the objective OBJ2 on the motorised zoom body MZK at the support point No. 9, i.e. at β9 f2(10) Ideal diaphragm position in Z direction for the objective OBJ2 on the motorised zoom body MZK at the support point No. 10, i.e. at β10 f2(11) Ideal diaphragm position in Z direction for the objective OBJ2 on the motorised zoom body MZK at the support point No. 11, i.e. at β11 f2(12) Ideal diaphragm position in Z direction for the objective OBJ2 on the motorised zoom body MZK at the support point No. 12, i.e. at β12 f2(13) Ideal diaphragm position in Z direction for the objective OBJ2 on the motorised zoom body MZK at the support point No. 13, i.e. at β13

FE Guidance elements

FF Front area of the light conductor LL

FLi Flag for indicating the suitability of the momentary objective—zoom body combination I at the set magnification for the method "BF plus"

fBPXLi(β) Approximation function for describing the X diaphragm position of the left diaphragm for the function "BF plus"

fBPXRi(β) Approximation function for describing the X diaphragm position of the right diaphragm for the function "BF plus"

fBnYi(β) Approximation function for describing the Y diaphragm position of the front diaphragm for the function "BF with best possible Z diaphragm position" in the lower most Z position fBxYi(β) Approximation function for describing the Y diaphragm position of the rear diaphragm for the function "BF with best possible Z diaphragm position" in the upper most Z position fBXLi(β) Approximation function for describing the X diaphragm position of the left diaphragm for the function "BF with best possible Z diaphragm position"

fBXRi(β) Approximation function for describing the X diaphragm position of the right diaphragm for the function "BF with best possible Z diaphragm position"

fFLi(β) Flag function for describing the momentary system environment for the function "BF plus"

fPVYi(β) Approximation function for describing the Y diaphragm position of the front diaphragm for the function "BF plus"

fPYi(β) Approximation function for describing the Y diaphragm position of the rear diaphragm for the function "BF plus"

fPZi(β) Approximation function for describing the Z diaphragm position of the rear diaphragm for the function "BF plus"

fRYi(β) Approximation function for describing the Y diaphragm position as a contrast pre-set for the function "RC"

fRZi(β) Approximation function for describing the ideal Z diaphragm position for the function "RC"

FS Guide path of a linear guide, e.g. via a guide rod

γ Tilt angle of the lamellae films LAF with regard to the object plane OE g Special YZ position of the rear diaphragm edge G Housing GN Base level of the illumination over the prism film PR GV Housing with simplified illustration h Special YZ position of the rear diaphragm edge H1 Rear light beam 1

H1' Rear light beam 1 with beam offset through transparent object support TOA or glass plate H2 Rear light beam 2

H2' Rear light beam 2 with beam offset through transparent object support TOA or glass plate HB1 Height distance from the light area LFL to the diaphragm BL in the ideal Z diaphragm position for the objective OBJ1 on the zoom body MZK with the current zoom factor β

HBH Height distance from the light area LFL to the rear diaphragm BLQH in the ideal Z diaphragm position for the current objective OBJ on the zoom body MZK with the current zoom factor β

HBH1 Height distance from the light area LFL to the rear diaphragm BLQH in the ideal Z diaphragm position for the objective OBJ1 on the zoom body MZK with the current zoom factor β

HBHw3 Height distance from the light area LFL to the rear diaphragm BLQH in the horizontal position HBV Height distance from the light area LFL to the front diaphragm BLQV in the ideal Z diaphragm position for the current objective OBJ on the zoom body MZK with the current zoom factor β

HBVmax Maximum height distance from the light area LFL to the front diaphragm BLQV HBVw3 Height distance from the light area LFL to the front diaphragm BLQV in the horizontal position HEH Lever rear HER Ergonomically justifiable construction height of the transmitted light device DL HEV Lever front HF Main flank of the micro prism PRM HIB Rear limit of the light intensity increase HL Distance from the light area LFL to the object plane OE or to the upper side of the transparent object support TOA HM Rear middle light beam HM' Rear middle light beam with beam offset through transparent object support TOA or glass plate HPR Distance from the light area LFL to the prism film PR or to the rotation axis DAPR HSA Hall sensor for adapter plate detection HSR Hall sensor for ring light detection HST Hall sensor for table detection HT Z displacement of the object plane through the table KT; corresponds generally to the table height HV Height distance of the front diaphragm from the light area according to the exemplary embodiment hVB Displacement direction for adapting the diaphragm edge to the ideal Z diaphragm position i Special YZ position of the rear diaphragm edge φ Angle of inclination of the prism film PR in relation to the object plane OE and possibly inclination of the diaphragm, in which the prism film PR is arranged or could be arranged
j Special YZ position of the rear diaphragm edge
k Special YZ position of the rear diaphragm edge
K Camera for documentation
Kh1 Curve representing the ideal diaphragm position for OBJ1 on MZK in dependence upon β
Kh2o Upper curve section representing the ideal diaphragm position for OBJ2 on MZK in dependence upon β (between βmin and βP2)
Kh2omin Smallest value of the upper curve section Kh2o
Kh2u Lower curve section representing the ideal diaphragm position for OBJ2 on MZK in dependence upon β (between βP2 and βmax)
Kh2umax Greatest value of the lower curve section Kh2u
Kh3 Curve representing the ideal diaphragm position for OBJ3 on MZK in dependence upon β
KLD Cold light source for supply of light to the transmitted light device DL
KT Cross table, motorised
KTF Fixed base plate of cross table KT
KTX X carriage of cross table KT
KTY Y carriage of cross table KT
l Special YZ position of the rear diaphragm edge
L Left image channel
L1 Left light beam 1
L1' Left light beam 1 with beam offset through transparent object support TOA or glass plate
L2 Left light beam 2
L2' Left light beam 2 with beam offset through transparent object support TOA or glass plate
L3 Left light beam 3
L3' Left light beam 3 with beam offset through transparent object support TOA or glass plate
L4 Left light beam 4
L4' Left light beam 4 with beam offset through transparent object support TOA or glass plate
L5 Left light beam 5
L5' Left light beam 5 with beam offset through transparent object support TOA or glass plate
L6 Left light beam 6
L6' Left light beam 6 with beam offset through transparent object support TOA or glass plate
LAF Lamellae film
LB Effective length of the diaphragm BL
LBH Distance between the rear diaphragm edge BH and the pivot point DAH of the rear diaphragm BLH
LBV Distance between the front diaphragm edge BV and the pivot point DAV of the front diaphragm BLV
LED LED display
LFL Light area of the light source LQ
LFLX Expansion of the light area LFL in X direction
LFLY Expansion of the light area LFL in Y direction
LHH Length of the rear lever HEN between the rotation axes D5 and D6
LHV Length of the front lever HEV between the rotation axes D3 and D4
LL Light conductor
LLYN Expansion of the light area LFL in negative Y direction
LLYP Expansion of the light area LFL in positive Y direction
LM Left mid-light beam
LM' Left mid-light beam with beam offset through transparent object support TOA or glass plate
LO Uppermost edge of the lamellae film
LQ Light source
LV Light amplification through the prism film PR
LX Light area expansion in the X direction for consideration of the objective edge beams
LY Light area expansion in the Y direction for consideration of the objective edge beams
LYN Effective expansion of the light source in negative Y direction
m Special YZ position of the rear diaphragm edge
M1 Middle light beam 1
M1' Middle light beam 1 with beam offset through transparent object support TOA or glass plate
M2 Middle light beam 2
M2' Middle light beam 2 with beam offset through transparent object support TOA or glass plate
MA Magnet in adapter plate AP for adapter plate detection
MAB Motorised aperture diaphragm
MFT Motorised focussing device
MLQ Brightness maximum with light source LQ, i.e. without prism film PR
MPR Brightness maximum with prism film PR
MR Magnet for ring light detection
MT Magnet for table detection
MZK Motorised zoom body
n Special YZ position of the rear diaphragm edge
nG Refractive index of the transparent object support TOA
nO Refractive index of the object OB
NA Numerical aperture
NA1 Numerical aperture of objective No. 1
NA2 Numerical aperture of objective No. 2
NF Subsidiary flank of the micro prism PRM
o Special YZ position of the rear diaphragm edge
OA Optical axis of the objective
OB Object
OBJ Objective
OBJ1 Objective No. 1
OBJ2 Objective No. 2 with EP remote from OE
OBJ3 Objective No. 3
OE Object plane (without object identical to the object support)
OH Height of the object OB incl. the ambient medium (e.g. Petri dish with nutrient solution) from the object support, or from the upper side of the transparent object support TOA, to the object plane OE
OK Ocular
OOE Displacement path of the diaphragm BL from the ideal diaphragm position in the direction pointing towards the object plane OE
Ö Opening distance between the beam cross-section radius in the ideal Z diaphragm position Zh1 and the optical axis OA
ÖR Reduced opening distance between the diaphragm edge BK and the optical axis OA in order to increase contrast
ÖDF Negative opening distance, wherein the diaphragm BL covers the full beam cross-section of the back-projected image beams so that the bright field illumination transforms into a dark field illumination
ÖN Negative opening distance, i.e. the diaphragm already covers the optical axis
p Special YZ position of the rear diaphragm edge
PB Plateau width of the light intensity of the redistributed illuminating light around the main propagation direction STA between PMI and PRA PMI Edge of the plateau width PB which is at the shorter distance from the original main propagation direction STE; PB is defined by the decrease or increase in the light intensity to the value MLQ
PR Prism film
PRA Edge of the plateau width PB which is at the greater distance from the original main propagation direction STE; PB is defined by the decrease or increase in the light intensity to the value MLQ
PRM Micro prism
PRS Micro prism structure
PRYL Effective length of the prism film PR
PRYP Effective length of the prism film PR in positive Y direction
PRYN Effective length of the prism film PR in negative Y direction
q Special YZ position of the front diaphragm edge
r Special YZ position of the front diaphragm edge
R Right image channel
R1 Right light beam 1
R1' Right light beam 1 with beam offset through transparent object support TOA or glass plate
R2 Right light beam 2
R2' Right light beam 2 with beam offset through transparent object support TOA or glass plate
R3 Right light beam 3
R3' Right light beam 3 with beam offset through transparent object support TOA or glass plate
R4 Right light beam 4
R4' Right light beam 4 with beam offset through transparent object support TOA or glass plate
R5 Right light beam 5
R5' Right light beam 5 with beam offset through transparent object support TOA or glass plate
R6 Right light beam 6
R6' Right light beam 6 with beam offset through transparent object support TOA or glass plate
RH Rear edge beam between light area and objective
RL Ring light RL, which is optionally mountable in the table
RM Right mid-light beam
RM' Right mid-light beam with beam offset through transparent object support TOA or glass plate
RV Front edge beam between light area and objective
s Special YZ position of the front diaphragm edge
S3 Position sensor for the carriage 3
S3 (off) Non-activated position sensor S3 for the carriage 3
S3 (on) Activated position sensor S3 for the carriage 3
S4 Position sensor for the carriage 4
S4 (off) Non-activated position sensor S4 for the carriage 4
S4 (on) Activated position sensor S4 for the carriage 4
S5 Position sensor for the carriage 5
S5 (off) Non-activated position sensor S5 for the carriage 5
S5 (on) Activated position sensor for the carriage 5
S5H Auxiliary position sensor for the carriage SL5
S5H (off) Non-activated auxiliary position sensor S5H for the carriage 5
S5H (on) Activated auxiliary position sensor S5H for the carriage 5
S6 Position sensor for the carriage 6
S6 (off) Non-activated position sensor S6 for the carriage 6
S6 (on) Activated position sensor S6 for the carriage 6
S6H Auxiliary position sensor for the carriage 6
S6H (off) Non-activated auxiliary position sensor S6H for the carriage 6
S6H (on) Activated auxiliary position sensor S6H for the carriage 6
SADJ Adjust scroll wheel
SBRI Brightness scroll wheel
SCHH Guided carriage rear
SCHV Guided carriage front
SF3 Switching flag 3 for activating position sensor S3
SF4 Switching flag 4 for activating position sensor S4
SF5 Switching flag 5 for activating position sensor S5 and possibly auxiliary position sensor S5H
SF6 Switching flag 6 for activating position sensor S6 and possibly auxiliary position sensor S6H
SI Safety distance
SL3 Carriage 3
SL4 Carriage 4
SL5 Carriage 5
SL6 Carriage 6
SO Opening distance from the diaphragm-side edge beam of the back-projected image beams to the optical axis OA, which is covered by the diaphragm BL displaced by the displacement path OOE pointing towards the object plane OE
SP Deflection mirror
SQ Beam cross-section in the ideal z diaphragm position Zh1
SR1 Operating element 1 in the transmitted light device DL
SR2 Operating element 2 in the transmitted light device DL
SR3 Operating element 3 in the transmitted light device DL
ST1 Light beam 1
ST2 Light beam 2
ST3 Light beam 3
ST4 Light beam 4
ST5 Light beam 5
STA Exiting light beam
STE Incoming light beam
STG Light beam from the edge of the light area LFL blocked by the lamellae film LAF
STL Light beam left
STR Light beam right
SU Opening distance from the diaphragm-side edge beam of the back-projected image beams to the optical axis OA, which is covered by the diaphragm BL displaced by the displacement path UOE pointing away from the object plane OE
SV Beam offset
t Thickness of the prism film PR
T Objective barrel
TBF Button for bright field setting with integrated LED display
TBFP Button for "BF plus" setting with integrated LED display
TBM Button for "best mode" setting with integrated LED display
TDF Button for dark field setting with integrated LED display
TE Division of the micro prism structure PRS
TM Carrier material for micro prisms of the prism film PR
TMEM1 Memory key 1 with integrated LED display
TMEM2 Memory key 2 with integrated LED display
TMEM3 Memory key 3 with integrated LED display
TMEM4 Memory key 4 with integrated LED display
TOA Transparent object support
TR Carrier
TRC Button for "RC" setting with integrated LED display
TSH Shutter button with integrated LED display
u Special YZ position of the front diaphragm edge
Ü Overlap of two opposing diaphragms
UOE Displacement path of the diaphragm BL from the ideal diaphragm position in the direction pointing away from the object plane OE v Special YZ position of the front diaphragm edge
V1 Front light beam 1
V1' Front light beam 1 with beam offset through transparent object support TOA or glass plate
V2 Front light beam 2
V2' Front light beam 2 with beam offset through transparent object support TOA or glass plate
VB Displacement direction of the diaphragm BL
VBH Displacement direction of the rear diaphragm
VBHH Displacement direction of the lever adjustment for the rear diaphragm
VBL Displacement direction of the left diaphragm
VBLH Displacement direction of the rear diaphragm parallel to the light area LFL
VBLV Displacement direction of the front diaphragm parallel to the light area LFL
VBR Displacement direction of the right diaphragm
VBV Displacement direction of the front diaphragm
VBVH Displacement direction of the lever adjustment for the front diaphragm
VBYH Displacement of limiting edge of the rear diaphragm
VBYV Displacement of limiting edge of the front diaphragm
VHL Displacement direction of the light source LQ parallel to the light area LFL
VM Front mid-light beam
VM' Front mid-light beam with beam offset through transparent object support TOA or glass plate
VOB Front limit of the light intensity increase
VPR Displacement direction of the prism film PR
VR Displacement direction
VSH Offset between the plane which spans through the pivot point axes DAH, D6 and the rear diaphragm edge BH
VSV Offset between the plane which spans through the pivot point axes DAV, D4 and the front diaphragm edge BV
VVH Displacement direction of the rear diaphragm perpendicular to the light area LFL
VVL Displacement direction of the light source LQ perpendicular to the light area LFL
VVV Displacement direction of the front diaphragm perpendicular to the light area LFL
VYH Displacement direction of limiting edge of the rear diaphragm according to the exemplary embodiment
YV Displacement direction of limiting edge of the front diaphragm according to the exemplary embodiment
ω Angle of inclination of the front diaphragm BLV in relation to the object plane OE
WB Effective diaphragm width
X X coordinate axis of the XYZ coordinate system
Xmin Smallest possible X coordinate of the left diaphragm edge
Xmax Greatest possible X coordinate of the right diaphragm edge
XML X coordinate of the left diaphragm edge set by motor
XMR X coordinate of the right diaphragm edge set by motor
Y Y coordinate axis of the XYZ coordinate system
YH Y coordinate of the rear rotation axis DAH
YBH Y coordinate of the rear diaphragm edge BH
YBV Y coordinate of the front diaphragm edge BV
YLH Y coordinate of the rear light area limit
YLV Y coordinate of the front light area limit
Ymin Smallest possible Y coordinate of the front diaphragm edge
Ymax Greatest possible Y coordinate of the rear diaphragm edge
YMH Y coordinate of the rear diaphragm edge set by motor
YMV Y coordinate of the front diaphragm edge set by motor
YV Y coordinate of the front rotation axis DAV
Z Z coordinate axis of the XYZ coordinate system
ZAP Accessories which can optionally be inserted in the adapter plate AP or the interface for this (e.g. polarisation filters, insert diaphragms, colour filters, etc.)
ZBH Z coordinate of the rear diaphragm edge BH
ZBV Z coordinate of the front diaphragm edge BV
ZDAmax Greatest possible Z coordinate of the diaphragm edge with adapter without table
ZDATmax Greatest possible Z coordinate of the diaphragm edge with adapter and table
ZDmax Z coordinate of the uppermost diaphragm position which can be constructively realised
ZDmin Z coordinate of the lowermost diaphragm position without table which can be constructively realised
ZDTmax Greatest possible Z coordinate of the diaphragm edge with table which can be achieved without further inventive measures
ZDTmin Smallest possible Z coordinate of the diaphragm edge with table
ZEP Z coordinate of the entrance pupil of the objective observed in the current zoom magnification
ZEP1 Z coordinate of the entrance pupil for objective No. 1 in the current zoom magnification
ZEP2 Z coordinate of the entrance pupil for objective No. 2 in the current zoom magnification
ZEP3 Z coordinate of the entrance pupil for objective No. 3 in the current zoom magnification
ZF Z coordinate of the guide path—reference axis
Zh Z coordinate of the diaphragm edge BK in the ideal Z diaphragm position for the current objective in the current zoom magnification
Zh1 Z coordinate of the diaphragm edge in the ideal Z diaphragm position for the objective No. 1 in the current zoom magnification
Zh1max Maximum value of Zh for objective No. 1
Zh1min Minimum value of Zh for objective No. 1
Zh2 Z coordinate of the diaphragm edge BK in the ideal diaphragm position for objective No. 2 in the current zoom magnification
Zh2max Maximum value of Zh for objective No. 2
Zh2min Minimum value of Zh for objective No. 2
Zh3 Z coordinate of the diaphragm edge BK in the ideal diaphragm position for objective No. 3 in the current zoom magnification
Zh3max Maximum value of Zh for objective No. 3
Zh3min Minimum value of Zh for objective No. 3
Zhmin Smallest possible Z coordinate of the rear diaphragm edge without table
ZhZ Z coordinate of the rear diaphragm edge in a special intermediate position without table, in which the rear diaphragm can be moved to the rear without collision
ZH Z coordinate of the rear rotation axis DAH
ZHL Z coordinate of the light area LFL
ZL Z coordinate of the left diaphragm edge
Zmin Smallest possible adjustable Z coordinate in the current system environment
Zmax Greatest possible adjustable Z coordinate in the current system environment
ZMH Z coordinate of the rear diaphragm edge set by motor
ZMV Z coordinate of the front diaphragm edge set by motor
ZR Z coordinate of the right diaphragm edge
ZThmin Smallest possible Z coordinate of the rear diaphragm edge with table
ZThZ Z coordinate of the rear diaphragm edge in a special intermediate position with table, in which the rear diaphragm edge can be moved to the rear without collision ZTRmax Greatest possible Z coordinate of the rear diaphragm edge with table and ring light RL
ZTvmax Greatest possible Z coordinate of the front diaphragm edge with table
Zvmax Greatest possible Z coordinate of the front diaphragm edge without table
ZV Z coordinate of the front rotation axis DAV
ZYmin Z coordinate of the front diaphragm edge at Ymin
ZYmax Z coordinate of the rear diaphragm edge at Ymax

The invention claimed is:

1. A transmitted light illumination apparatus for a light microscope with a microscope objective and a zoom body, wherein an effective entrance pupil of the microscope objective changes dependent on at least one of a type of objective, a zoom position and a microscope type, the apparatus comprising:
 a light source adapted to emit an illuminating light bundle,
 a holding device for holding a sample to be examined, and
 at least one diaphragm edge to trim the illuminating light bundle,
 wherein the diaphragm edge is arranged between the holding device and the light source,
 wherein the diaphragm edge extends transversely to an optical axis of said light microscope, which can be positioned in an operating state on the transmitted light illumination apparatus,
 wherein an optical path of illuminating light between the diaphragm edge and the holding device is free of beam-forming components,
 mechanical means for variable positioning of the diaphragm edge in a direction of the optical axis in dependence upon the effective entrance pupil of the objective, wherein a position of the diaphragm edge in the direction of the optical axis can be varied by the mechanical means for variable positioning irrespectively of a position of the diaphragm edge transversely to the optical axis, and
 wherein the position of the diaphragm edge in the direction of the optical axis is automatically set dependent on the type of objective, the zoom position and the microscope type.

2. The apparatus as defined in claim 1,
wherein
means for variable positioning of the diaphragm edge in a direction transversely to the optical axis are provided in order to change the contrast.

3. The apparatus as defined in claim 1,
wherein
the diaphragm edge is a linear diaphragm edge.

4. The apparatus as defined in claim 1,
wherein
the diaphragm edge is an edge of a mechanical diaphragm.

5. The apparatus as defined in claim 1,
wherein
the diaphragm edge is formed by an LCD array.

6. The apparatus as defined in claim 1,
wherein
at least one further diaphragm is provided which is positioned directly next to the light source in order to vary an effective light area of the light source.

7. The apparatus as defined in claim 1,
wherein
at least one further variably positionable diaphragm is provided between the holding device and the light source in order to trim the illuminating light bundle.

8. The apparatus as defined in claim 1,
wherein
a carriage mechanism with a first carriage and a second carriage is provided to displace the diaphragm edge in the direction of the optical axis and in a direction transversely to the optical axis.

9. The apparatus as defined in claim 1,
wherein
a first mechanical diaphragm and a second mechanical diaphragm are provided, the diaphragm edge is formed by an edge of the first mechanical diaphragm or by an edge of the second mechanical diaphragm, and
for displacement of the diaphragm edge in the direction of the optical axis and in a direction transversely to the optical axis, a first carriage mechanism with a first carriage and a second carriage is provided for the first mechanical diaphragm and a second carriage mechanism with a third carriage and a fourth carriage is provided for the second mechanical diaphragm.

10. The apparatus as defined in claim 1,
wherein
the diaphragm edge is configured to asymmetrically trim the illuminating light bundle.

11. The apparatus as defined in claim 1,
wherein
the light source is a planar light source.

12. The apparatus as defined in claim 1,
wherein
means for rotating the diaphragm edge about the optical axis are provided.

13. A transmitted light illumination method for a light microscope with a microscope objective and a zoom body, wherein an effective entrance pupil of the microscope objective changes dependent on at least one of a type of objective, a zoom position and a microscope type,
 in which a sample held by a holding device is subjected to illuminating light from a light source and
 in which an illuminating light bundle emitted from the light source is trimmed by a diaphragm edge arranged between the holding device and the light source, wherein an optical path of the illuminating light between the diaphragm edge and the holding device is free of beam-forming components,
 wherein the diaphragm edge extends transversely to an optical axis, and wherein a position of the diaphragm edge in a direction of the optical axis is automatically set dependent on type of objective, the zoom position and the microscope type.

14. The method as defined in claim 13, wherein an absolute position of the diaphragm edge is determined before the start of a diaphragm positioning with at least one of: an optically and a mechanical measurement.

15. The method as defined in claim 13,
wherein
the diaphragm edge is positioned in a direction transversely to the optical axis in order to set the contrast.

16. The method as defined in claim 13,
wherein
a position of the diaphragm edge in a plane of the effective entrance pupil is determined by
a) varying the position of the diaphragm edge in the direction of the optical axis of the objective,
b) recording at least in part one microscope image for each position of the diaphragm edge in the direction of the optical axis,
c) determining an illumination parameter for each microscope image, d) setting the position of the diaphragm edge in the direction of the optical axis, at which a course of the illumination parameter plotted against the position of the diaphragm edge in the direction of the optical axis has a predetermined characteristic, as a position of the diaphragm edge in the plane of the effective entrance pupil, and e) storing the set position.

17. The method as defined in claim 16, wherein
the illumination parameter is a measure for at least one of:
an intensity gradient in a direction transversely to the diaphragm edge, an image contrast, a contrast range of the image, an image homogeneity and a shadow in the microscope image.

18. The method as defined in claim 16, wherein
for each microscope image a respective intensity gradient is determined as an illumination parameter, and
the diaphragm edge is set to the position in the direction of the optical axis, at which a course of the intensity gradient plotted against the diaphragm edge's position in the direction of the optical axis has a zero passage.

19. The method as defined in claim 16, wherein
the microscope images are recorded with a digital camera and the illumination parameter intensity gradient is determined by evaluating data supplied by the digital camera.

20. The method as defined in claim 16, wherein
based on the illumination parameter which was determined for a previous position of the diaphragm edge in the direction of the optical axis, a next following position of the diaphragm edge in the direction of the optical axis is determined,
wherein the next following position is spaced further apart from the previous position as an absolute value of the illumination parameter increases, and
a direction in which the next following position is spaced apart from the previous position is determined from a +/− symbol of the illumination parameter determined for the previous position.

21. The method as defined in claim 13, wherein
the method comprises adapting a light area of the light source to an actually effective back-projection of the illuminating light.

22. The method as defined in claim 13, wherein
adjustments of at least one of the at least one diaphragm edge and further diaphragms are carried out in an automated manner.

23. The method as defined in claim 13, wherein
the method further comprises adjusting at least one of:
the at least one diaphragm edge,
further diaphragms, and
further optical components,
in an automated manner in dependence upon a determined configuration of components that are present.

24. A microscope system with a light microscope with a microscope objective and a zoom body, wherein an effective entrance pupil of the microscope objective changes dependent on at least one of a type of objective, a zoom position and a microscope type, and with a transmitted light illumination apparatus, the transmitted light illumination apparatus comprising:
a light source adapted to emit an illuminating light bundle,
a holding device for holding a sample to be examined, and
at least one diaphragm edge to trim the illuminating light bundle,
wherein the diaphragm edge is arranged between the holding device and the light source,
wherein the diaphragm edge extends transversely to an optical axis of a light microscope, which can be positioned in an operating state on the transmitted light illumination apparatus,
wherein an optical path of the illuminating light between the diaphragm edge and the holding device is free of beam-forming components,
mechanical means for variable positioning of the diaphragm edge in dependence upon the position of the effective entrance pupil of the objective in a direction of the optical axis, wherein a position of the diaphragm edge in the direction of the optical axis can be varied the mechanical means for variable positioning irrespectively of a position of the diaphragm edge transversely to the optical axis, and
a memory device for storing at least one of the type of objective, the zoom position and the microscope type of the light microscope, and corresponding diaphragm settings,
wherein a position of the diaphragm edge in the direction of the optical axis can be automatically set dependent on the type of objective, the zoom position and the microscope type stored in the memory device.

25. The microscope system as defined in claim 24, wherein
a control device is provided which is connected to components of the light microscope and the transmitted light illumination apparatus and which is configured to control the light microscope and the transmitted light illumination apparatus to carry out a transmitted light illumination method for the light microscope with changing effective entrance pupil of the objective,
in which the sample held by the holding device is subjected to illuminating light from the light source and
in which the illuminating light bundle emitted from the light source is trimmed by the diaphragm edge arranged between the holding device and the light source,
wherein the optical path of the illuminating light between the diaphragm edge and the holding device is free of beam-forming components, and
wherein the diaphragm edge extends transversely to the optical axis and is positioned in dependence upon the position of the effective entrance pupil of the objective in direction of the optical axis.

26. The microscope system as defined in claim 24, wherein
a memory device is provided, in which settings of the transmitted light device and of the microscope are stored.

* * * * *